United States Patent
Tyler et al.

[11] Patent Number: 5,920,278
[45] Date of Patent: Jul. 6, 1999

[54] METHOD AND APPARATUS FOR IDENTIFYING, LOCATING, TRACKING, OR COMMUNICATING WITH REMOTE OBJECTS

[75] Inventors: G. Leonard Tyler, Menlo Park; Roy A. Long, Palo Alto, both of Calif.; Gregory D. Gibbons, P.O. Box 51931, Palo Alto, Calif. 94303

[73] Assignee: Gregory D. Gibbons, Palo Alto, Calif.

[21] Appl. No.: 08/865,423

[22] Filed: May 28, 1997

[51] Int. Cl.⁶ .............................. G01S 13/87; G01S 13/72; G01S 13/06
[52] U.S. Cl. .................................. 342/33; 342/36; 342/40; 342/57; 342/140; 342/357; 342/463; 375/356
[58] Field of Search ............................ 342/33, 31, 34, 342/35, 36, 40, 57, 58, 189, 194, 195, 352, 107, 108, 115, 125, 135, 139, 140, 145, 357, 367, 456, 463; 370/324, 350; 375/354, 355, 356

[56] References Cited

U.S. PATENT DOCUMENTS

| | | |
|---|---|---|
| 4,897,835 | 1/1990 | Gaskill et al. ........................ 370/314 |
| 4,955,018 | 9/1990 | Twitty et al. ........................ 370/395 |
| 5,034,882 | 7/1991 | Eisenhard et al. ................... 395/800.3 |
| 5,086,470 | 2/1992 | Ballance ................................ 380/48 |
| 5,173,899 | 12/1992 | Ballance .............................. 370/503 |
| 5,367,516 | 11/1994 | Miller ................................. 370/203 |
| 5,615,227 | 3/1997 | Schumacher, Jr. et al. ............. 375/206 |
| 5,682,404 | 10/1997 | Miller ................................. 375/222 |
| 5,799,010 | 8/1998 | Lomp et al. .......................... 370/335 |
| 5,835,590 | 11/1998 | Miller .................................... 380/9 |

*Primary Examiner*—John B. Sotomayor
*Attorney, Agent, or Firm*—Pretty, Schroeder & Poplawski

[57] ABSTRACT

A broadband transmitter element, located at a remote object, transmits a broadband signal at a prescribed transmission time. A broadband receiver element, located at a base platform spaced from the remote object, receives electromagnetic radiation during a reception search window. The broadband receiver element stores information characterizing the broadband signal. A synchronizer synchronizes the broadband transmitter element with the broadband receiver element for timing the transmission and reception. A processing device derives an estimated time of flight for the broadband signal to travel from the remote object to the base platform, and a correlation detector, located at the base platform, identifies the remote object and the arrival time of the broadband signal by correlating the stored information with signals received during the reception search window.

85 Claims, 23 Drawing Sheets

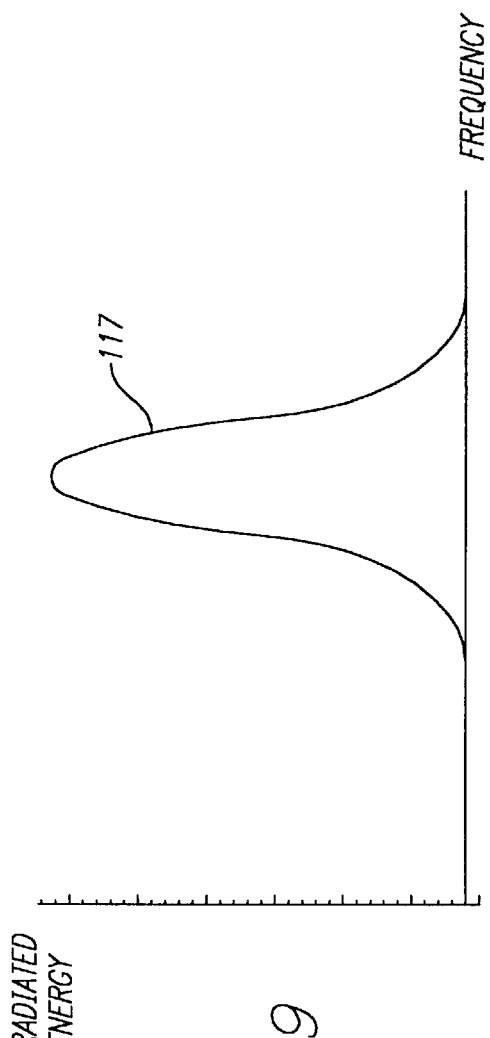
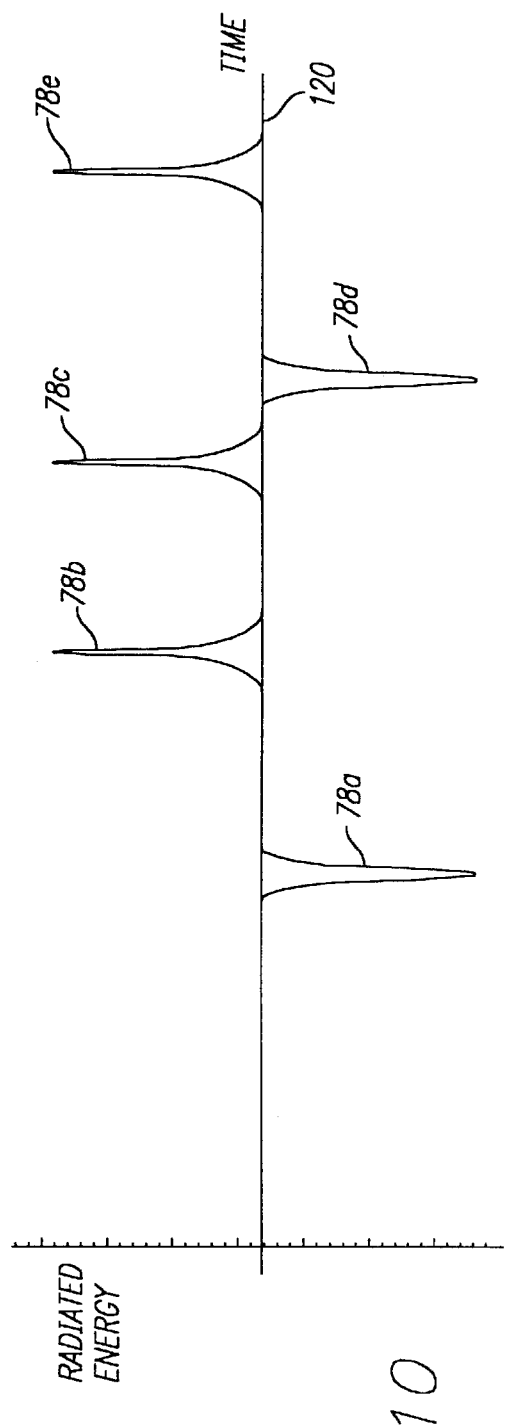

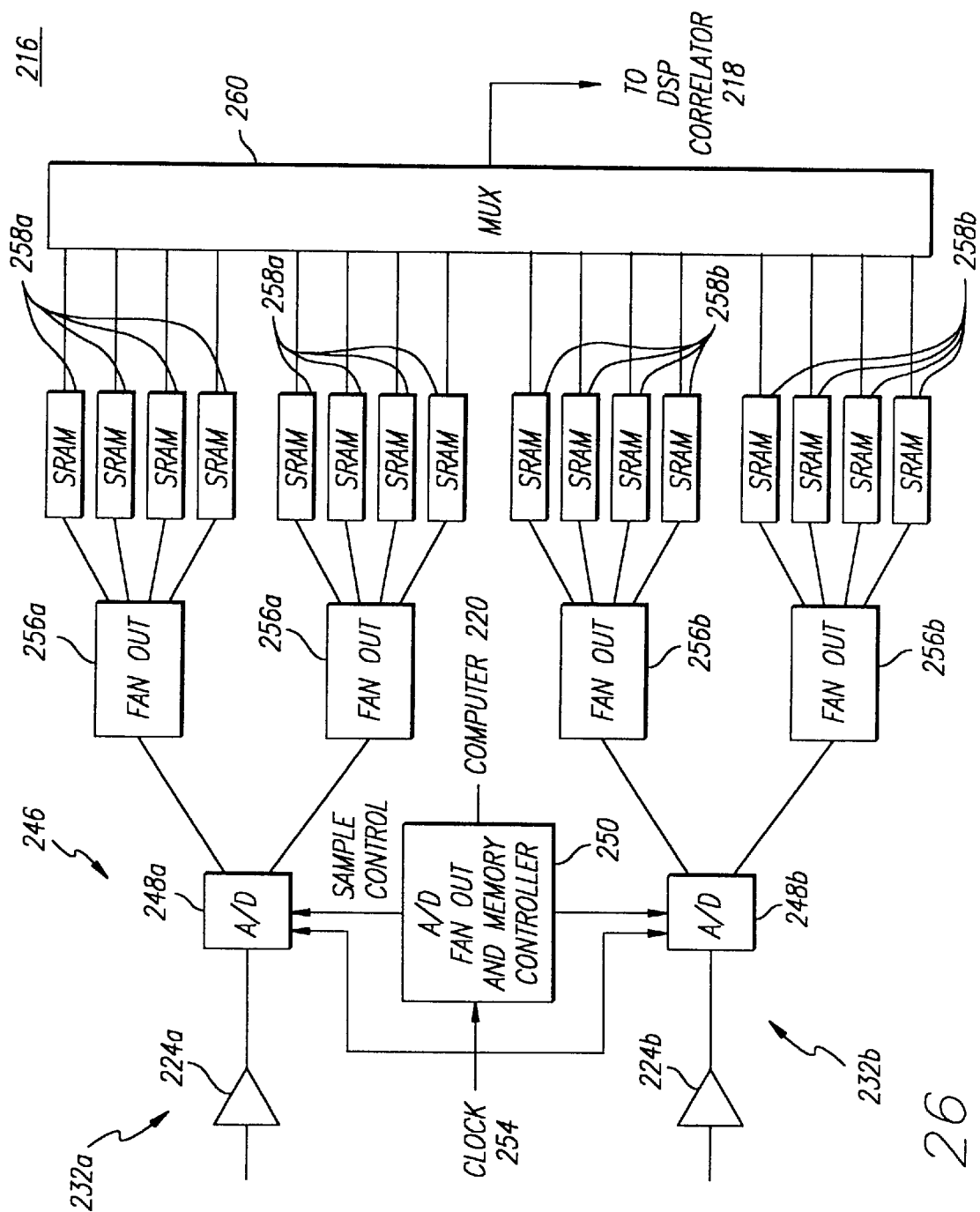

FIG. 37
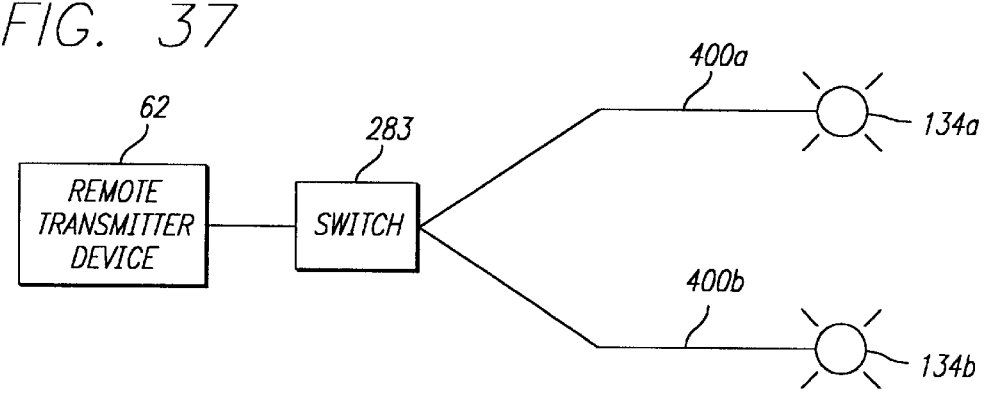
FIG. 38
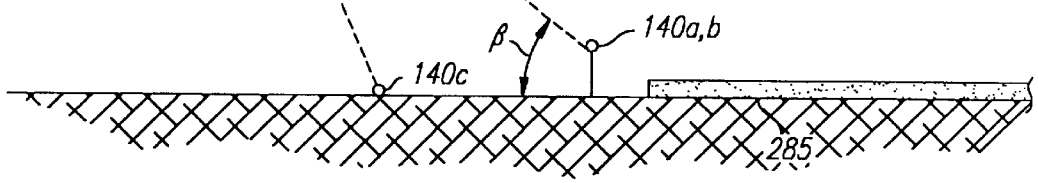
FIG. 39
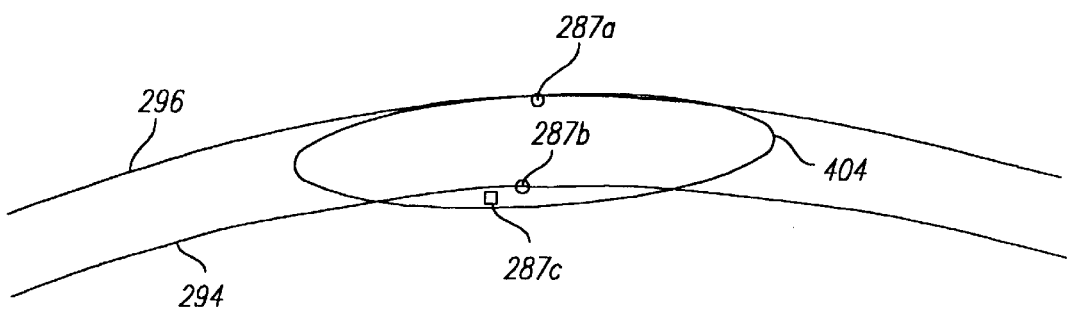

FIG. 43
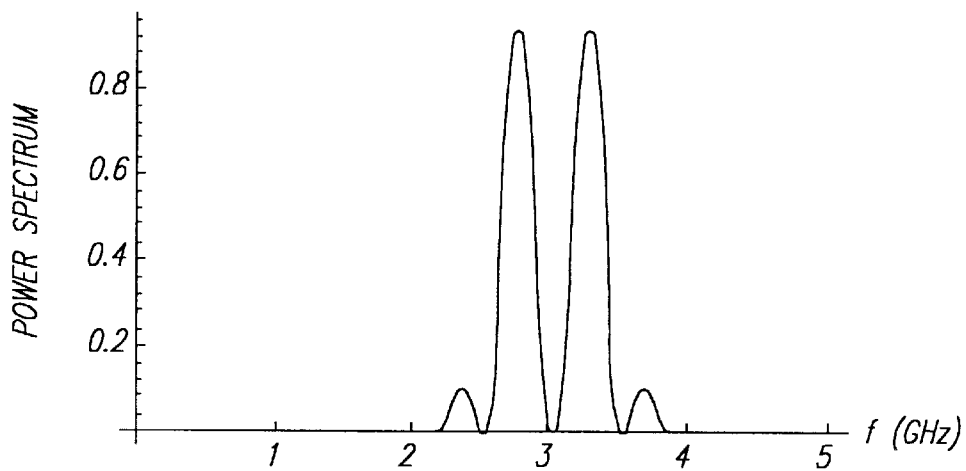
FIG. 44
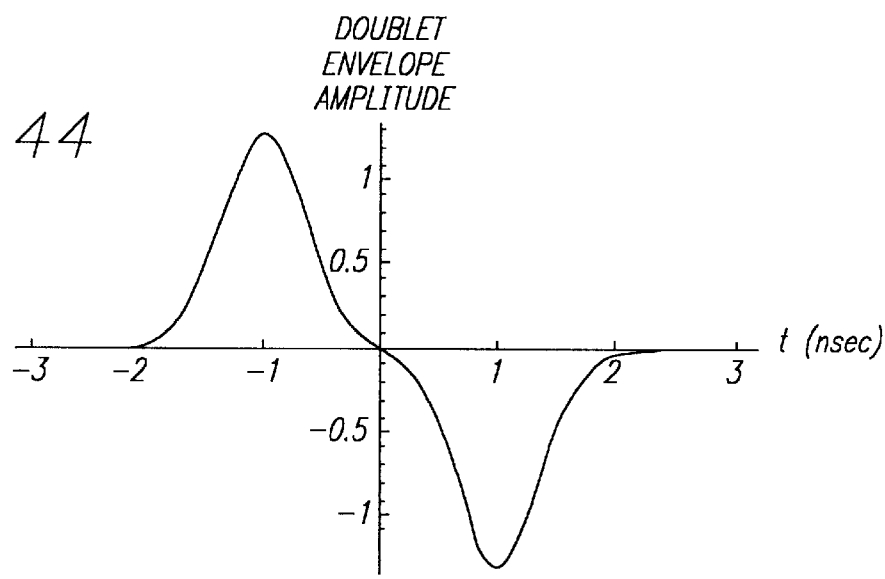
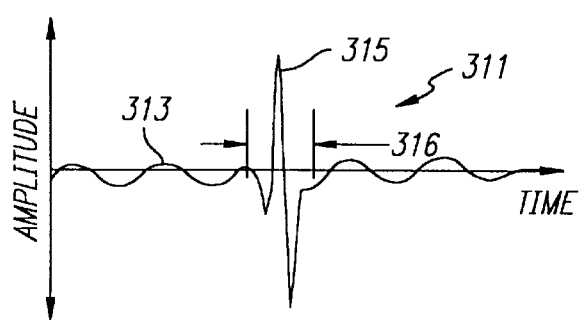
FIG. 45a
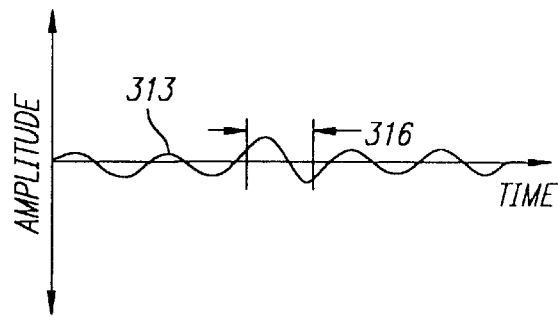
FIG. 45b

METHOD AND APPARATUS FOR IDENTIFYING, LOCATING, TRACKING, OR COMMUNICATING WITH REMOTE OBJECTS

BACKGROUND OF THE INVENTION

This invention relates generally to the transmission and reception of signals and, more particularly, to the transmission and reception of low-energy broadband signals.

Identification systems for remote objects have received considerable attention and effort in recent years. Recent aircraft near misses have shown how important, and difficult, it can be to reliably identify, locate, and track an aircraft or other vehicle. Electronic tracking and locating systems have been developed to help air traffic control and other aircraft in locating and tracking aircraft to maintain suitable aircraft separation. It is also desirable to locate and track cars, people, equipment, ships, and ground-based or airborne vehicles under certain circumstances. Similar systems have applications whether the user of the system is located on the ground, in the air, or in space. It is therefore desirable to provide a system that can more reliably identify, locate, track, and/or communicate with a remote object. The proliferation of wireless communication systems, including spread-spectrum systems, creates an increasing need for large numbers of communication channels which can operate without significant interference with each other and without interfering with other systems. The present invention addresses these desires.

SUMMARY OF THE INVENTION

The present invention provides a method and apparatus to communicate from a remote object to a base platform using broadband signals. The present invention resides in an integrated locating and tracking ILT) system that can be used to identify, locate, track, and receive communications from the remote object.

According to one aspect of the invention, a transmitter device located at the remote object includes a first waveform storage device that stores information characterizing a first broadband signal. The transmitter device is configured to transmit the broadband signal at a prescribed signal transmission time. A receiver device can be located at the base platform, spaced from the remote object, and includes a second waveform storage device that stores information characterizing a second broadband signal. The receiver device can receive and process electromagnetic radiation to produce an output signal.

According to other aspects of the invention, a synchronizer, and a range estimator can be provided.

The synchronizer synchronizes the transmitter device with the receiver device so that both are synchronized to a reference time. The base receiver device, located at the base platform, identifies the arrival time of the first broadband signal by correlating the waveform stored in a second waveform storage device of the receiver device with the received electromagnetic radiation. A range estimator uses difference in the prescribed transmission time and the arrival time to calculate the range between the transmitter device and the receiver device.

In another aspect of the invention, if there are two or more separated receiver devices, or two or more separated antennas sharing one receiver device, then the ranges from the transmitter device to each receiver device, or antenna, can be calculated, and a direction to the transmitter can be computed.

The method and apparatus of the invention is robust technically and operationally, and the system suits operations involving aircraft, surface vehicles, ships, spacecraft, individuals, and fixed beacons.

Other features and advantages of the invention should become apparent from the following detailed description of the invention taken in conjunction with the accompanying drawings which illustrate, by way of example, the principles of the invention.

BRIEF DESCRIPTION OF THE DRAWINGS

FIG. 7 is a block diagram of one embodiment of a circuit that can produce a single fundamental pulse;

FIG. 9 is a typical frequency vs. power level graph for a Gaussian power distribution;

FIG. 10 is an radiated energy vs. time graph for a typical pulse burst;

FIG. 26 is a detailed block diagram of the receiver digital module of FIG. 24;

FIG. 37 illustrates a schematic diagram of a device similar to FIG. 35, except a switch is inserted between the remote transmitter device and the broadband transmitter antennas;

FIG. 38 illustrates a schematic diagram of an aircraft landing system that utilizes one embodiment of the ILT system having three broadband transmitter antennas;

FIG. 39 is a schematic diagram illustrating an alternative integrated locating and tracking system, involving use of radar signals with the broadband signals;

FIG. 43 is a signal power vs. frequency graph of the Gaussian doublet waveform of FIG. 42;

FIG. 44 is an amplitude envelope graph of a Gaussian doublet waveform;

FIG. 45a is a graph of a typical signal amplitude versus time graph of a signal with a broadband impulse superimposed upon a narrowband signal;

FIG. 45b is a graph of the FIG. 45a signal having the broadband impulse replaced by a narrowband estimate, using pre-clipping and interpolation techniques;

DETAILED DESCRIPTION OF THE PREFERRED EMBODIMENTS

Figure 1:
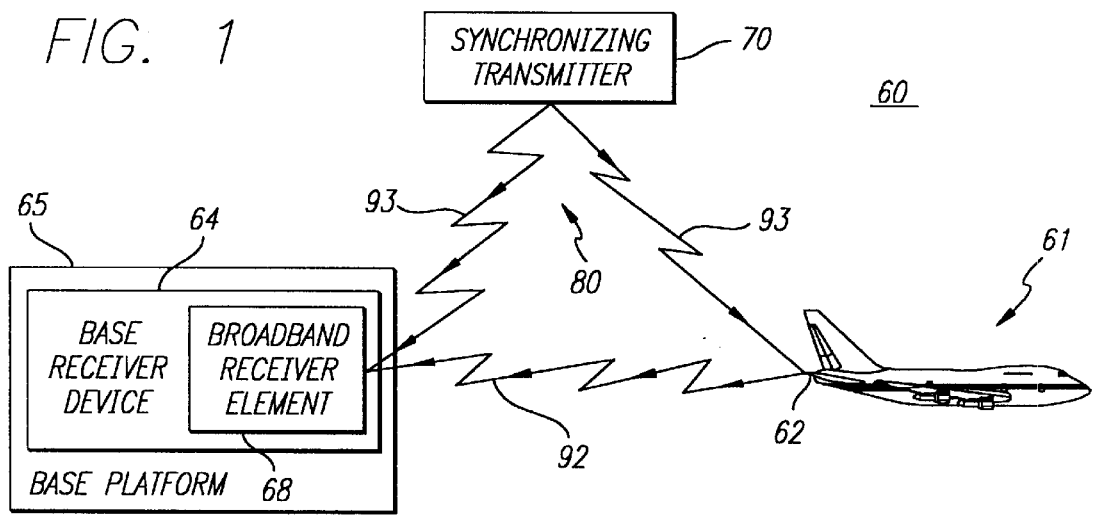
FIG. 1 is a schematic diagram illustrating one embodiment of an ILT system.
Figure 2:
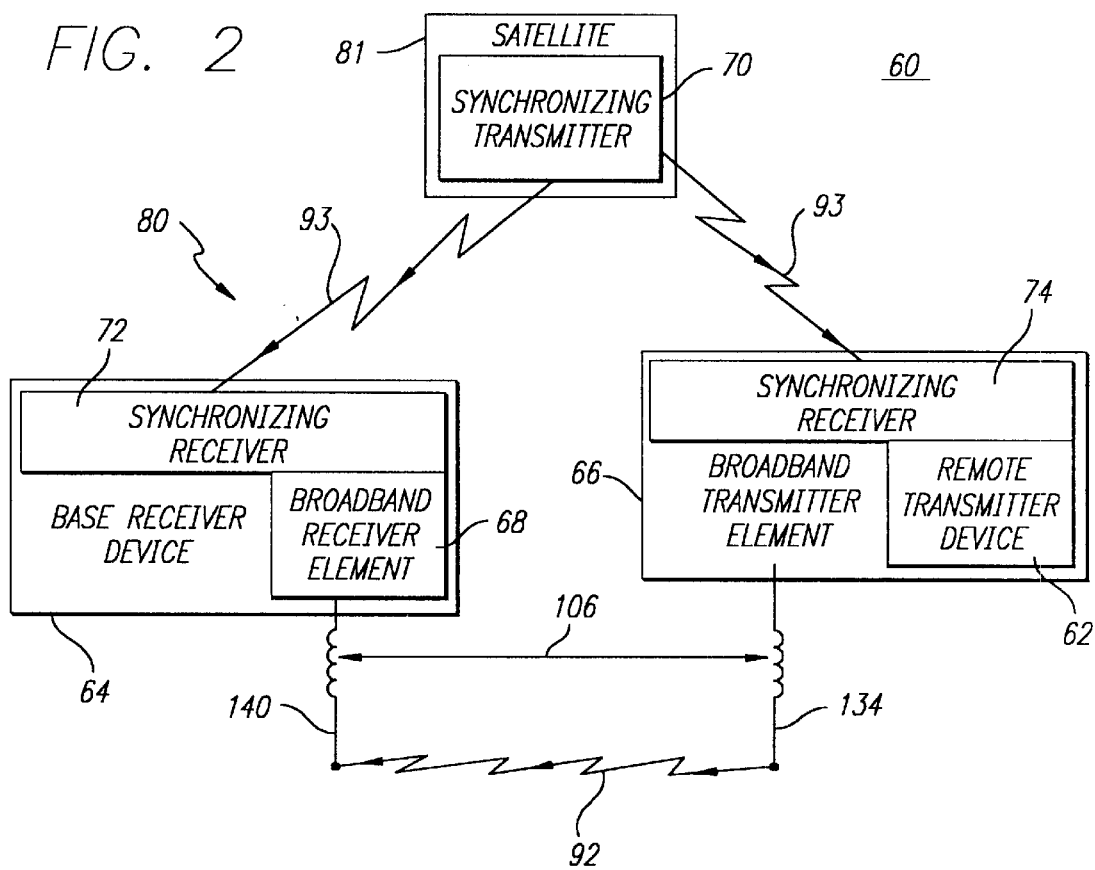
FIG. 2 is a block diagram further illustrating the ILT system of FIG. 1.

In this disclosure, elements of different embodiments that function in a similar manner are provided with the same reference number. As shown in FIGS. 1 and 2, an ILT system 60 provides for reliable identification of a remote transmitter device 62 by a base receiver device 64. The remote transmitter device 62 includes a broadband transmitter element 66, and the base receiver device 64 includes a broadband receiver element 68. A prescribed broadband signal 92 is transmitted at a prescribed time from the remote transmitter device 62 for reception by the base receiver device 64.

ILT system 60 further comprises a synchronization system 80 including a synchronizing transmitter 70 and synchronizing receivers 72,74. Synchronizing transmitter 70 transmits a synchronizing signal 93 that can be used by synchronizing receivers 72 and 74, located respectively in the base receiver device 64 and the remote transmitter device 62. The synchronizing transmitter 70 and associated synchronizing receivers 72,74 function to identify a synchronized reference time for certain elements in the remote transmitter device 62 and the base receiver device 64.

The broadband signal 92 utilizes a plurality of pulse-like transmissions, each of which is called a fundamental pulse, and is an information-carrying signal. The synchronization signal 93 assists in synchronizing the transmission and reception of the broadband signals 92 between the broadband transmitter element 66 and the broadband receiver element 68.

This disclosure has five parts. Part 1 provides a basic introduction of the ILT system 60 illustrated in FIGS. 1 and 2. Part 2 provides the operating principles used by the ILT system in transmitting broadband signals. Part 3 provides a system description of the remote transmitter device and base receiver device of the ILT system illustrated in FIGS. 2 and 3. Part 4 describes certain applications of several alternative embodiments of the ILT system. Part 5 describes the effects of man-made and natural interference upon the ILT system, and the limited effect of ILT signals on the system. Each part is intended to be descriptive in nature, and not limiting in scope.

PART 1: ILT SYSTEM INTRODUCTION

The FIGS. 1 and 2 embodiments of the ILT system 60 includes a remote object 61, such as an aircraft or other vehicle, that carries the remote transmitter device 62, and synchronization transmitter 70 that, in a preferred embodiment, uses global positioning system (GPS) transmitters located aboard one or more satellites 81. The broadband transmitter element 66 transmits broadband signal 92 over a path to the broadband receiver element 68. Users of aviation, nautical, and other navigational technologies use and understand the technology behind GPS transmitters and GPS receivers.

Figure 3:
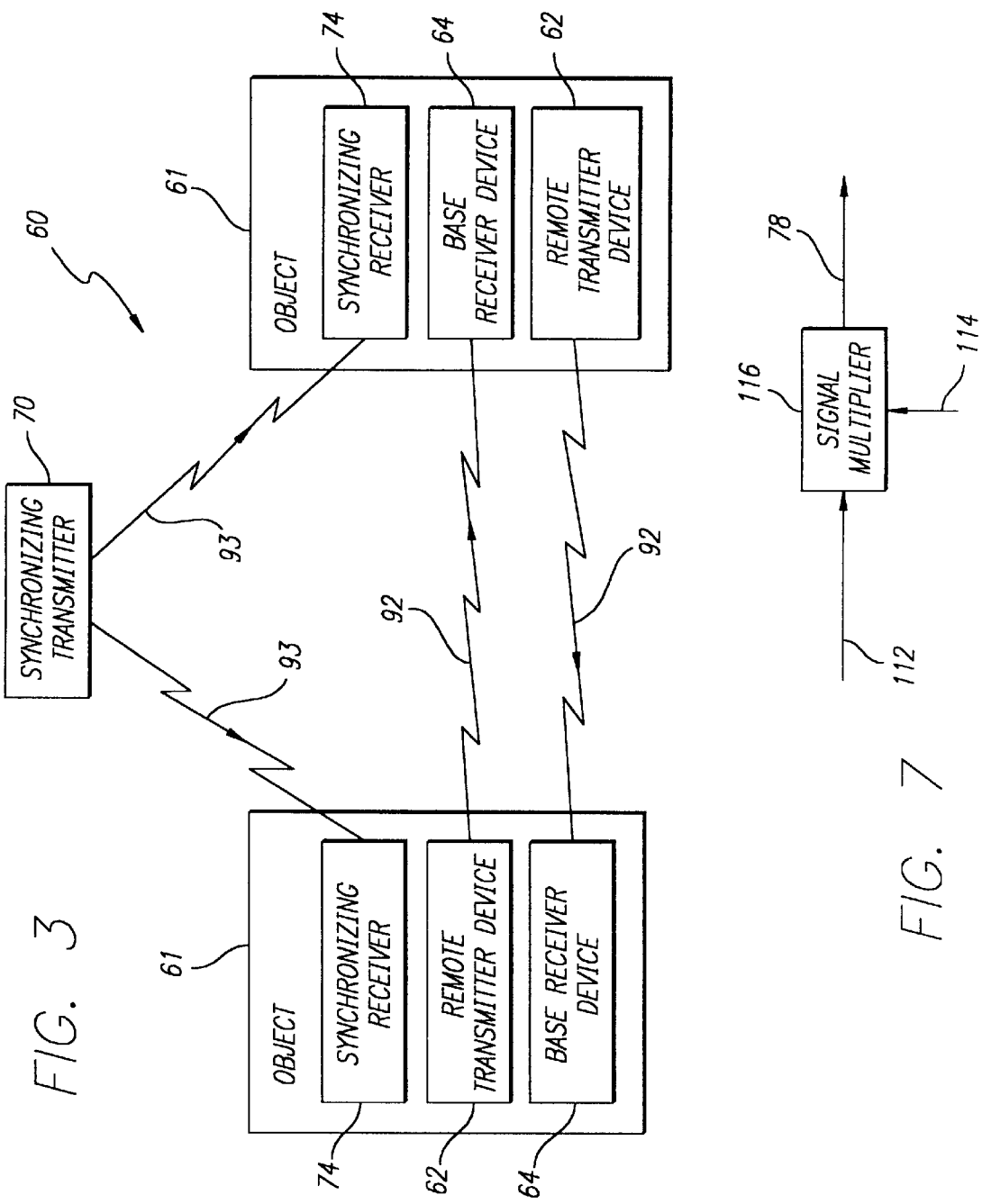
FIG. 3 is a block diagram of an alternative embodiment of an ILT system.

Either the remote transmitter device 62 or the base receiver device 64 could be placed on/in a distinct aircraft, building, ship, or in any other suitable location considering the specific application. The relative locations of the remote transmitter device and the base platform largely dictate the function of the ILT system 60. For example, if two aircraft each have a remote transmitter device 62 and a base receiver device 64 as shown in FIG. 3, then each aircraft can identify the other. In effect, both aircraft can consider themselves to have the base receiver device 64, receiving signals from the remote transmitter device 62 located on the other aircraft.

In FIG. 1, by comparison, if a single aircraft has the remote transmitter device 62, with no base receiver device 64, while a base platform 65 has a base receiver device 64, then the aircraft can be identified by the base platform 65. There is no corresponding identification of the base platform 65 by the aircraft. In the latter configuration, there is one remote object and one base platform.

The remote transmitter device 62 and the base receiver device 64 combine to identify and locate the remote object 61 relative to the base platform 65. This identification can be accomplished by the remote transmitter device 62 transmitting the prescribed broadband signal at the prescribed time. The remote transmitter device 62 stores a waveform record in a waveform storage device that contains information characterizing the broadband signal.

The broadband signal 92 can be characterized by the number of fundamental pulses it contains, the time delay after each fundamental pulse, the phase of each pulse, and the time of transmission. The base receiver device 64 has a waveform record whose information is identical to that of the remote transmitter device 62. This information, referred to as a "code," characterizes the broadband signal, and it can be stored, or can be computed, in the remote transmitter device 62 and the base receiver device 64. Both the remote transmitter device 62 and the base receiver device 64 have access to an identical code in order for the broadband signal to be properly transmitted and received.

By controlling the time interval during which the base receiver device 64 is listening, the user of the base receiver device 64 can define a region from which signals from the remote transmitter device 62 will be received. For example, in an air traffic control situation, the base receiver device 64 monitors traffic within a certain range from an airport tower. Based on distance information establishing regions to be monitored, an estimated minimum and maximum time of flight for a signal to travel from the broadband transmitter element 66 to the broadband receiver element 68 can be derived. In multiple aircraft operations, for example, where collision avoidance is a concern, each pilot can monitor a region within a certain distance of his aircraft.

Synchronization system 80 includes both the synchronizing transmitter 70 and the synchronizing receivers 72 and 74. (See FIG. 2.) The synchronizing transmitter 70 is preferably carried on board an orbiting satellite 81, it alternatively can use any technology, and be located at any site, where it can communicate between both the remote transmitter device 62 and the base receiver device 64. Preferred embodiments of the present invention use GPS transmitters and receivers as the synchronizing transmitter device 70 and the synchronizing receiver devices 72,74, respectively. The synchronization system 80 acts to synchronize the remote transmitter device 62 and the base receiver device 64, using synchronizing signal 93, which are typically GPS timing signals. This synchronization of the remote transmitter device with the base receiver device acts to establish a synchronized reference time. Other events, at both the remote transmitter device 62 and the base receiver device 64, can be measured with respect to this synchronized reference time. Other embodiments of the synchronization system 80 can be used, but the more precise the synchronization, the more accurate the resulting locating and tracking functions of certain embodiments of the present invention. The synchronization system effectively ties timing of remote transmitter device 62 to timing of the base receiver device 64. Use of GPS for synchronization enables ILT to be accurately synchronized without either the remote transmitter device 62 or the base receiver device 64 itself sending any synchronization signal.

The broadband signal 92 is characteristically produced using the correct code at the correct time. In FIG. 1, for example, the remote transmitter device 62 can be identified by the base receiver device 64. This identification is associated with the remote transmitter device 62 having access to the code used to characteristically form the broadband signal 93.

Each of the graphs depicted in FIGS. 4A through 4F relate to the signal transmissions between the FIG. 2 remote transmitter device 62 and the base receiver device 64.

Figure 4:
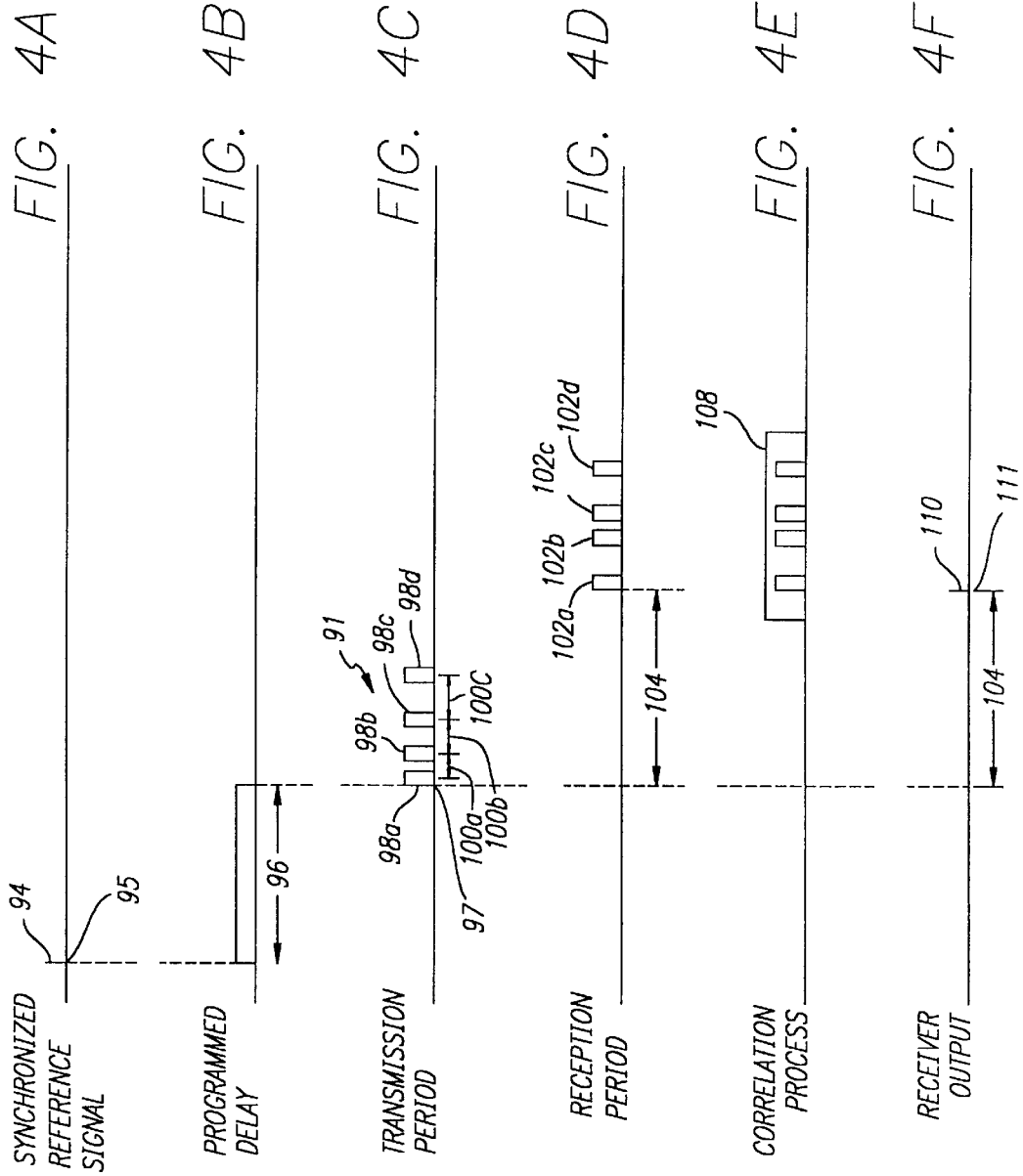
FIGS. 4A–4F are graphs of time lines of signals transmitted by the broadband transmitter device, or received by the broadband receiver device of FIG. 2.

FIG. 4A illustrates a graph of a synchronized reference signal 94. Synchronizing signal 93, transmitted by the synchronizing transmitter 70, is received by the synchronizing receivers 72,74, which in turn generate the synchronized reference signal 94 that is provided to broadband transmitter element 66 and the broadband receiver element 68. The synchronizing signal 93 occurs in a preferred embodiment in both the remote transmitter device 62 and the base receiver device 64 in such a manner that both can recognize a common, synchronized reference time 95. Any other system that can accurately synchronize the timing between the broadband transmitting element 66 and the broadband receiver elements 68 could alternatively be used to provide a synchronizing signal between the remote transmitter device 62 and the base receiver device 64. The synchronizing receivers 72, 74 communicate with, and synchronize, the broadband transmitter element 66 and the broadband receiver element 68.

FIG. 4B depicts a programmed delay 96 that follows the synchronized reference time 95, before the broadband transmitter element 66 transmits the broadband signal 92. Both the remote transmitter device 62 and the base receiver device 64 know, or are able to compute, the value of the programmed delay 96.

FIG. 4C illustrates a transmission period when the broadband transmitter element 66 transmits the broadband signal 92.

FIG. 4D illustrates the arrival time at the broadband receiver element 68 of the broadband signal 92, after the propagation delay 104.

FIG. 4E illustrates a reception search window 108 over which a correlation process is applied to the received electromagnetic radiation.

Finally, FIG. 4F is an output pulse 110 occurring at the time when the broadband receiver element 68 has detected the broadband signal 92.

The remote transmitter device 62 and the base receiver device 64 have a pre-existing agreement about the duration of the transmission programmed delay 96 (FIG. 4B). This programmed delay 96 is part of the "code," known to sender and receiver and denied to others.

A complex series of transmitted fundamental pulses 98a, 98b, 98c, 98d that define the broadband signal 92 are transmitted at a prescribed pulse-burst transmission time 97, immediately after the programmed delay 96, with prescribed time spaces 100a, 100b, 100c, between successive pulses, as shown in FIG. 4C. The timing of the fundamental pulses and the time spaces characteristically define the broadband signal. Each transmitted fundamental pulse 98a, 98b, 98c, 98d is a prescribed fundamental pulse of the type illustrated in FIGS. 5 or 6, whose formation is described below. All of the transmitted pulses combine to form a pulse burst 91 defining the broadband signal.

FIG. 4D illustrates the reception of the broadband signal 92 as represented by a complex series of received fundamental pulses 102a, 102b, 102c, 102d, etc., by the broadband receiver element 68. Each of the received fundamental pulses 102a through 102d, etc., corresponds to the respective transmitted fundamental pulses 98a through 98d. Propagation delay 104 represents the time difference between the transmission and reception of the broadband signal, respectively, by the broadband transmitter element 66 and the broadband receiver element 68. The propagation is also known as the broadband signal's "time of flight". The propagation delay 104 is due to the separation distance, or range, 106 (see FIG. 2) between the broadband antennas associated with the broadband transmitter element 66 and the broadband receiver element 68.

As illustrated in FIG. 4E, the reception search window, or time slot, 108 can be established at the base platform 64. The time slot 108 defines a period within which the base receiver device 64 is searching, using correlation algorithms, for a set of received fundamental pulses 102a through 102d that match the broadband signal characterized by the information regarding fundamental pulse number, phase, and interval between fundamental pulses stored in the base receiver device 64. This searching process can be very computer intensive using present state of the art computers. Therefore, the searching process is typically limited to time slots that a broadband signal 92 is likely to be encountered, and not to times before the broadband signal 92 has been transmitted. Some buffer time should be added, allowing for synchronization error and relative motion between the remote transmitter device 62 and the base receiver device 64. The output pulse 110 (see FIG. 4F) indicates an arrival time ill of the received broadband signal 92.

FIG. 3 illustrates an alternate embodiment of an ILT system 60, in which remote objects 61 each contain one remote transmitter device 62 and one base receiver device 64. In this embodiment, broadband signals 92 can be transmitted in both directions between the remote objects 61. The remote objects 61 have respective synchronizing receivers 74. The synchronizing receivers 74 establish a synchronized reference time 95 at both the remote transmitter device 62 and the base receiver device 64. This configuration provides either full-duplex or half-duplex communications. The structural elements associated with each broadband transmitter element and broadband receiver element are preferably identical to each other as shown in FIG. 2.

PART 2: OPERATING PRINCIPLES AND MATHEMATICS

This part describes the operating principles, and the associated mathematics, of ILT system 60 of FIGS. 1 and 2. Major factors that are important to the transmission and reception of broadband signals are described. This part also discusses the locating and the tracking functions of the ILT system.

2.1 Waveform of ILT Broadband Signals

Figure 5:
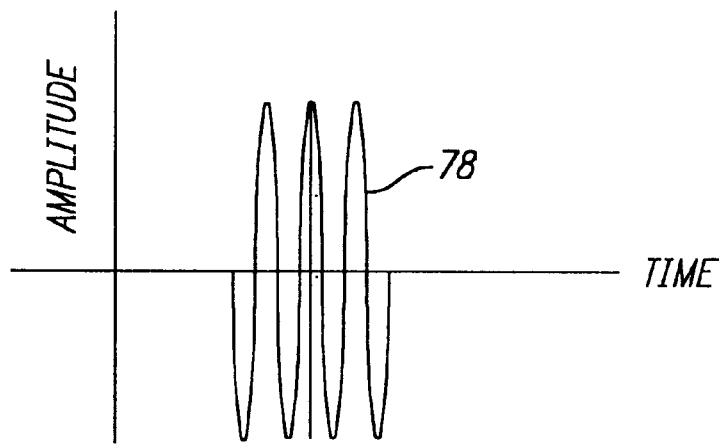
FIG. 5 is an idealized amplitude vs. time graph of one embodiment of a fundamental pulse.

The fundamental waveform of electromagnetic radiation employed to form broadband signals 92 can be an extremely short pulse referred to herein as a "fundamental pulse." Typically no more than a few oscillations of radiation are permitted within each fundamental pulse. One embodiment of a fundamental pulse 78 is shown in FIG. 5. This waveform can be achieved, as illustrated in FIG. 7, by amplitude modulating, or gating, a cosinusoidal signal with an extremely short pulse. A variety of fundamental pulse shapes can be employed, with the different fundamental pulse shapes affecting the spectral distribution of radiated energy.

Symbolically, the signal waveform of the fundamental pulse 78 can be formed by a signal multiplier 116 combining a signal carrier signal 112, $\cos(2\pi f_0 t)$, with a short signal pulse 114, $M(t/T)$, as illustrated in FIG. 7, and the fundamental pulse signal is given by the equation, $$s(t) = M\left(\frac{t}{T}\right)\cos(2\pi f_0 t)$$

where $f_0$ is the center frequency of the waveform, and the function $M(t/T)$ is the modulating function of finite scale factor or duration T. The signal $s(t)$ can be obtained by simple analog or digital multiplication.

A standard rectangular pulse function can be selected for $M(t/T)$, provided by the equation, $$M_P\left(\frac{t}{T}\right) = P\left(\frac{t}{T}\right) = 1, \text{ where } \left|\frac{t}{T}\right| \leq \frac{1}{2}$$
$$= 0, \text{ otherwise.}$$

Taking, for convenience, the operating impedance as 1 Ohm, the power in the standard pulse is 1 Watt, and the energy is T.

In an alternative embodiment, a Gaussian envelope with an e-folding width of T for the modulation function can be chosen. For comparison purposes and illustrative calculations, it is convenient if the energy in this Gaussian pulse is also T, corresponding to that in the standard rectangular pulse. This can be achieved by normalizing the Gaussian pulse as, $$M_G\left(\frac{t}{T}\right) = G\left(\frac{t}{T}\right) = \sqrt[4]{\frac{8}{\pi}} \exp\left(-\frac{4t^2}{T^2}\right) = 1.26\exp\left(-\frac{4t^2}{T^2}\right).$$

The peak power in this normalized Gaussian pulse is $\sqrt{8/\pi}=1.6$ times greater than that in the standard pulse with the same energy.

Figure 8:
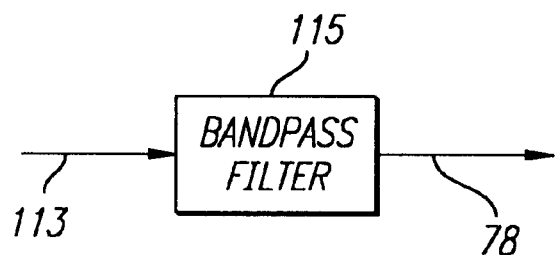
FIG. 8 is a block diagram of an alternate embodiment of a circuit that can produce a single fundamental pulse.

In the FIG. 8 embodiment, an impulse signal 113 is passed through a bandpass filter 115 to produce the fundamental pulse 78 with the desired frequency as characterized by the bandpass filter 115. Switches having a 20 to 40 psec rise time can output a suitable high power impulse signal 113. Such switches are produced by a variety of companies including Power Spectra, Inc. of Santa Clara, Calif.

For either the FIG. 7 or FIG. 8 embodiment described above, or other similar choices of waveform, the effect of the modulation function $M(t/T)$ is to produce a short portion of a cosinusoidal signal which then forms a pulse-like broadband waveform.

Figure 6:
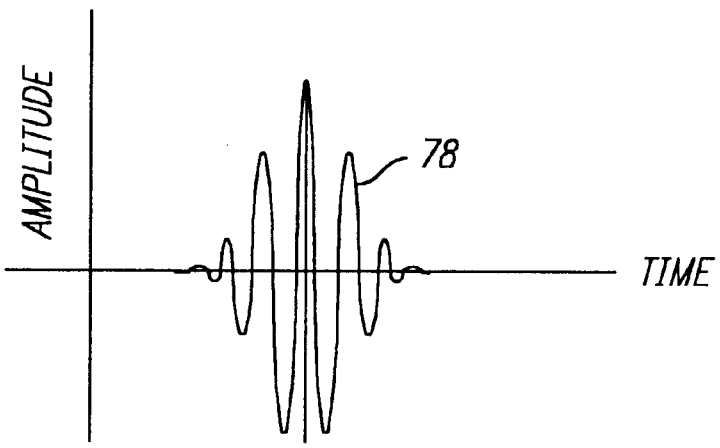
FIG. 6 is an idealized amplitude vs. time graph of another embodiment of a fundamental pulse, which has an approximately Gaussian envelope.

For values of $f_0$ in the gigaHertz frequency range, the radiated bandwidths of the fundamental pulses 78 are also in same range. For example, if the radiated waveform of the fundamental pulse 78 is approximately three cycles of oscillation at 3 GHz, the duration of the signal is 1 nsec, and the full-width, half-power bandwidth (FWHP) of the radiated spectrum is about 1 GHz. Resulting unit-amplitude waveforms for fundamental pulse 78 using a simple rectangular pulse-gate modulation function is illustrated in the FIG. 5 graph, and a graph illustrating the resulting unit-amplitude waveform for fundamental pulse 78 using a normalized Gaussian modulation function is illustrated in FIG. 6.

If the modulation function is a simple gate of duration n cycles of $f_0$, then the bandwidth of the waveform between first nulls is $2f_0/n_0$ For $n_0=1$, the bandwidth is 200% of $f_0$, extending from f=0 through$_0$ 2f. Such a waveform cannot be radiated practically, however, due to the very large antenna structure to accommodate the low frequency end of the spectrum. More typically, $n_0$ is in the range of 2 to 10, with bandwidths in the range of 20 to 100% of $f_0$.

For a Gaussian waveform the relationships are similar, but the spectrum of the radiated energy is Gaussian. The e-folding width of the power spectrum, i.e., the full width at the −4.34 dB level of the spectrum, is $2\sqrt{2}/(\pi T)$ where as above, T is the e-folding width of the Gaussian modulation envelope. For T=1 nsec e-folding width of the pulse envelope, as in FIG. 6, the e-folding width of the power spectrum is 0.9 GHz. The power spectrum corresponding to this case, a cosine with a Gaussian envelope waveform 117, is illustrated in FIG. 9. For other widths of the Gaussian modulation envelope, the width of this spectrum is inversely proportional to the number of cycles transmitted at the center frequency.

Use of such extremely wideband signals for the broadband signal 92 is a basic attribute of the system 60, since such wideband signals produce a greatly attenuated response in ordinary receivers, roughly in proportion to the ratio of the receiver bandwidth divided by the width of the wideband signal spectrum. Thus, signals used in conventional systems would experience very little interference from ILT signals.

There are at least two extant technologies for generating waveforms that form the fundamental pulses 78. One technology that produces fundamental pulses similar to that illustrated in FIG. 5 uses switched harmonic signals, to gate a continuously running oscillator. The gated oscillator output is then amplified and radiated. This approach can generate output signal powers limited by modulation switching speeds and amplifier technology. While sub-nanosecond switches are readily available, compact broadband amplifiers in frequency ranges of interest are limited to peak instantaneous powers of perhaps a few hundred watts.

The second technology, that produces the fundamental pulses that appear similar to FIG. 6, uses charged transmission line technology to excite a radiating structure directly. Systems based on this approach can readily produce peak output powers exceeding requirements contemplated here, or can produce low peak powers from very compact packages.

Figure 49:
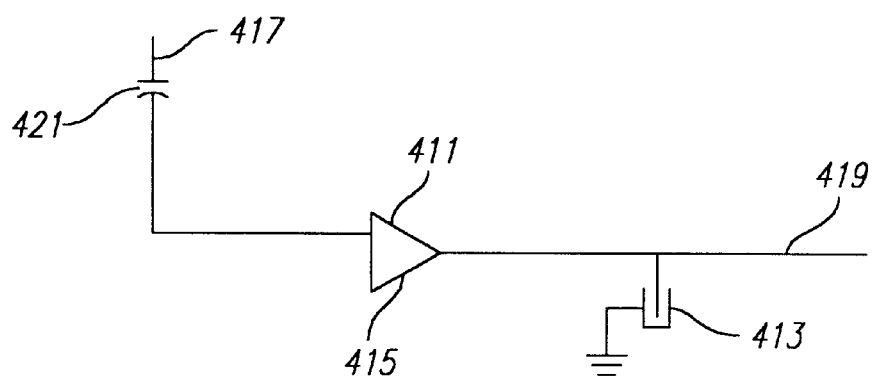
FIG. 49 is a schematic of one embodiment of an apparatus for generating a pulse.

FIG. 49 illustrates an example of a charged transmission line structure. Voltage 417 is applied to a capacitor 421, resulting in a current pulse that is released into a resonant transmission line 413 when a fast-acting switch 411 closes in response to a gate input 415. The current pulse excites resonant transmission line 413 in accordance with well-known principles, resulting in the creation of an ILT fundamental pulse with prescribed characteristics at output 419.

2.2 Coding

As illustrated in FIG. 10, a sequence of fundamental pulses 78*a* through 78*e*, having radiated energy of the type described in the last section, characteristically form a broadband signal 92. The fundamental pulses 78*a* and 78*d* that extend below the x-axis 120 in FIG. 10 are phase shifted by 180 degrees from those fundamental pulses 78*b*, 78*c*, and 78*e* that extend above the x-axis 120. The pulse burst is preferably generated by applying a pseudo-random sequence of modulation pulses to the cosinusoidal carrier signal 112, where the timing of the pseudo-random sequence is typically, but not necessarily, coherent with the center frequency $f_0$. This sequence of fundamental pulses that defines the broadband signal 92 is referred to as the "pulse burst." No appreciable energy is radiated by the broadband transmitter element 66 during the interpulse periods.

The number of pulses, the even-second transmission time, the programmed delay, the time delay between each pulse, and the phase or sign of each pulse of the modulation pulses is defined by the code stored in the remote transmitter device 62 and the base receiver device 64. The numerical specification of the pseudo-random sequence of modulation pulses is also often referred to as the "code."

Both the broadband transmitter device 62 and the base receiver device 64 have access to the same codes to permit proper reception of the broadband signal 92 at the base receiver device 64. These codes are typically produced by a random-number generator of a type known in the art, and the same random-number seed is to be applied to the random-number generator at both the remote transmitter device 62 and the base receiver device 64. Accordingly, the use of codes, and varying the random-number seed for each pulse-burst transmission, is an important feature of the invention, providing a low-interference attribute of ILT system 60.

For a preferred embodiment of the ILT system 60, the coded pulse-burst transmission is sparse in that the duty cycle is low, so that the net total duration of fundamental pulses 78 in a pulse burst 91 is typically about 10% of the pulse-burst duration. For example, if the duration of a pulse burst is chosen to be 1 μsec, then there are 1000 possible time slots for transmission of 1 nsec fundamental pulses. A typical pulse burst might use about 100 of these possible time slots. The spectrum of a pulse burst depends on the particular code employed, but nevertheless, the spectrum retains the wide envelope of the fundamental pulse. In the ILT system implementation, the code is varied, thus forestalling the appearance of a structured spectrum from code repetitions. Further, the pulse burst repetition rate is typically low, of the order of one pulse burst transmission per second or less.

The waveform of the coded pulse burst characterizing the broadband signal can be described as a summation of the fundamental pulses with appropriate delays and signs applied by the modulation signal. Thus, the pulse burst n1 can be written as, $$S(t) = \left\{ \sum_{i=1}^{N} \text{sgn}(f(i)) M\left(\frac{t - n_i T}{T}\right) \right\} \cos(2\pi f_0 t)$$

where S(t) represents a pulse burst comprising fundamental pulses, where N is the number of modulation pulses, $n_i$ is the unit delay controlling the time delay of the $i^{th}$ pulse, and f(i) is the sign indicator for the $i^{th}$ fundamental pulse in the pulse burst. By considering the signum as part of the code, the phase of the cosine function is coherent within a pulse burst.

The above S(t) equation describing the pulse burst waveform is a special case of a more general form, $$S(t) = \sum_{i=1}^{N} M_i\left(\frac{t - \Delta_i}{T_i}\right)\cos(2\pi f_i t + \phi_i)$$

wherein each of the variables in the pulse burst are chosen independently. The modulation, and the phase and frequency of the cosinusoidal factors, can be selected at random for each term in the sum.

The use of random-number generators is a well known technique to produce pseudo-random codes in general, and the structure thereof will not be detailed further. In order to generate two identical progressions from two copies of a random-number generator, in this case one is located at the base receiving device and another is located at the remote transmitter device, each random-number generator must have access to the same random-number seed. Reception of the broadband signal can be limited to authorized users by keying the code generation process to both a protected random-number seed and a current time and by controlling the distribution of the seed.

For the pulse burst illustrated in FIG. 10, both $n_i$ and sgn(f(i)) are determined by the random-number generator and random-number seed. The phase reversals are indicated by the Gaussian envelopes being above or below the x-axis. A typical number of fundamental pulses in a pulse burst is expected to be in the order of one hundred or more, rather than the five shown.

The choice of codes can be constrained to further reduce the detectability of the broadband signals by conventional receivers. For example, if one-half of the modulation pulses are chosen to have opposite polarity or sign from the other half, then the net excitation of any narrowband system resulting from fundamental pulses having any single polarity is very small. "Narrowband," as described herein, refers to bandwidths that are comparable to, or less than, the reciprocal of the pulse burst duration. This attenuation in response occurs because the integrated excitation in the response time of the narrowband system is approximately zero.

A code design that determines the timing of the fundamental pulses, the number of the fundamental pulses in each pulse burst, and the polarity of each fundamental pulse should possess four primary characteristics: (i) a strong primary autocorrelation peak for accurate arrival time determination, (ii) a low cross correlation with other codes that might be in use by multiple remote transmitter devices operating in the same area, were that desirable, (iii) minimal excitation of other receivers, and (iv) minimal sensitivity to interference. A random pulse position approach is effective in providing the first two characteristics. Furthermore, Gaussian doublets enhance performance and reduce sensitivity to interference.

2.3 Detection Algorithm

A correlation detector can be associated with each base receiver device 68. A correlation detector employs a reference copy of the transmitted broadband signal for detection of the transmitted broadband signal at the base receiver device 68. This is a standard method which has been studied extensively in communication and radar theory. The correlation detector can be implemented by taking the product, using analog or digital techniques, of the received electromagnetic radiation, which also can contain noise and interference, with the reference copy of the transmitted broadband signal, adjusted for the pulse-burst transmission time 97 and the propagation delay 104 and instrumental time delays. The power of the output pulse 110 generated by the correlation detector is maximized when the reference copy is correctly adjusted in time to match the received transmitted broadband signal. Referring to FIG. 4F, an unknown propagation delay 104 can be determined by searching for the time at which the output pulse 110 occurs. The ratio of maximum signal to the average noise fluctuation at the correlation detector output, also known as the signal-to-noise ratio (SNR), is well known and defined by the equation, $$SNR_{out} = \frac{2E}{N_0}.$$

Here E is the total energy (Joules) in the received signal, while $N_0$ is the power spectral density of the noise (Watts/Hz) at the input of the receiver device. Although subject to broad assumptions regarding the structure of the noise, this formula is completely general with respect to the form of the signals. For broadband signals mixed in white noise, which is typical of receivers and natural emissions, the correlation detector provides the maximum possible output SNR. For other noise statistics this result and the form of the optimum detector are modified to some extent. The effects of interference should also be considered.

The SNR depends on the energy of the received signal and not on the particulars of the waveform. The total signal energy is that of the overall waveform of the broadband signal, or the sum of the energy in each of the individual fundamental pulses 78 forming the pulse burst 91 of the broadband signal 92. Thus, for N fundamental pulses in a pulse burst, the SNR at the output of the correlation detector is N times that of the SNR of a correlation detector tuned to detect a single fundamental pulse. That is, the correlation detector gain is N. The number of "slots" available for the code and the number of slots actually occupied should be distinguished. N is the number of occupied slots.

The correlation gain associated with use of the coded waveform provides a low-interference attribute of the ICLT system. By careful system design balancing transmitter power, antenna gain(s), and noise for a particular implementation, the SNR can be adjusted so that the individual transmitted fundamental pulses 91 are below the average level of the noise except in the immediate vicinity of the remote transmitter device 62. For example, for an ILT system designed to operate between small flying vehicles, where, for small vehicles, the antenna gains are assumed to be near isotropic, at ranges of approximately 160 km, the individual transmitted fundamental pulses would be below the average noise level at all ranges greater than about 15 km and would create no detectable interference in another receiver of sensitivity equal to that of the base receiver device without knowledge of the code.

By employing properly designed codes, the correlation detector output drops to very low levels for any mismatch, or misregistration, of the received broadband signal with the reference copy of the broadband signal. Observation of the output pulse 110 then is a measure of the registration between the two broadband signals.

For cases in which the arrival time 111 of the transmitted broadband signal is uncertain, the correlation detector can be used to determine the arrival time to an accuracy on the order of the duration of the individual fundamental pulses in the pulse burst. By use of suitable algorithms on the digitized version of the received broadband signal, this accuracy can be improved to about 5% of the individual fundamental pulse durations. For a 1 nsec individual fundamental pulse duration, this is equivalent to a distance accuracy of about 0.6 inches.

2.4 Synchronization

Successful detection of the received pulse burst by correlation detection requires synchronization to an accuracy that is a fraction of the duration of the individual fundamental pulses within the pulse burst, which is about 1 nsec for the example above. The correlation function of the Gaussian waveform, for example, drops by more than 4 dB for an offset or misregistration of 0.5 e-folding widths, or 0.5 T in the example waveform, and is down by over 20 dB for an offset of 1.5 e-folding widths. So, for T=1 nsec, the correlation shift should be well within 1 nsec of the correct registration for the output pulse 110 to be observed.

The need to avoid a fine scale (nanosecond) search over large time intervals requires i) precise synchronization of broadband transmitter element 66 and broadband receiver element 68 to an accuracy of the order of the duration of the individual fundamental pulses, and ii) knowledge of the pulse-burst transmission time 97. The combination of synchronized broadband transmitter element and broadband receiver element, knowledge of the pulse-burst transmission time 97, and the observed arrival time 111 permits the determination of the separation distance 106.

Synchronization of broadband transmitter element 66 and broadband receiver element 68 in a preferred embodiment of the ILT system 60 can be achieved by use of GPS timing signals. This time is accurate to about 50 nsec when using the GPS clear/acquisition code with selective availability in use. Thus for broadband transmitter elements and broadband receiver elements separated by a known distance, i.e., zero error due to range uncertainty, and using independent GPS synchronizing receivers, it could be necessary to search a 100 nsec time window in order to achieve a correlation match.

In the case of an unknown separation distance 106, an additional interval representing the uncertainty in the propagation delay 104 should be searched. Propagation between the remote transmitter device 62 and the base receiver device 64 delays receipt of the broadband signal 92 by the time of flight of the broadband signal. This delay is 1 $\mu$sec for each 300 meters or approximately 1000 feet of distance between broadband transmitter element 66 and broadband receiver element 68. It is readily feasible to search for correlations over reception search windows 108 up to 0.1 to 1 millisecond in duration, corresponding to range uncertainties of 30 to 300 kilometer. But this is unlikely to be necessary in practice. For example, if the ILT system 60 is used in tandem with radar range finders, initial range estimates from radar tracking of targets will be accurate to a kilometer or better, or about a 3 $\mu$sec time uncertainty.

Figure 11:
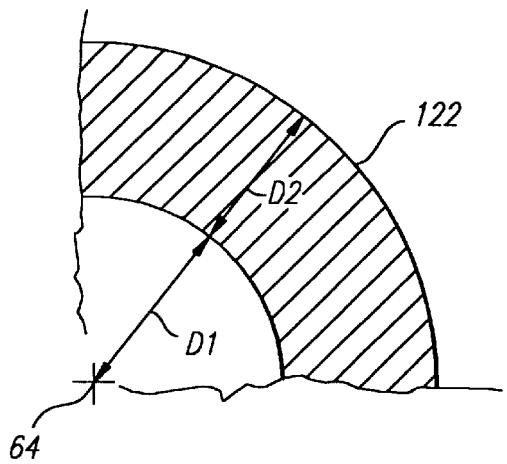
FIG. 11 is a diagram illustrating the geometry used by a base receiver device in applying synchronizing principles to monitor broadband signals from remote objects located in a predetermined region.

Referring to FIG. 11, an annular fence 122 that has a range depth D2 of, for example, 10 km can be used to monitor the status of vehicles approaching a protected area. The annular fence begins at a distance D1 from the base receiver device 64.

Once an initial pulse burst has been detected, the reception search window 108 for tracking can be reduced markedly, to that of the maximum possible change in range 106 in the interval between transmission of pulse bursts. After two pulse bursts have been detected, the rate of change in range 106 can be predicted and the reception search window 108 reduced further. In practice, the remote transmitter device 62 and base receiver device 64 will usually be using the same GPS satellite constellation, so that synchronization errors will be common mode if the full GPS capability is not used. Under most circumstances, use of a single frequency GPS system would provide adequate synchronization.

2.4.1 Synchronization After Loss of GPS Signal

In the event that either remote transmitter device 62 or base receiver device 64 loses its GPS synchronization signal, time can be kept by a local oscillator clock. Such a clock will be subject to error which depends on the quality of the oscillator. For example, an oscillator drift of one part in $10^{-9}$ would have an error of up to 1.2 $\mu$sec after 20 minutes of operation without correction. For many ILT applications, this would be an acceptable error. If either the remote transmitter device or the base receiver device is stationary, the reception search window can be adjusted to provide adequate margin for error on a continuous basis, and the system can remain synchronized.

2.4.2 Recovery After Loss of GPS Signal and Loss of ILT Contact

If, for example, a helicopter with a remote transmitter device, which has lost its GPS signal, goes out of line of sight to the base receiver device, the base receiver device can reacquire the remote transmitter device when it returns to line of sight. By knowing the drift rate limit of the remote transmitter device's oscillator, and the geometric limits of the helicopter's possible location, the base receiver device can calculate an enlarged reception search window within which the helicopter's signal would be if it is transmitting in line of sight. How fast this reception search window grows depends on the application, but many cases it will be modest.

In general, increased uncertainty in arrival time 111 leads to increased processing requirements, with 100% duty cycle being the limit. Foreseeable technology advances may make 100% duty cycle practical.

2.5 Data Transmission

Successful detection of a broadband signal by the broadband receiver element 68 is evidence that a valid code was used by broadband transmitter element 66 in generating the broadband signal. This can be considered as receipt of a single bit of information, namely that the remote transmitter device used, and therefore had access to, the code, and secondarily, that the remote transmitter device knew the planned pulse-burst transmission time 97. For air traffic control applications this is sufficient to identify the transmitter.

More complex messages can be transmitted by use of different codes to represent different message symbols. For one implementation of a binary transmission system, two codes are used, one to represent binary "1," and a second to represent binary "0."

There are a wide variety of digital codes and protocols that can be used to provide more complex digital communications. Different codes can be used for different messages. Two or more distinct phases can be applied to different fundamental pulses in each pulse burst. Pulse position coding can be used in which a transmission represents binary 1 while the absence of a transmission represents a binary 0. The presence or absence of a transmission at a predetermined time could be used to signal binary '1' and '0' by choosing the second code to be the null code. Pulse position coding can be used where a pulse interval has an integer value. Pulse power modulation can also be used where the transmitted power of the transmitted pulse burst indicates some digital value. These protocols, or combinations of them, offer different capacities and rates and different processing costs, etc.

2.5.1 Code Divisibility

Correlation is a linear process, so that the sum of the correlations is the correlation of the sum. A single base receiver device 64 can detect broadband signals from multiple remote transmitter devices 62, each remote transmitter device using a different code, by correlating the received broadband signals against the sum of the codes. Similarly, by transmitting a broadband signal 92 generated by the sum of several codes, a remote transmitter device 62 can send broadband signals to a number of base receiver devices 64, each of which may be in possession of one code.

This code divisibility has a number of consequences. Broadband signals can be transmitted to or denied to a particular population of base receiver devices merely by suitable selection of codes in the remote transmitter device. Many separate communication channels can be established by the use of many different codes.

Similarly, since there are very large numbers of codes available, message communication can be accomplished by assigning meanings to a large vocabulary of codes which the remote transmitter device can combine to form messages.

2.5.2 Exemplary Use of Code Division

Assume that a single code has M time slots, of which N will be filled with fundamental pulses 78 (N≅[M/10]), and each time slot is T seconds in duration. A typical value of T might be 3 nsec. If the transmitted broadband signal is the sum of, for example, 50 separate codes, each code selected from a vocabulary of 100 codes, and each offset in time by a delay of 10 T from the one before, then the resulting broadband signal can be interpreted as a fifty digit number to the base 100. There are $100^{50} = (10^2)^{50} = 10^{100}$ such combinations. Because $2^{3.322} = 10$, such a broadband signal encodes 332 bits of information.

If M=1000 and T=3 nsec, then a single code duration will be 3 μsec, and the 50-place sum will extend it by 500 nsec for a total duration of 3.5 μsec. During the transmission, this is a bit rate of about $10^8$ bps.

Since this example signal is the sum of overlapping codes, the amplitudes of the resulting fundamental pulses are multiples of the individual fundamental pulse amplitudes. This can lead to total amplitudes higher than can be produced by available prior art solid state amplifiers of the desired bandwidth. An approach to this problem is to use a power-limited sum of codes, in which the magnitude of the resulting fundamental pulses is limited to some small integral multiple of the individual code amplitude.

Power-limited addition is not linear, so the individual code correlations are reduced from the individual code correlations against a simple, i.e., not power-limited, sum of codes. Simulations for cases of M/N≅10 and delay of 10 T show reductions of typically 1 or 2 dB, so the power-limited technique appears to be a practical use of code division to encode messages in ILT signals.

2.6 Time of Arrival

It is important to accurately estimate the arrival time 111 of the broadband signal comprising a number of synchronized fundamental pulses, with each fundamental pulse contained within a Gaussian envelope. After the base receiver device correlates the broadband signal, all the energy of the broadband signal is contained within a single fundamental pulse contained within a Gaussian envelope having twice the duration of the individual fundamental pulse Gaussian envelope. Assuming a 16 dB SNR in the correlation detector output and an output Gaussian envelope having time constant T, the arrival time of the broadband signal can be estimated with sigma <0.02 T. Assuming a Gaussian-enveloped broadband signal having time constant T and an amplitude "a," at some unknown arrival time $t_A$, the general expression for the Gaussian envelope of FIG. 6 is, $$s = ae^{\left[-\frac{1}{\sqrt{2}}\left(\frac{t-t_A}{\frac{T}{2}}\right)^2\right]}.$$

Without loss of generality, let T and "a" be unity. It is desired to find the time at which the envelope is maximum.

In real systems, the envelope is corrupted by noise. In this section of the description, the noise-free case is considered first, then the effects of noise are considered, and finally the arrival time $t_A$ is considered.

2.6.1 Noise Free Case

The Gaussian envelope will peak at the arrival time $t_A$. So, for example, let $t_A=3$, then, $$s = ae^{\left[-\frac{1}{\sqrt{2}}\left(\frac{t-3}{\frac{T}{2}}\right)^2\right]}.$$

Figure 12:
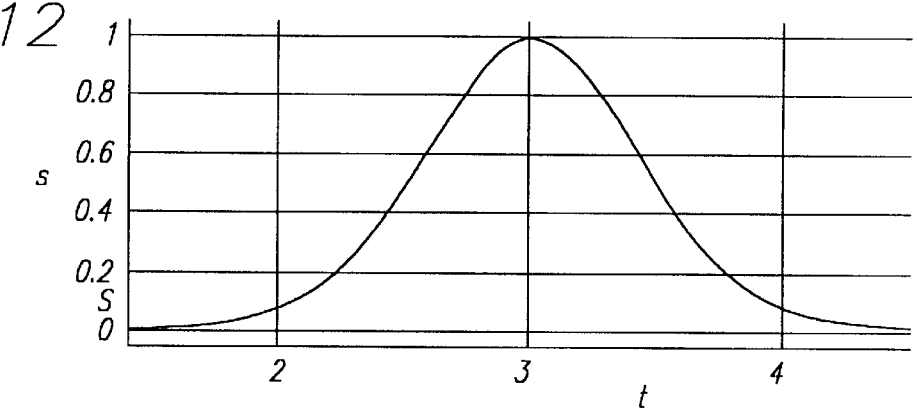
FIG. 12 is a graph illustrating signal strength as a Gaussian envelope.

For the Gaussian curve that peaks at time $t_A=3$, as illustrated in FIG. 12, at a peak value of a=1, the pulse duration at half amplitude is T=1. In the base receiver device 64, the signal is sampled at equal time intervals Δt. An estimator of $t_A$ which is independent of the received amplitude "a" is needed. To estimate $t_A$ consider the ratio of the sample at t vs. the sample at t+Δt, $$S_t = ae^{\left[-\frac{1}{\sqrt{2}}\left(\frac{t-t_A}{\frac{T}{2}}\right)^2\right]}$$

$$S_{\Delta t+t} = ae^{\left[-\frac{1}{2}\sqrt{2}\left(2\frac{\Delta t+t-t_A}{T}\right)^2\right]}$$

$$\text{ratio} = r = \frac{S_{\Delta t+t}}{S_t}.$$

Substituting, $$r = e^{\left[-\frac{1}{2}\sqrt{2}\left(2\frac{\Delta t+t-t_A}{T}\right)^2 + \frac{1}{2}\sqrt{2}\left(2\frac{t-t_A}{T}\right)^2\right]}.$$

Simplifying, and solving for $t_A$, $$r = e^{\left[-2\frac{\sqrt{2}\Delta t^2}{T^2} - 4\frac{\sqrt{2}\Delta tt}{T^2} + 4\frac{\sqrt{2}\Delta tt_A}{T^2}\right]}.$$

Collecting, $$r = e^{\left[2\frac{\sqrt{2}(-\Delta t - 2t + 2t_A)\Delta t}{T^2}\right]}.$$

Isolating, $$t_A = \frac{1}{2}\left(\frac{1}{4}\frac{\sqrt{2}\,T^2 \ln(r)}{\Delta t} + \Delta t + 2t\right).$$

$\Delta t_A$ is the time difference between the initial sample at time t and the correct arrival time $t_A$, expressed as, $$\Delta t_A = t_A - t.$$

Isolating $t_A$ from the above equation, $$t_A - t = \frac{1}{8}\frac{\sqrt{2}\,T^2 \ln(r)}{\Delta t} + \frac{1}{2}\Delta t$$

$$\Delta t_A = \frac{1}{8}\frac{\sqrt{2}\,T^2 \ln(r)}{\Delta t} + \frac{1}{2}\Delta t$$

$$\Delta t_A = \frac{1}{8}\frac{\sqrt{2}\,T^2 \ln(r) + 4\Delta t^2}{\Delta t}.$$

Thus, $\Delta t_A$ is expressed in terms of the ratio and known parameters $\Delta t$ and T. In the noise-free case, only samples near the peak of the envelope have values significantly greater than 0. This limitation constrains the range of considered ratios. For example, if the sampling interval $\Delta t$ is half the pulse duration T, then the two samples nearest the peak will have a ratio in the interval 0.5 through 2.0. This is because the Gaussian envelope is half its peak value at times +T/2 or −T/2 from its peak time. Samples more than T from the peak have small values, so that any sampling error and any noise produce large errors in the ratio. While $\Delta t$ and T are selected independently, it is necessary to have two adjacent samples sufficiently above the noise to provide a reliable ratio. Normally the sampling rate is a limiting factor on the design, so there is a tradeoff between sampling rate and reliability of the ratio r. Having at least two samples within T/2 of the peak is a reasonable compromise. For this reason, and for clarity, it is convenient to define, $$\Delta t = \frac{T}{2}.$$

Substituting this into the equations for $t_A$ and $\Delta t_A$ above, $$t_A = \frac{1}{4}\sqrt{2}\,T\ln(r) + \frac{1}{4}T + t$$

$$\Delta t_A = \frac{1}{4}(\sqrt{2}\,T\ln(r) + T).$$

Figure 13:
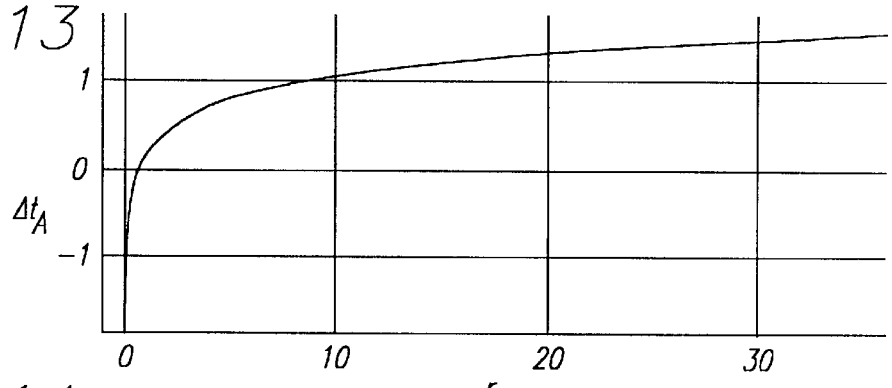
FIG. 13 is a graph of a typical $\Delta t_A$ vs. r.

$\Delta t_A$ therefore depends only on r and T. Using the assumption above that T=1 allows a graph FIG. 13 plotting $\Delta t_A$ versus r. By simplifying, $$\Delta t_A = \frac{1}{4}(\sqrt{2}\ln(r) + 1).$$

Figure 14:
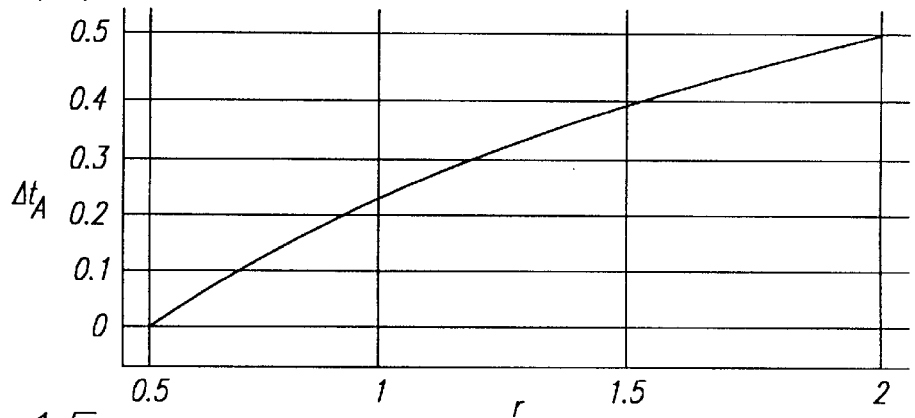
FIG. 14 is a graph similar to FIG. 13, except that the range of r is limited from 0.5 through 2.0.

Again, only values of r near the peak have a sufficient SNR to be reliable. Restricting the above curve to a range of 0.5 to 2.0, $\Delta t_A$ is plotted in terms of r in FIG. 14. In the noise-free case, therefore, the expression for $\Delta t_A$ can be used to find the time of the true peak. In FIG. 14, where the sampling interval is assumed to be 0.5, when r=0.5, $\Delta t_A = t_A - t = 0.5$, and $t_A$ is the current time plus 0.5. For r=1, i.e., both values are equal, the peak occurs 0.25 after t.

2.6.2 Errors due to Noise

A sound system design will plan for about 16 dB of SNR at the peak. This is a factor of 40, so that a sample at the peak is expected to have a noise component whose sigma is 1/40 of the peak value, a. In the absence of an analytical expression for the expected error in observed r, r has been simulated. In this simulation, SNR=40, and the variance of r was observed for 100 trials each for values of t on the interval $t_A - T/2$ to $t_A$. The observed $\sigma(r)/r$ values were between 0.04 and 0.05. Outside of that interval, $\sigma(r)/r$ is higher.

Defining $\Delta t_{A1}$ and $\Delta t_{A2}$ to reflect the expected plus and minus error in r, $$\Delta t_{A1} = \frac{1}{4}(-[-\sqrt{2}\,]T\ln(r \times 1.05) + T)$$

$$\Delta t_A = \frac{1}{4}(\sqrt{2}\,T\ln(r) + T)$$

$$\Delta t_{A2} = \frac{1}{4}(-[-\sqrt{2}\,]T\ln(0.95r) + T).$$

Figure 15:
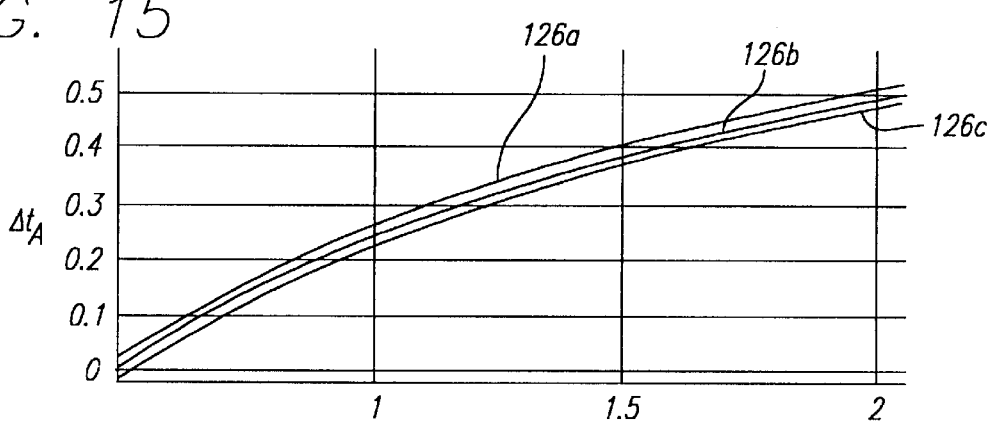
FIG. 15 is a typical graph plotting $\Delta t_A$ vs. r over the same range as FIG. 14 including positive and negative error.

These values are close to the correct $\Delta t_A$, as shown in FIG. 15, where $\Delta t_{A1}$, $\Delta t_A$, and $\Delta t_{A2}$ are plotted as curves having reference numerals 126a, 126b, and 126c, respectively. In fact, the difference is constant. Let, $$\epsilon = \Delta t_{A1} - \Delta t_A.$$

Then substituting the formulas results in, $$\varepsilon = -\frac{1}{4}(\sqrt{2}\,T\ln(r) + T) + \frac{1}{4}(\sqrt{2}\,T\ln(1.05r) + T).$$

Simplifying, $$\varepsilon = \frac{1}{4}\sqrt{2}\ln(1.05)T.$$

Calculating, $$\epsilon = 0.01725\,T.$$

Thus the error expected, $\epsilon$, is less than 2% of the pulse duration T.

2.7 Range Measurement

Measurement of the arrival time of a broadband signal, by determining the time corresponding to the correlation detectors output pulse, can be used to compute the range 106, (see FIG. 2), between the broadband transmitter element 66 and the broadband receiver element 68. This is accomplished on the basis that the time of flight or propagation delay 104 from the broadband receiver element is known, or can be computed, by the base receiver device so that the time of flight of the broadband signal can be calculated. From the time of flight of the broadband signal, the range 106 from the broadband transmitter element to the broadband receiver element can be calculated by multiplying the time of flight by the velocity of the signal, which is usually the speed of light. Errors in range measurement arise from atmospheric propagation rate error, synchronization error, and instrumentation error in the remote transmitter device and base receiver device. Transmitter instrumentation error and propagation rate error can be ignored. Instrumentation error in the base receiver device, mainly time of arrival measurement error, adds less than one inch of range error. Given the 50 nsec GPS clock accuracy, the corresponding range accuracy is about 15 meter.

A sequence of range measurements can be used to establish a track of the relative trajectory of the broadband transmitter element 66 with respect to the base receiver device 64 or to locate a stationary base receiver device.

2.8 Direction Finding

Figure 16:
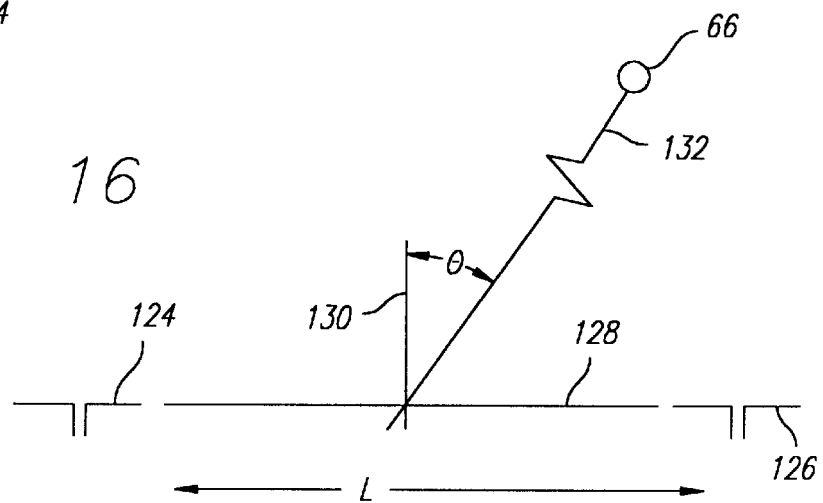
FIG. 16 is a diagram illustrating the geometry used with two broadband receiver antennas to determine the direction of arrival of a broadband signal.

As illustrated in FIG. 16, if the base platform 65 has two or more broadband receiver antennas 124, 126 separated by a distance L, then an angle $\theta$ to the broadband transmitter element 66 can be determined. This angle $\theta$ is determined by the difference in arrival time 111 of the broadband signal at two or more broadband receiver elements. This difference in time of arrival is caused by the difference in the time of flight 104 of the broadband signal from the broadband transmitter element to each respective broadband receiver element. The accurate measurement of the relative range 106 between a broadband transmitter element 66 and two or more broadband receiver elements 68, or, alternatively, two broadband receiver antennas shared by a single broadband receiver element, provides an accurate relative direction measurement of the broadband transmitter element 66 and the broadband receiver elements 68. This direction finding is characterized by defining a baseline 128 that extends between the two broadband receiving antennas 124, 126. A perpendicular 130 is perpendicular to the baseline 128. A ray 132 extends from the point at which the baseline 128 intersects the perpendicular 130 to the transmitting broadband antenna. For a single baseline between two antennas, the angle, $\theta$, of the broadband transmitter element 66 from the perpendicular 130 to the baseline 128 is given by, $$\sin\theta = \frac{c\Delta t}{L}$$

where $c\Delta t$ is the product of the speed of light and the difference in times of arrival, and L is the baseline separation. The geometry is defined below.

In FIG. 16, the sign of $\theta$ is ambiguous with respect to $\pi$, i.e., with respect to the angle of arrival from above or below the baseline 128. The ambiguity can be resolved on the basis of ancillary data from other sensors, from the change in $\theta$ while maneuvering, or by use of a third antenna forming distinct baselines with respect to the first.

In employing the differential time of arrival to sense direction, the time resolution of measurement of the pulse envelope is directly related to the accuracy at which the angle $\theta$ can be measured, provided a fixed baseline. This accuracy can be improved by use of the differential phase of the center frequency between the two separated antennas. The expression for the angle $\theta$ is the same as above with $\Delta t$ interpreted as the differential time corresponding to the phase difference observed. The ambiguities at the cycle level of the phase measurement would be resolved from the envelope measurements. The use of multiple antennas additionally increases the received SNR by the number of antennas employed, assuming that they are phased for maximum response in the direction of remote transmitter device.

2.9 Link Calculations

In this section, background noise to establish basic system characteristics is considered.

Signal levels for receivers can be calculated from the Friis equation. Correlator output SNR can then be determined from the formula for matched filters, above. The Friis Equation can be written in terms of the transmitting and receiving antenna gains, $G_t$ and $r^G$, respectively, the separation distance or range 106 between transmitter and receiver, R, and the wavelength, $\lambda$. So $$P_r = \frac{P_t G_t G_r \lambda^2}{(4\pi R)^2}$$

where $P_t$ and $P_r$ are the received and transmitted power levels. Strictly speaking, the Friis equation applies to monochromatic signals for which there is a single wavelength. Here, for broadband constant gain antennas, this equation implies an emphasis of the lower frequency components of the waveform. In practice this likely can be neglected, or if necessary, compensated by waveform design and shaping in the transmitter or receiver, by antenna design, or a combination of the these techniques.

As indicated above, the SNR at the output of the correlator, $SNR_{out}$, depends on the total energy received, E, and the system noise power spectral density, $N_0$. For a burst of N gated pulses each of duration T, the total energy in the received signal is, $$E = NP_r T$$

while the power spectral density of the receiver noise is, $$N_0 = kT_{sys}$$

where $k = 1.38 \times 10^{-23}$ Joules/Kelvin Boltzman's constant, and $T_{sys}$ is the system temperature. The SNR becomes, $$SNR_{out} = \frac{2N(P_t T)G_t G_r \lambda^2}{k(T_{sys}(4\pi R))^2}.$$

The 'length' of a pulse burst, N, together with the individual pulse energy, $P_t T$, allows adjustment of the waveform for the maximum range at which the raw signal-to-noise ratio of individual pulses exceeds a specified noise level.

Figure 17:
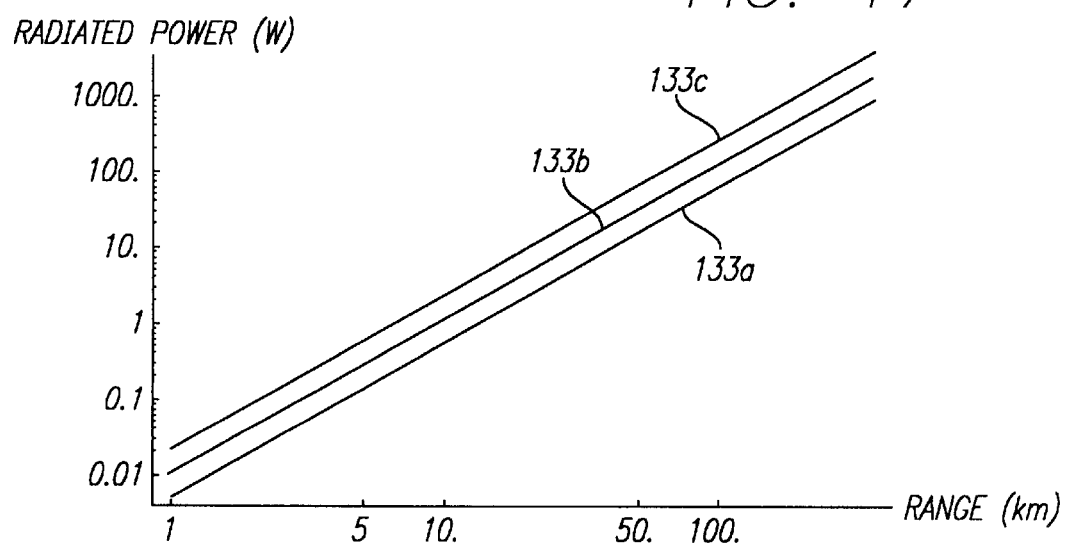
FIG. 17 is a typical radiated power vs. range graph, where the antenna gain is 0 dB.

Power levels for operation at various ranges can be calculated with $SNR_{out}$ as a parameter. As an example, these values for the parameters are assumed: N=128, T=$10^{-9}$ sec, G=$G_r$=1 (i.e., 0 dB), $\lambda$=0.1 m, and $T_{sys}$=300°K. The basic pulse here corresponds to the gated cosine of 1 nsec duration or, for example, a Gaussian as defined above with the same effective power and a 1 nsec duration between e-folding points in power. With these choices, $$P_t = \frac{SNR_{out}(4\pi R)^2 kT_{sys}}{2NTG_tG_r\lambda^2} = \frac{SNR_{out}(4\pi)^2 1.38\times 10^{-23}\times 300 R^2}{2\times 128\times 10^{-9}\times 1\times 1\times 0.1^2}$$

which is plotted in the FIG. 17 graph for three values of $SNR_{out}$=20:1 illustrated as 133a, 40:1 illustrated as 133b, and 80:1 illustrated as 133c. For transmitter and receiver gains of 5 dB the desired power is reduced by a factor of 10.

Figure 18:
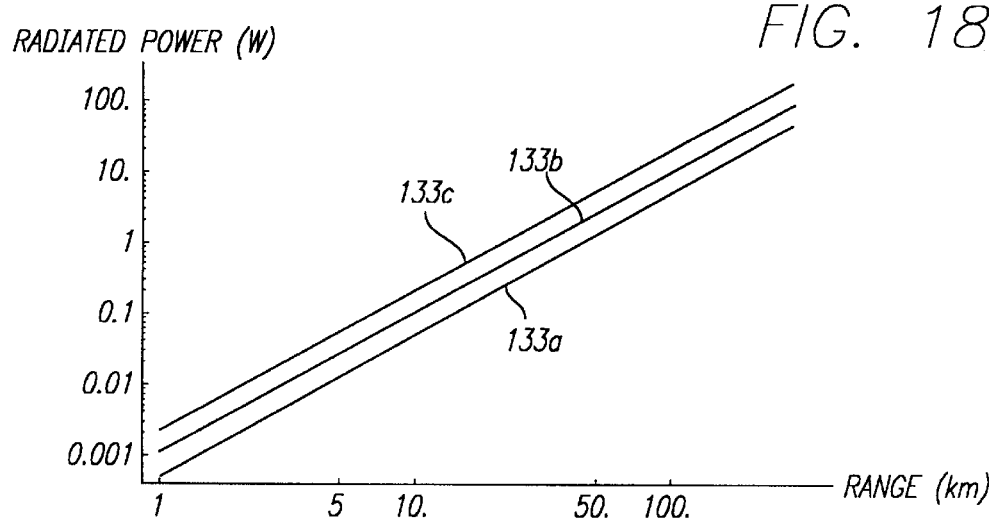
FIG. 18 is a graph similar to FIG. 13, except that the antenna gain is 5 dB.

Curve 133b of FIG. 17 corresponds to $SNR_{out}$=40, or 16 dB. This value of SNR provides a probability of detection of about 99.95%, for a false alarm rate of less than $10^{-6}$. Similarly, the lowest curve 133a corresponds to $SNR_{out}$=20, or 13 dB, which provides a lower probability of detection of about 99.5% for a false alarm rate of about $10^{-3}$. This suggests that a reasonable choice for $SNR_{out}$ is in the range of 13 to 16 dB, depending on the tracking algorithm employed. For ranges of 200 km and $SNR_{out}$=16 dB, the peak transmitter power is between about 40 and 400 w. for antenna gains between 5 and 0 dB. The average transmitter power is much lower since the actual transmission time duty cycle is very low. In the example of a code of length N=128 occupying a 1 $\mu$sec time window the duty cycle for the transmission of a pulse burst is 128/1000=0.128, or about 13%. If a single pulse burst is radiated each second, then the overall duty cycle is $0.128\times 10^{-6}$, corresponding to about 5 $\mu$w for 40 w peak power, or 50 $\mu$w for 400 w peak power. In either instance, the average radiated power is extremely low, and the peak powers are within the capability of existing technology. FIG. 18 is a graph similar to the graph of FIG. 17, except that the antenna gain equals 5 dB.

2.10 Doppler Sensitivity and Frequency Stability

Highly coherent systems utilizing large time-bandwidth product waveforms can be sensitive to small uncertainties in operating frequency. This is not the case for the ILT system, as can be demonstrated by calculation. Consider the need to maintain alignment of the received and reference waveforms in the correlation detector. Assume that the integration time is given by $\Delta T$, and that the tolerable error is $\alpha\delta t$, where here $\delta t$ is a reference time interval and $\alpha$ is a fraction. Assigning the error to a difference in frequency between the received signal and the time base of the correlator gives, $$\Delta f = \frac{1}{\Delta T} - \frac{1}{\Delta T \pm \alpha\delta t} = \frac{\pm\alpha\delta t}{\Delta T^2(1\pm\alpha\delta t)}.$$

It follows that the fractional frequency error is, $$\frac{\Delta f}{f} = \frac{\pm\alpha\delta t}{\Delta T(1\pm\alpha\delta t)} = \frac{|\alpha\delta t|}{\Delta T}.$$

If the frequency difference results from Doppler effects then, $$\frac{f_{Doppler}}{f} = \frac{\Delta f}{f} = \frac{v}{f\lambda} = \frac{v}{c}.$$

Again using values from the ILT example, $\delta t=10^{-9}$, $\Delta T=10^{-6}$, and letting $\alpha=\frac{1}{4}$, corresponding to one cycle at 3 GHz, a pulse burst interval of 1 $\mu$sec, and a fractional tolerance of one quarter cycle, produces, $$\left(\frac{\Delta f}{f}\right)_{critical} = .5\times 10^{-4}.$$

For proper operation, the frequency deviations $\Delta f$ from all sources should be less than this value. The value for the critical fractional frequency shift is several orders of magnitude greater than a typical oscillator's stability, so this is not an issue. For Doppler effects, the maximum permissible relative velocity is approximately 75 km/sec, which is several times escape velocity for the earth and cannot be approached by vehicles in the atmosphere or in earth orbit, for the assumed system parameters. Consequently, system frequency stability and Doppler shifts are not a problem for the ILT system.

2.11 Operation in Areas of Multiple ILT Remote Transmitter Devices

The ILT system 60 described above is robust, and will operate in areas of multiple remote transmitter devices, although this requires an increase in the computational capability of the base receiver device. Depending on the strategy employed and the system requirements, the additional capability could be modest.

The basic correlation detector operates in a linear manner. That is, the correlation detector output when two or more broadband signals are present is the sum of the outputs of each broadband signal received individually. Further, the very high time and range resolution inherent in the use of very short pulse waveforms implies that overlaps, or 'collisions', among separate signals are unlikely. Two remote transmitter devices should be within about 30 cm (1 foot) of the same range from the base receiver device, for this example, for this to occur. Should collisions occur, they are unlikely to persist for flying vehicles. A flight of aircraft in formation with the line of formation perpendicular to the direction to the receiver is one case the broadband signals could drift in and out of the same range. This situation would be immediately recognizable at the base receiver device, however. Thus, even if all vehicles employ the same code, the basic system operation would remain unaffected. The processing capability of the base receiver device must be examined to understand the impact of the additional load.

The impact of the additional load is not very great because the necessity to search a significant reception search window 108 in obtaining the initial correlation is much greater than the additional load to track each new remote transmitter device. Consider a system designed to search initially a 1 millisecond time interval. Once track is established on a particular vehicle, the uncertainty in range is less than $\frac{1}{2}at^2$, where a is the maximum relative acceleration and t is the nominal time between pulse burst transmissions. For a=10 g, and t=5 seconds, this is 1250 meter, or about 8 $\mu$sec in time delay. Thus, less than about 1% of the system capability is used to maintain track. Under typical scenarios, the computational tracking demand probably would be much less than this. A brute force implementation for tracking of multiple remote transmitter devices might be to have the correlation detector search the entire time interval of possible signals each time a pulse burst could be emitted. Again, the particular scenario would dictate the optimum implementation strategy.

It may be desirable to separately identify individual vehicles. In this case different codes could be assigned to each, with the correlation detector testing possible received signal intervals for the proper code. This could require parallel processing for each code, depending on system requirements. Alternatively, the receiver could correlate for the sum or power-limited sum of the sought codes.

For either case, use of single or multiple codes, the code space is adequate to handle very large numbers of remote transmitter devices. Simulation showed that as long as the apparent separation between the ranges of any two remote transmitter devices using the same code is greater than about a fundamental pulse width, which is typically a meter or less, interference between the remote transmitter devices is negligible. A comprehensive analysis of this subject is dependent on the choice of coding algorithm. It is possible, however, to obtain a strict lower bound on the number of remote transmitter devices that might operate in a given area without significant interference. In order to obtain this lower bound, consider the use of time division multiplexing to separate the signals from a given set of operational remote transmitter devices. To quantify this, assume that a single remote transmitter device transmits once each $t_p$ seconds, and that the burst duration is given by $t_{burst}$. Let D be the characteristic diameter of the operations area of interest, bordered by a range annulus of the same size. The geometry is as shown in FIG. 11. For a remote transmitter device located anywhere within the shaded area, the spread in reception time or the time dispersion owing to range variations from the receiver is, $$\Delta T_D = \frac{D}{c}$$

where c is the speed of light, as before. Typically, the repetition interval for pulse bursts from any single remote transmitter device will be much greater than the range dispersion uncertainty, which in turn is much greater than the burst duration, or, $$t_p >> \Delta T_D >> t_{burst}.$$

As a result, pulse bursts can be separated in time of arrival by spacing their absolute time of transmission such that they do not overlap at the base receiver device. Suppose that each remote transmitter device is assigned a time block for transmission, then, $$\Delta T_e = \alpha \Delta T_D$$

where $\alpha$ is a constant greater than one. Then, for intervals $T_p$ between pulse bursts, the equation $$N_{blocks} = \frac{T_p}{\alpha \Delta T_D} = \frac{T_p c}{\alpha D}$$

indicates such time blocks. As an example, let $\alpha=10$, then for the parameters above, $T_p=1$ sec, $c=3 \times 10^5$ msec, $D=50$ km, $$N_{blocks} = \frac{1 \times 3 \times 10^5}{10 \times 50} = 600.$$

That is, the number of remote transmitter devices that can be separated absolutely by time division multiplexing is several hundred, for an operations area of the example size. This calculation represents a conservative worst case and unnecessarily strict lower bound on the number of remote transmitter devices operating in a given area and sharing a common code since, as pointed out above, such absolute separation is not required for reliable operation owing to the linearity of the correlation detector.

A second approach to the question of the capacity of the system to handle multiple remote transmitter devices is consider the number of distinct codes available. For a system employing N pulses per pulse burst, with a is possible M time slots per burst, the number of codes of length N employing 50% sign reversals within the code is, $$\frac{M!}{\left((M-N)!\left[\left(\frac{N}{2}\right)!\right]\right)^2}.$$

Evaluating this expression for M=1000 and N=128, the number of codes is greater than $10^{202}$. Choosing the sign changes entirely at random results in a larger exponent than that given, as compared with forcing an equal number of positive and negative pulse forms.

For the expected value of the cross correlation between any two codes of size and density corresponding to the example values of M, N above is small relative to the maximum autocorrelation. For N greater than several, the law of large numbers applies, and the probability that the envelope of the correlation detector output exceeds the standard deviation by a factor of a is given by, $$P(X > a\sigma) = \sqrt{\frac{2}{\pi}} \frac{\sqrt{M}}{N} \int_0^{a\frac{N}{\sqrt{M}}} \exp\left(-\frac{x^2}{2(N^2/M)}\right) dx$$

where the standard deviation of the product of two randomly generated codes is, $$\sigma(X) = \frac{N}{\sqrt{M}}.$$

This corresponds to different codes for the reference and input. By comparison, the expected value of the output for autocorrelation is, $$E(X)=N.$$

In this example, from the above with N=128, M=1000, four standard deviations is about 16, or 13% of the autocorrelation peak value of 128. For Gaussian statistics, the probability that the cross correlation of two different codes exceeds these values is about $6 \times 10^{-7}$. Thus, even if two pulse bursts occupy the same receive time window, which will be rare owing to the very low duty cycle of the pulse burst, it is unlikely that a randomly chosen alternative code will exceed a level greater than about 0.13 of the expected code for which the correlation detector is set.

The richness of the code space indicated by these calculations indicates that a very large number of adequate codes can be found should it be desirable to assign individual codes or code sequences to individual remote transmitter devices.

Thus, the ILT system can handle very large numbers of remote transmitter devices. First, the range resolution of the fundamental waveform and code can be of the order of a few centimeters. This acute resolution in combination with the basic linearity of the correlation detector allows individual remote transmitter devices to be detected and tracked even when the range separations are of the order of a meter or less. Second, the concentration in time of the pulse bursts, in combination with the low-duty burst repetition rate permits the use of complete time division multiplexing, should that be desirable for operational or other reasons. Third, there is a very large number of individual codes available permitting the use of code division multiplexing. Again, if that were desirable for operational reasons, such as the desire to uniquely identify each transmitter.

The computational capacity of practical detection processors is a more likely limit on the number of remote transmitter devices that can be separated if time separation of the codes (TDMA) or multiple codes (CDMA) are employed. As has been shown, the system capacity using a single code is very high, in which case the processor capacity is not an issue. These questions need careful investigation in terms of system trade-offs of throughput versus volume, mass, power, and cost. However, the capacity to track at least several hundred remote transmitter devices, and quite likely many thousands of remote transmitter devices, simultaneously is readily achievable.

2.12 Multipath Propagation and Scattering Effects

Figure 19:
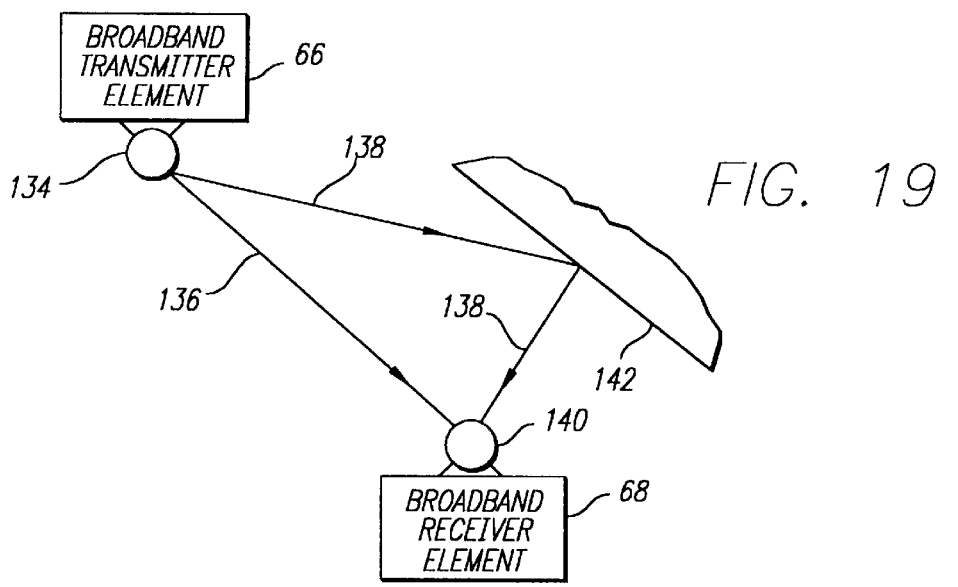
FIG. 19 is a diagram illustrating a multipath situation.

The ILCT system 60 is well-suited for situations involving primarily line-of-sight propagation paths among various terminals. In such cases, the received broadband signals can be modeled as time-delayed and attenuated versions of the transmitted broadband signals. Operations involving vehicles in close proximity to one another or to the ground will result in less ideal conditions involving multipath propagation, as illustrated in FIG. 19. Multipath also can arise from parts of the transmitting vehicle, for example, for certain geometries from reflection by a wing when the broadband transmitting antenna is mounted on the fuselage or the upper part of the vertical stabilizer.

In the case of narrowband systems the effect of multipath can be thought of in terms of mutual interference between two signals of similar characteristics wherein the multipath signal is a usually attenuated, phase-shifted version of the primary signal propagating on the direct signal path.

In multipath signals as illustrated in FIG. 19, both a direct signal 136 and an indirect signal 138, which is shown in two parts including the path prior to and after reflecting off a surface 142, are transmitted by a broadband transmitter antenna 134 that is connected to the broadband transmitter device 66; and both are received by the broadband receiver antenna 140 that is connected to the broadband receiver device 68. In the case of the ILT system, the very high time resolution of the waveform separates the direct and indirect signals in arrival time when the indirect signal path differs in length by more than about 30 cm from the direct signal path, for this example. This is the result of the linearity property of the correlation detector 69, for which the direct and indirect signals appear as distinct waveforms usually of different amplitudes, and separated in arrival time by a multipath delay. If the indirect signal is indistinct, i.e., spread over an interval in time, the correlation detector output will show the same spread in the output pulse. Other than the occasional appearance of false signals introduced by multipath effects, these phenomena should not have any effect of system operation.

In any event, the direct signal always follows the shorter path and is the first signal to arrive at the broadband receiver element 68. Typically, the indirect signal, which arrives later, will also be considerably weaker than the direct signal. Exceptions can occur when the broadband transmitter antenna orientation is such that the direct signal is reduced by antenna pattern effect, while at the same time the illumination of the surface 142 is enhanced. In general, the effects will be similar to those observed with very high resolution radars. One case that can be predicted with some confidence is of an aircraft at low elevations over water or flat terrain, where two closely spaced signals will be received, i.e., the direct signal and indirect signal, from a single broadband transmitter element 66. Such phenomena should be recognizable in operational conditions, for example, on the basis of comparative signal strengths between two or more signals arriving from the same direction.

If system implementation results in the assignment of unique codes to individual broadband transmitter elements, then the presence of multipath signals will be completely unambiguous since there could be only one signal with a particular code.

PART 3: SYSTEM DESCRIPTION OF THE REMOTE TRANSMITTER DEVICES AND BASE RECEIVER DEVICES

This part describes the hardware for one embodiment of the ILT system 60 of FIGS. 1 and 2. The components associated with the remote transmitter device 62 are described first, followed by the components associated with the base receiver device 64. Certain embodiments of the identification apparatus not only identify remote objects, but also locate and track such objects. Many other embodiments are possible, differing in parameters such as frequency, transmit power, antenna gain, etc., and using miniaturized or integrated-circuit components.

3.1 Remote Transmitter Device Components

Figure 20:
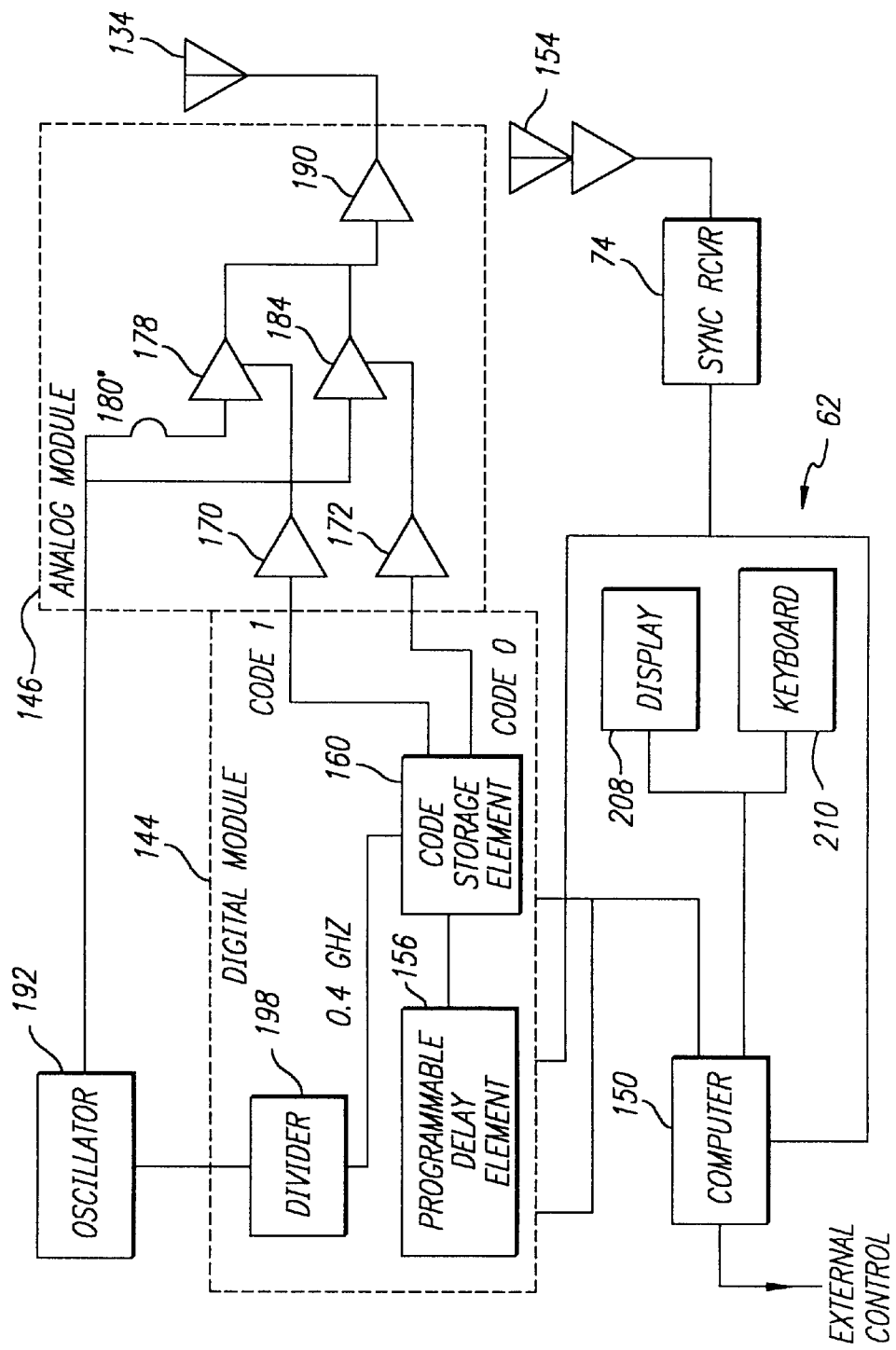
FIG. 20 is a detailed block diagram of the remote transmitter device of FIG. 2.

FIG. 20 is a detailed block diagram of one embodiment of the remote transmitter device 62. The remote transmitter device 62 includes an oscillator 192, a transmitter digital module 144, a transmitter analog or radio-frequency (RF) module 146, the broadband transmitter antenna 134, a processing device, such as a computer 150, the GPS. synchronizing receiver 74, and a GPS. antenna 154. Certain of these components are also illustrated in FIGS. 21 and 22.

Figure 21:
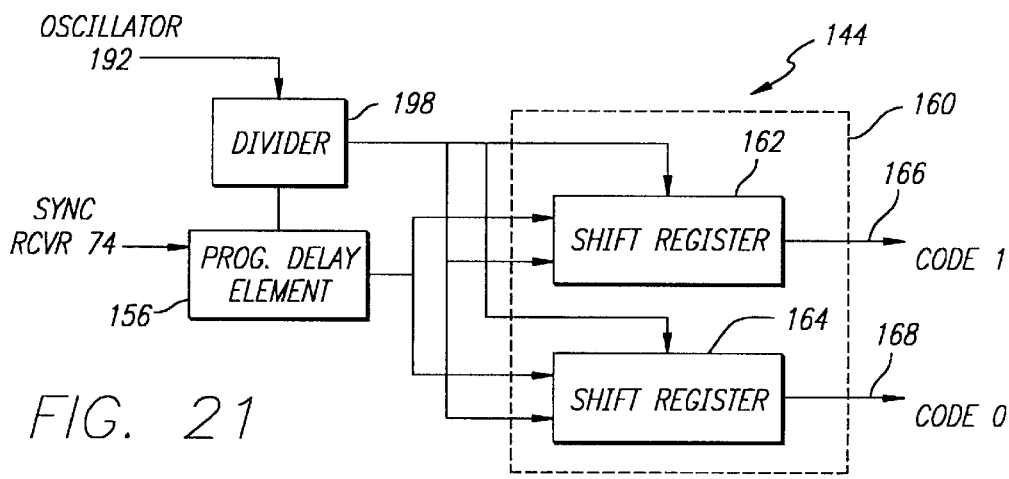
FIG. 21 is a detailed block diagram of the transmitter digital module of FIG. 20.
Figure 22:
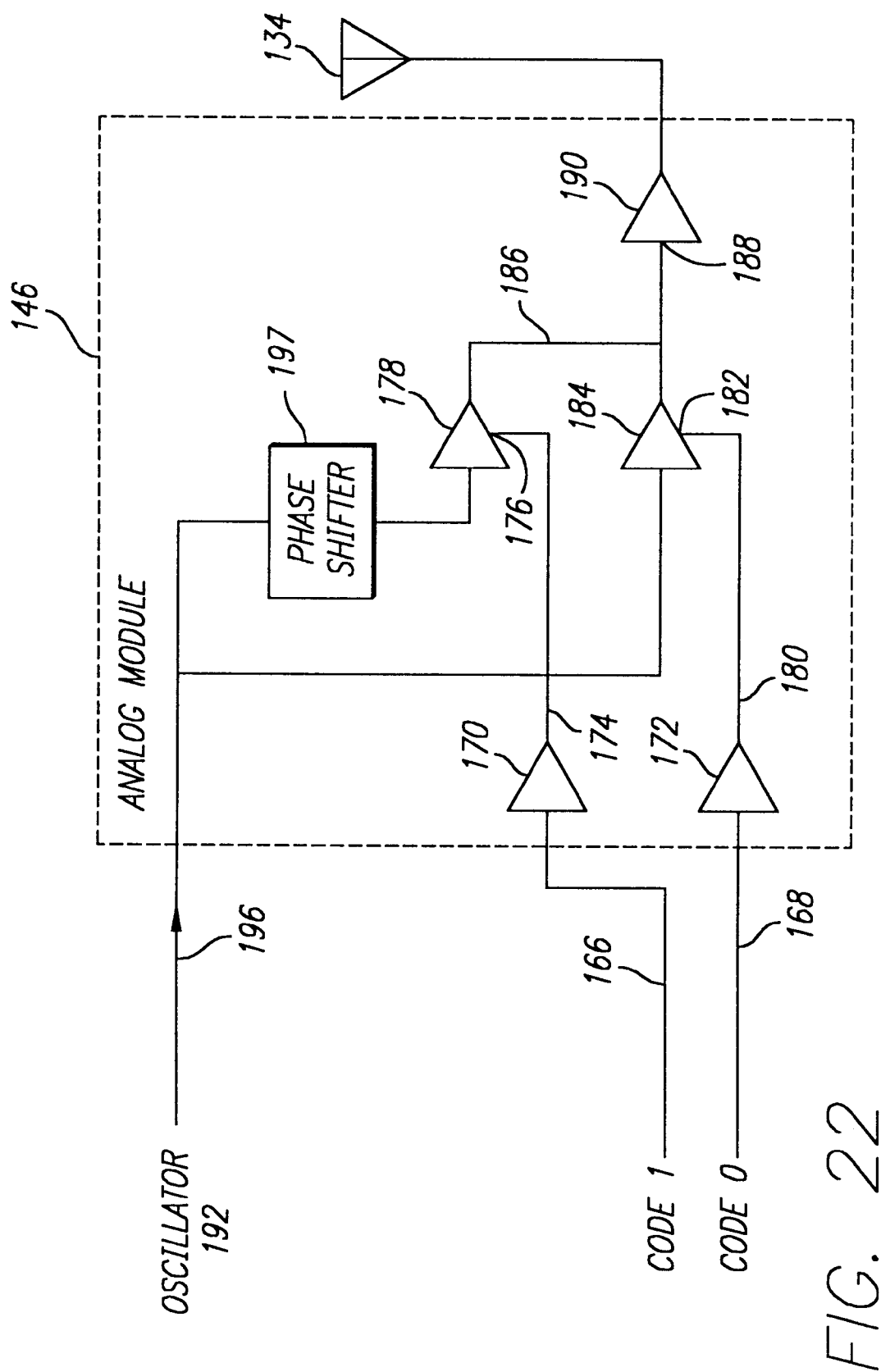
FIG. 22 is a detailed block diagram of the transmitter analog module of FIG. 20.

The transmitter digital module 144, which is illustrated in greater detail in FIG. 21, can be physically incorporated within the computer 150. The transmitter digital module 144 includes a programmable delay element 156, a chip enable element 158, and a code storage element 160.

The depicted code storage element 160 includes two shift registers 162, 164, which store values for the coding processes described above. This embodiment implements the method of FIG. 7, in which a continuous sinusoidal signal 112 is mixed with a series of rectangular pulses 114, to produce a number of short sinusoidal fundamental pulses 78 separated by timed intervals. The shift register 162 of FIG. 21 contains a pattern of ones corresponding to fundamental pulses of phase zero, and zeros elsewhere. The shift register 164 contains a pattern of ones corresponding to fundamental pulses of phase $\pi$, and zeros elsewhere.

Programmable delay element 156 provides a trigger signal to the two shift registers 62,64 to shift their contents out on lines 166 and 168, which are connected to the transmitter analog module 146 (see FIG. 20). These contents trigger one-shots 170 and 172, respectively, which control the duration of the squarewave pulses 144. The squarewave pulses 144 are mixed by mixers 178 and 184 with a sinusoid produced by the oscillator 192. The sinusoid applied to the mixer 178 is delayed by 180°. The two mixed signals are combined and fed to a broadband amplifier 190, which boosts the signal to a desired amplitude and applies the boosted signal to the broadband transmitter antenna 134.

The programmable delay element 156 functions to delay the actuation of the shift registers 162,164 of the code storage element 160, following receipt by programmable delay element of the synchronized reference time 95, (see FIG. 4A), provided by synchronous receiver 74 in response to synchronizing signals 93. The programmed delay element 156 provides the programmed delay 96 as shown in FIG. 4B. After the programmed delay 96, storage element 160 provides CODE 1 and CODE 0 over lines 166,168. The programmable delay element 156 is calibrated to allow for instrumentation delay so that the broadband signal is actually transmitted by a programmed delay 96 after synchronized reference time 95.

The transmitter analog module 146, which is illustrated in greater detail in FIG. 22, receives the codes provided by the shift registers 162,164 of the digital module 144 (see FIG. 21) over lines 166,168, respectively. No portion of the signal transmitted using fundamental pulses of phase 0, created by the shift register 162, is transmitted at the same time as the signal using fundamental pulses of phase π, created by the shift register 164. This is accomplished in software by assuring that no bit position is set to one in both shift registers 162,164.

To control the duration of the fundamental pulses, the transmitter analog module 146 contains one-shots 170,172 for respective shift registers 162,164. An output terminal 174 of the one-shot 170 feeds to a gate terminal 176 of mixer 178, and an output terminal 180 of the one-shot 172 feeds to a gate terminal 182 of mixer 184. In this embodiment, mixers 178,174 are gated amplifiers. A merged output connection 186 applies the merged signals output by the mixers 178,184 to an input terminal 188 of a broadband amplifier 190. The signal output by the broadband amplifier 190 is supplied to the broadband transmitter antenna 134. High quality gallium arsenide transistors are preferably used in the construction of these amplifiers. Oscillator 192 provides a carrier signal that is transmitted over line 196 to a phase shifter 197 and, in turn, the mixer 178. The signal applied to the input terminal 188 of the broadband amplifier 190 thus becomes, $$\text{input power} = \text{code}_1(t) \cos(2\pi f(t)) + \text{code}_0(t) \sin(2\pi f(t))$$

In this manner, two phase-shifted sets of fundamental pulses, which are both sent at prescribed times and with prescribed durations between successive fundamental pulse bursts, are combined to form the desired transmitted broadband signal. Alternatively, if a non-complex waveform is desired, a single code could be used to activate a single mixer, which selectively gates a single sinusoidal input signal, and this signal is input directly into the broadband amplifier 190.

Figures 23, 25:
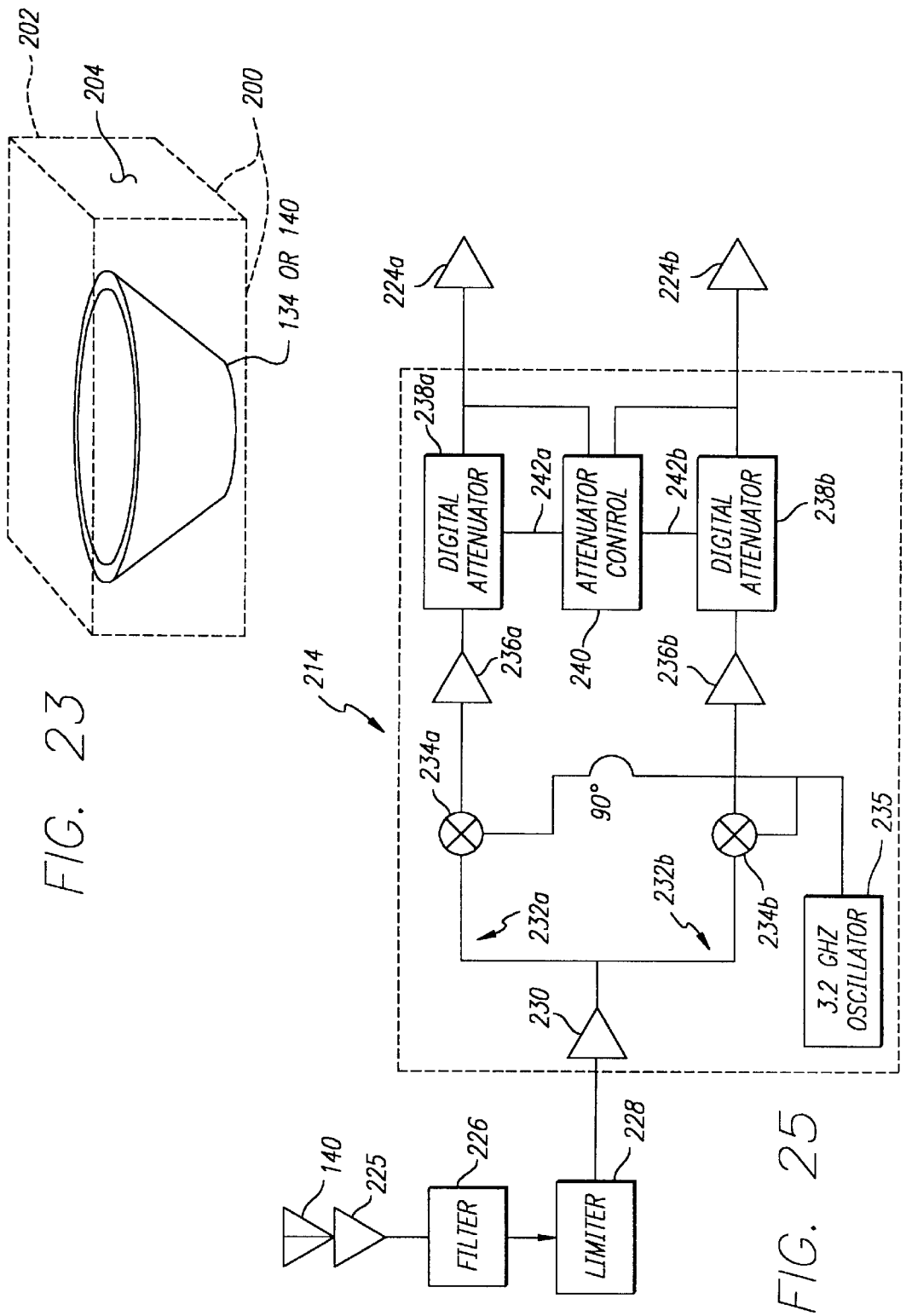
FIG. 23 is a perspective view of one embodiment of a broadband antenna of FIG. 1.
FIG. 25 is a detailed block diagram of the receiver analog module of FIG. 24.

FIG. 23 shows one embodiment of a broadband antenna that can be used either as the broadband transmitter antenna 134 or as a broadband receiver antenna 140. It is a half-bicone type antenna, mounted over a ground plane 200 and encased in a protective foam 202. An outer surface 204 of the protective foam is preferably streamlined and covered with a protective film (not illustrated). The gain of the antenna is approximately 5 dB when mounted on a horizontal conductive plane, and the size of the antenna is approximately three inches across. Alternative antenna structures also can be used.

With reference again to FIG. 20, a processing device, such as a computer 150, controls the remote transmitter device 62. An interface plug provides for a display 208 and keyboard 210, which are used for setup and reprogramming functions. Non-volatile memory is used to maintain the program. Alternatively, for example, to make small transmitters, an embedded computer of a type well known in the art can be used.

The GPS synchronizing receiver 74 that is contained in the remote transmitter device 62 is of the type generally known in the art. The GPS synchronizing receiver interacts with programmable delay element 156 to provide a synchronized clock that can maintain a reference time for an extremely accurately timed signal transmission under two conditions. The first condition arises when the GPS synchronizing receiver is properly receiving the synchronizing signal 93 from the GPS transmitter aboard GPS satellite 81. In this condition, the GPS synchronizing receiver outputs a series of GPS pulses that are indicative of precise times. These GPS pulses are well-known in the GPS art and need not be further detailed herein. The programmable delay element 156 receives the GPS pulses and provides its own extremely accurate pulses to the code storage element 160, to control its timing.

The second condition arises when the GPS synchronizing receiver 74 is not receiving the synchronizing signal 93 from the GPS synchronizing transmitter 70, or alternatively, when the GPS synchronizing receiver 74 is inoperative. In this condition, the GPS synchronizing receiver 74 communicates to the programmable delay element 156 that the output from the GPS synchronizing receiver 74 is not to be relied upon, whereupon the programmed delay element 156 provides timing based on its own internal clock, for example, oscillator 192 and a divider 198 or a clock in the computer. The programmable delay 156 continues to provide its output to the code storage element 160, as described in the prior paragraph, while relying upon the alternate clock. If desired, the remote transmitter device 62 can use a different code, to let the base receiver device 64 know that it is not being synchronized by GPS.

3.2 Base Receiver Device Components

Figure 24:
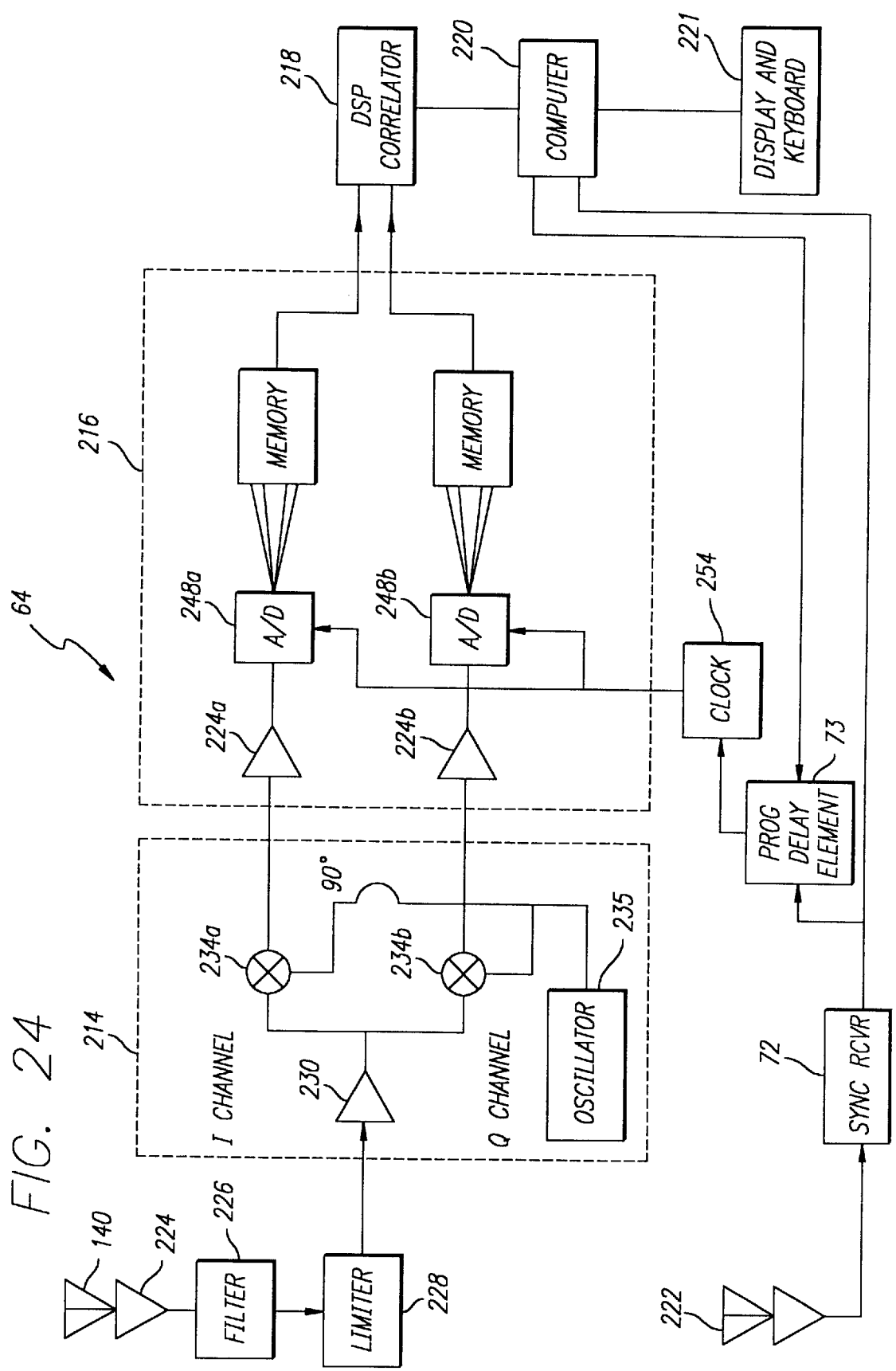
FIG. 24 is a detailed block diagram of one embodiment of the base receiver device of FIG. 2.

FIGS. 24–26 illustrate one embodiment of the base receiver device 64 of the present invention. The base receiver device 64 comprises the broadband receiver antenna 140 with associated signal conditioning equipment, a receiver analog (RF) module 214, a receiver digital module 216, a receiver digital signal processing (DSP) correlator 218, a computer 220, a display and keyboard 221 the GPS synchronizing receiver 72, and a GPS antenna 222.

The GPS synchronizing receiver 72 functions similarly to the GPS synchronizing receiver 74 in FIG. 20, and both use well known technology to set the timing of the base receiver device 64 relative to the remote transmitter device 62. The timing of the base receiver device 64 is maintained by a clock 254 that is set based upon time ticks derived from synchronizing signals 93 from GPS satellites 81. The time ticks are provided by the GPS synchronizing receiver 72 The GPS synchronizing receiver 72 and the programmable delay element 73 can operate under two separate transmitting conditions, as described in section 3.1.

The first condition occurs when the GPS synchronizing receiver 74 associated with the remote transmitter device 62 is being continually reset by GPS synchronizing transmitters 70. In this condition, it can be assumed that the timing of both the remote transmitter device 62 and the base receiver device 64 are closely synchronized, since both use the synchronizing signals 93 from the GPS synchronizing transmitters 70.

The second condition occurs when the GPS synchronizing receiver 74 is unable to accurately receive synchronizing signals 93 from the GPS synchronizing transmitters 70. In this condition, the remote transmitter device 62 should either obtain synchronization from another external source or rely upon its internal clock. The synchronization error will then include error due to the synchronization drift of the internal clock. The base receiver device 64 can accommodate this drift by expanding its reception search window 108 to include the actual broadband signal arrival time 97, including clock drift. For a time interval of 1 second, this expansion would typically be 1 μsec for an inexpensive clock oscillator, and much less for high-quality clock oscillators. Having received the transmitted broadband signal 92, the base receiver device 64 can track the clock's drift, adjusting the reception search window 108 to put the expected arrival time of the next broadband signal 92 in the center of the reception search window. By such tracking, the base receiver device 64 can avoid the need for further expansion of the reception search window.

If the base receiver device 64 has other means for obtaining the range 106 to the remote transmitter device 62, such as radar or triangulation using other ILT base receiver devices, then the base receiver device 64 can estimate the remote transmitter device's clock drift. Multiple base receiver devices can therefore accurately track and locate the remote transmitter device 62 even if the remote transmitter device 62 does not have GPS synchronization, and even if the remote transmitter device 62 has an inexpensive clock providing the time reference.

The broadband receiver antenna 140 can be identical to the broadband transmitter antenna 134 illustrated in FIG. 23. To further process the received overt broadband signal 92, a filter 226, a limiter 228, and a preamp 225 are used. The filter 226 is a broadband filter that limits the reception to the frequency band occupied by the broadband signal 92. The limiter 228 ensures that the equipment downstream of the broadband receiver antenna 140 does not receive a signal of excessive power, which could damage sensitive components. The preamp 225 amplifies the received broadband signal to a level sufficient to prevent excessive transmission loss in the antenna cable. The preamp, filter, and limiter all are well known and can be selected based upon the specific application and configuration of the selected system.

FIGS. 24 and 25 together illustrate the receiver analog rf module 214, which includes a preamp 230. The preamp 230 provides amplified signals to both a first branch 232*a* and a second branch 232*b*. Each element in the first branch is identified by the suffix "a," and corresponding elements of the second branch are identified by the suffix "b." This description describes the elements associated with the first branch 232*a*, with the corresponding elements associated with the second branch 232*b* functioning identically. The preamp 230 supplies its output signal to a mixer 234*a*, which in turn mixes the input signal with a 3.2 GHz signal from an oscillator 235. Mixer 234*a* provides an output to a 1–400 MHZ coupled low-pass filter 236*a*. The output of the low-pass filter 236*a* is, in turn, fed to a digital attenuator 238*a*, which provides an automatic gain control function, to hold the output level within the dynamic range of the digital sampling device.

The base receiver device 64, in general, applies algorithms described below to detect the received broadband signal. At the peak output correlation of the received broadband signal within the reception search window 108, correlation detector 69 generates an output pulse 110. Phase quadrature techniques involving phase-shifted I and Q channels are used. Sampled signals from the I and Q channels are piecewise squared and summed, and the total square-rooted, to obtain the phase-independent magnitude of the received broadband signal. The use of this phase quadrature technique is generally well known.

As shown in FIG. 26, an input amplifier 224*a* receives the output from the digital attenuator 238*a* and amplifies the signal to a level that can be read by its downstream digital-based components. The amplified signal is supplied to an analog-to-digital (A/D) converter segment 246. The A/D converter segments 246 includes A/D converter 248*a* and an A/D fan out and memory controller 250, which activates the A/D converter 248*a*. The A/D fan out and memory controller 250 receives an input from the computer 220, and it also receives a clock signal from clock 254. The A/D converter 248*a* incorporates a sample and hold circuit (not shown), such that the signal output of the A/D converter is set at discrete and recognizable levels. The clock 254 controls the timing of the A/D converter 248*a*, as well as the A/D fan out and memory controller 250, such that the output of the high speed digital sampling is distributed to associated storage devices 258*a*, preferably SRAMs, at a rate that can be accommodated. This signal transfer rate can therefore be lower than the A/D sampling rate by a factor equal to the total number of SRAMS in each of the I and Q channels.

The A/D converter 248*a* supplies digitized signals to a pair of fan outs 256*a*, which distributes the signals to the storage devices 258*a*. A multiplexer 260 reassembles the samples stored in the storage devices 258*a* into the original time sequence order and outputs the serial output to the DSP correlator 218 (see FIG. 24).

The first branch 232*a* and the second branch 232*b* of FIGS. 25 and 26 are in phase quadrature, providing I and Q channels. As is well known in the art, the use of I and Q processing renders the envelope detection process independent of the unknown phase difference between the transmitter oscillator 192 and the receiver oscillator 235. To achieve phase quadrature, an in-phase (I) channel input is supplied to the amplifier 224*a*, and a quadrature (Q) channel input 223*b* is supplied to the amplifier 224*b*. The A/D sampling rate in each channel can be as low as two samples per time interval T, where T is the duration of the individual pulse envelope. Alternatively, if the A/D sampling rate is at or above the Nyquist rate, $2f_c$, a single branch need be used.

3.2.1 Digital Signal Processing

An output from the multiplexer 260 is supplied to the receiver DSP correlator 218, which preferably incorporates several DSP correlator units (not shown), to provide correlation processing. The DSP correlator 218 processes the output of the receiver digital module 216 under the control of the computer 220. Considering present processing capabilities, the ILT system 60 balances range depth characteristics against processing time, largely based upon the DSP correlator characteristics.

The computer 220 has a higher workload than the computer 150 of the remote transmitter device 62, shown in FIG. 20. The high workload of the base receiver device 64 can be more efficiently handled if it has a suitable DSP correlator 218.

The DSP correlator 218 should, therefore, be capable of performing efficient calculations of the long correlations using convolution, which requires substantial signal processing capabilities. The following description outlines the computational requirements and designs of the DSP correlator that are used for correlation detection.

The base receiver device 64 finds the broadband signal using a correlation detector. This correlating computation can be done directly in the time domain, or, using convolution, in the frequency domain. The time-domain computation is expensive, being an $n^2$ algorithm, although it can be speeded up by a factor equal to the duty cycle. The frequency-domain computation is an n log(n) algorithm providing a compelling advantage, although for use in the present invention there is some complication of implementation, discussed below. Finally, frequency-domain correlating permits frequency-domain filtering, a key component of the preferred embodiment of the present invention.

3.2.2 Time-Domain Correlation

Cross correlation of two vectors X and Y, of size n and m, results in a vector H of length n+m, where $H_i$ is the sum from k=0 through k=n−1 of $X_k \times Y_{i-k}$. Thus, n+m values are calculated, and each value requires or costs n multiplications and n additions, i.e., (n+m)×n×2 operations.

If the vector X is the code and Y is the sample, a distinct correlation can be coded that considers non-zero elements of X. If the code duty cycle is d, then (n+m)×n×2d operations need be done. In this approach, correlating in the time-domain, implementation is somewhat simpler but the computational cost for codes using significant numbers of pulses is prohibitive.

A resultant uncertainty from uncertainties in signal arrival time is called a range uncertainty. The base receiver device 64 should, therefore, search a reception search window 108 having some range of uncertainty to enable reasonable processing characteristics. Light travels about one nautical mile in 6 microseconds. At a 1 GHz sampling rate, therefore, a sample of 6000 points should be collected and processed per mile of reception search window.

One example contemplates a code length of 1024 with a ⅛ duty cycle. Therefore for a reception search window of M miles, the computational cost of correlating in the is time-domain can be calculated as follows, assuming n=1024, m=6000M, and d=⅛, $$\text{computing cost} = (n + m) \times n \times 2d$$
$$= (1024 + 6000\text{ M}) \times 1024 \times 2/8$$
$$= (1024 + 6000\text{ M}) \times 256 \text{ FLOPs}$$

For a window of 10 miles, this results in a computation of about 15.6 MFLOPs.

Once the broadband signal has been detected, synchronization is established, and no correlation is required to maintain the synchronization for some period. Additional coded broadband signals can be sent during the period of valid synchronization. To receive these subsequent coded broadband signals requires sampling of another n points. To see whether the coded broadband signal is present or absent requires a single calculation involving 2nd operations. To collect a message of B bits thus requires the sampling and holding of nB points, and 2Bnd FLOPs. So, to have a search range of M miles and a message limit of B bits, requires (n+6000M)×n×2d30 2Bnd FLOPs. For the contemplated code, this equates to (1024+6000M)×n/4+256B floating operations.

3.2.3 Frequency-Domain Correlation

Efficient computation of the cross-correlation between two discrete-time signals x and y is desired. Assuming x is of length N and y is of length m, i.e., x(k) is defined for $0 \leq k \leq N-1$ and y(k) is defined for $0 \leq k \leq m-1$. The cross-correlation is defined as, $$h_j = \sum_{k=0}^{N-1} x_k y_{k+j}$$

for values of j satisfying −(N−1)≤j≤m−1. When computing the terms in the summation, x and y are taken to be zero outside their respective defined ranges. x is some received signal and y is a code, the presence of which is what is attempted to be detected in x. Computation of the cross-correlation requires Nm real multiplications and real additions. In the common case where N is very large, computation in the time domain is not feasible since it takes too long.

Great savings in computation are possible in the frequency domain. The Discrete Fourier Transform (DFT) of x is defined as, $$X_k = \sum_{j=0}^{N-1} x_j e^{-i2\pi j \frac{k}{N}}$$

for $0 \leq k \leq N-1$, where i is the square root of −1. The DFT is useful here because if there is a convolution, $$c_j = \Sigma X_k y_{j-k}$$

then the application of the DFT to both sides yields, $$C_k = X_k Y_k$$

i.e., the DFT transforms convolution to multiplication. Thus, to convolve two discrete-time signals, the DFT of each signal is computed, the two DFTs are multiplied point by point, and then the inverse DFT of the result is taken. The inverse DFT has a form similar to the forward DFT:

$$x_k = \frac{1}{N}\sum_{j=0}^{N-1} X_j e^{i2\pi j \frac{k}{N}}.$$

The DFT performs a circular convolution process using multiplication. Convolution is performed by sliding one signal alongside the other and summing the pointwise products. With normal convolution, points outside the range of the signals are taken as zero. With circular convolution, however, there is a wrap-around effect: when the end of a signal is reached, it is simply repeated as though arranged in a circle. For the present application, it is desired to use the DFT or the Fast Fourier Transform (FFT) to compute normal convolution, not circular convolution.

Once a method to correctly compute the convolution above has been determined, it can be converted into cross-correlation. This is done by reversing the signal x before convolution is computed, then reversing the resulting c after the convolution computation has been performed. The result of these actions is the cross correlation h. The techniques now discussed below for efficiently calculating convolution are also applicable to cross-correlation.

The DFT converts convolution to a computationally simpler point by point multiplication. This requires that both signals undergoing the DFT have the same length. If they are not, the shorter signal can be padded by adding strings of 0's to the original signal to provide the proper length. However, in the present invention, where a long received signal is typically, convolved with a relatively short code, it makes little sense to pad the code with the large number of zeros to make it the same length as the received signal. It is more efficient to split the long signal x into segments, then compute smaller convolutions for the segments and then combine the results. This is especially useful as the long signal x can be received and processed in parallel as data becomes available.

Suppose an original signal x is split into pieces of size n, and then the convolution with the code y, which has length m, is computed piece-by-piece. Assume that n≧m, and let x1 denote that piece of x that is to be convolved with the signal y. Padding y with n−m zeros is first performed, so the result is of the same length as x1, after which the DFT is taken for each signal, the DFTs are multiplied pointwise, and the inverse DFT of the result is taken. Due to the fact that the DFT provides circular convolution instead of normal convolution between x1 and y, the first m−1 points of this computation are incorrect. There are two techniques to deal with this problem. One is to add the m−1 points in with the results from other pieces of the original long signal x. By overlapping the pieces and adding where they overlap, the correct result is achieved. The other approach is to throw away the m−1 incorrect points. Their correct values come from the convolution of the previous piece of x with y. With the first method, the long signal x is split into approximately N/n nonoverlapping pieces, where N is the length of x. With the second method, x is split into approximately N/(n−m+1) pieces, with each piece overlapping its neighbor at m−1 points.

The computational requirements for each method are roughly equal, and the second approach is preferred because it is slightly easier to implement. Each piece of the convolution is calculated independently and there is no need to add parts of one piece of the convolution to another.

At this point, a frequency-domain algorithm for computation of the convolution of a long signal x with a code y has been described. However, the computation efficiency of this method has not been described. Computing the DFT of an n point signal requires in the order of $n^2$ multiplications and additions. Therefore, if brute force DFT calculations are used, it actually requires more computations to produce the convolution than by straight calculation. This is because the code should be padded with a string of zeros out to length n.

However, the FFT, which is a powerful algorithm that computes the DFT, can also be used. The FFT computes the DFT of an n point signal using on the order of n log2(n) operations compared with $n^2$ for the brute force DFT Henceforth, this disclosure refers to "computing the FFT", instead of the more descriptive and accurate phrase "using the FFT algorithm to compute the DFT." The FFT is the precise mathematical equivalent to the brute force DFT However, n should be an integral power of two to use the FFT In the event that it is not, the signal can be padded with zeros so that the length is a power of two.

Using the FFT, the number of operations to complete the convolution algorithm is, $$M = \text{ceil}\left(\frac{N+m-1}{-m+n+1}\right)\text{pow}_2(n)(\log_2(\text{pow}_2(n))+1)$$

and $$A = 2\text{ceil}\left(\frac{N+m-1}{n-m+1}\right)\text{pow}_2(n)\log_2(\text{pow}_2(n))$$

where M is the number of complex multiplications, A is the number of complex additions, ceil(x) is defined as the smallest integer greater than or equal to x, and $\text{pow}_2(n)$ is the smallest integral power of two greater than or equal to n.

Select n-the size of each piece of the long signal x- to minimize the number of computations, for example, select the signal length to be a power of two. Otherwise, the signal should be padded with zeros, which contributes nothing to the solution, but which requires useless computations.

Figure 28:
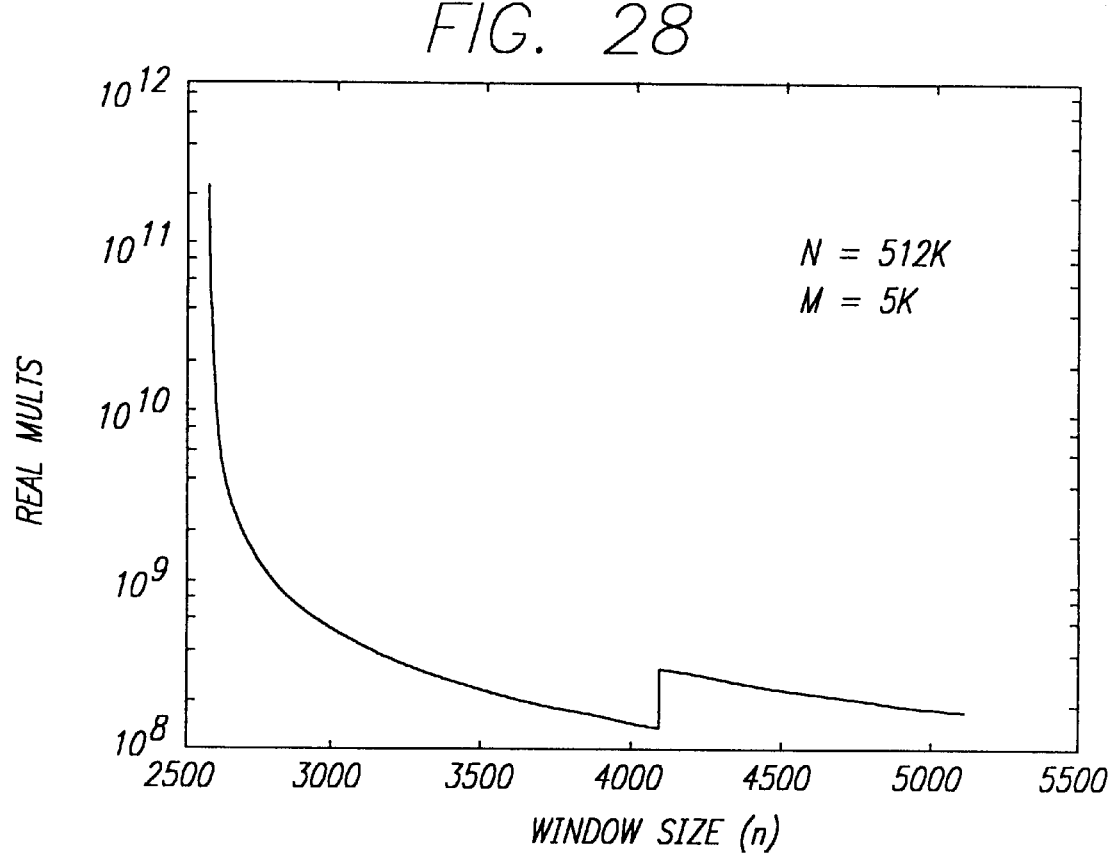
FIG. 28 is a typical graph of multiplications vs. window size for one convolution process.

FIG. 28 is a graph illustrating the number of real multiplications versus the size of the reception search window for a particular case, with N=512K and m=5K. The number of multiplications is minimized when signal size(n)=64K. The number of multiplications when n=m is actually much larger than the value obtained when using straight calculation. Other than for small values of n, however, the number of multiplications is relatively constant, between about 40 and 80 million, compared to about 2.7 billion for straight calculation. Repeated experimentation and some analysis shows choosing n to be any power of two greater than m and less than N produces a reasonable operation count in most cases. For any specific values of N and m, it is straightforward to minimize the number of operations by simply evaluating the prior equation for M for each power of 2 between m and N.

Figure 29:
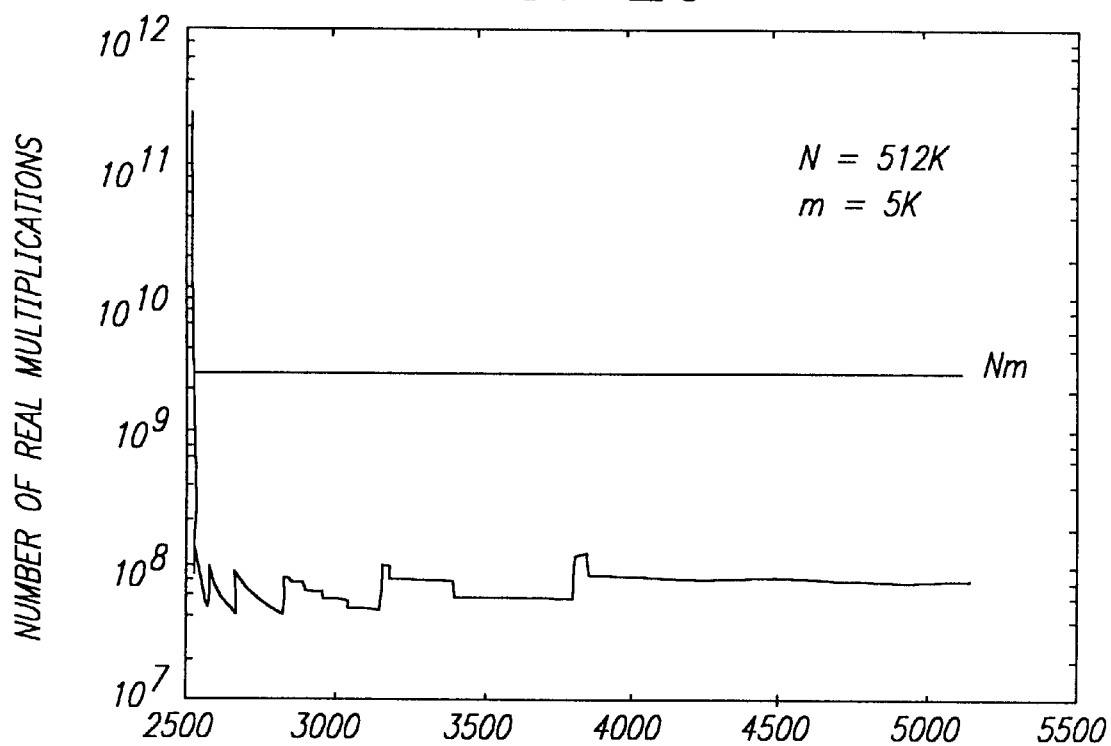
FIG. 29 is another typical graph of multiplications vs. window size for another convolution process.

The algorithm described above splits the signal into multiple pieces, but the code y is processed as a unit. The m point signal y can be split into pieces of size $m_1$ each, using the same techniques for getting around the circular convolution problems described above. However, because each piece should be padded to length n, the operation count will increase. A question arises when n is smaller than m. In the original algorithm, n should be greater than or equal to m. Values of n between $m_1$ and m that are not allowed for the original algorithm can be used. However, since the original algorithm has large operation counts for n close to m, extensive testing shows that the operation count for $m_1 \leq n \leq m$ appears never to be less than the operation counts achieved with the original is algorithm. FIG. 29 plots this for the case where N=512K, m=5K and the code is split in two pieces. Thus, there is little advantage to splitting the code into pieces, unless it is not possible to process a code of the desired length. The operation count expressions for this algorithm are, $$M = \text{ceil}\left(\frac{m}{m_1} \frac{N + m_1 - 1}{n - m_1 + 1}\right) \text{pow}_2(n) \log_2(\text{pow}_2(n))$$

and $$A = 2\text{ceil}\left(\frac{m}{m_1} \frac{N + m_1 - 1}{n - m_1 + 1}\right) \text{pow}_2(n) \log_2(\text{pow}_2(n)).$$

As above, M is the number of complex multiplications and A is the number of complex additions.

The FFT algorithm can be performed on a single machine that performs all operations sequentially. One would expect that the convolution could be computed quicker if done in parallel, and this is indeed the case. Two machines of equal computing power can compute a particular convolution in about half the time of a single machine.

The FFT algorithm splits the original signal into overlapping pieces. If more than one machine is used, situations will arise where multiple machines need access to the same data. Thus, a system using the FFT algorithm requires such multiple access. If this is not possible, the need for multiple access can be eliminated by splitting the original signal into nonoverlapping pieces and the appropriate pieces are processed by each machine. However, in this case some technique to mathematically combine the results from the various machines is necessary. In the overlapping approach the results can simply be stacked end on end with no computations necessary, but multiple machines need access to the same data. This tradeoff may need to be considered in the design of any real-time system for computing convolutions and cross-correlations of long signals.

PART 4: APPLICATIONS OF THE ILT SYSTEM

The preceding parts have described the technology and math of the ILT system 60. This part describes various applications of the ILT system. Certain embodiments of ILT system 60 that are illustrated in the preceding parts can be used for quickly determining the azimuth, localizing, and track of the remote transmitter device from the broadband receiver device, using techniques described herein.

In the ILT system 60, the synchronization transmitter 70, which typically using GPS technology, provides synchronizing signals 93 to both of the synchronizing receivers 72, 74 (shown in FIGS. 1 and 2), which synchronizes the remote transmitter device 62 with the base receiver device 62 Azimuth, ranging and localization accuracy are generally limited by system synchronization accuracy. For the unclassified GPS synchronizing signals, this is 50 nsec or better at both the remote transmitter device 62 and the base receiver device 64. In practice, this leads to a position accuracy of 25 feet or less. This position accuracy is independent of range. The characteristics of the broadband signal enable an effective determination of azimuth localization and tracking. The ILT system of the present invention can be applied to many applications.

4.1 Precise Range Accuracies Using Imprecise But Resettable Clocks

The preferred embodiments of the ILT system 60 are configured to function effectively even when either, or both, of the remote transmitter device 62 and the base receiver device 64 are unable to receive synchronizing signals 93 from the synchronizing transmitter 70.

As shown in FIG. 21, the clock in the preferred embodiment of the remote transmitter device 62 comprises the GPS synchronizing receiver 74 and the programmable delay element 156. When the GPS synchronizing receiver 74 is properly receiving timing information from the GPS synchronizing transmitter 70 in the GPS satellite 81, the synchronizing receiver 74 will provide pulses at a prescribed rate, very accurately. The programmable delay element 156 then causes the broadband signal to be transmitted a programmed delay 96 after each pulse has been transmitted by the GPS receiver. The GPS synchronizing receiver 74 relies upon pseudoranges from multiple GPS synchronizing transmitter 70, to maintain its timing accurately, which is generally known in the art. The ILT system anticipates that, in certain circumstances, the GPS synchronizing receiver 74 will be unable to provide an accurately repeatable time pulse. These circumstances are described in the next section.

As shown in FIG. 24, the base receiver device 64 relies upon the clock 254 for timing. Clock 254 is reset by the interaction between the GPS synchronizing receiver 72 and the programmable delay 73. The timing of the pulse generated by the programmable delay 156 of the remote transmitter device 62 (see FIG. 20) should therefore be closely synchronized to the timing of the corresponding pulse generated by the programmable delay 73 of the base receiver device 64 (see FIG. 24). This synchronization permits an accurate determination of the time of flight of the transmitted broadband signal. After the time of flight has been accurately computed, then the range between the remote transmitter device 62 and the base receiver device 64 can be accurately determined.

4.2 Inverse Synchronization When The Clock of the Remote Transmitter Device Is Not Reset Synchronization between the base receiver device 64 and the remote transmitter device 62, as described in the previous section, presumes that the programmable delay element 156 accurately maintains the timing using synchronizing signals received from the GPS synchronizing receiver 74. Instances can arise, however, when the GPS synchronizing receivers are not properly receiving the GPS synchronizing signals 92 from the GPS transmitters, in which case GPS synchronization between the remote transmitter device 62 and the base receiver device 64 cannot be achieved. Such instances can arise because of natural or man-made interference. This section describes the operation of the ILT system 60 in these instances.

When the GPS synchronizing receiver 74 is properly receiving the GPS synchronizing signal 93 from the GPS transmitter 70, the synchronizing receiver 74 provides not only a time tick at the correct time, but also an indication that the timing of the time tick is accurate. If the programmable delay element 156 fails to receive this indication of accuracy, then it ignores any time tick it receives from the GPS synchronizing receiver 74. Instead, the programmable delay element 156 uses a backup clock signal received from its own internal clock using oscillator 192 and divider 198. Under these latter circumstances, the backup clock signal controls the timing of the transmitting of the broadband signal.

Over time, the backup clock signal will drift and not be as accurate as the timing of the time ticks generated by the GPS synchronizing receiver 74 in the remote transmitter device 62. The resulting clock bias can be compensated for in the base receiver device 64, as described below.

Figure 27:
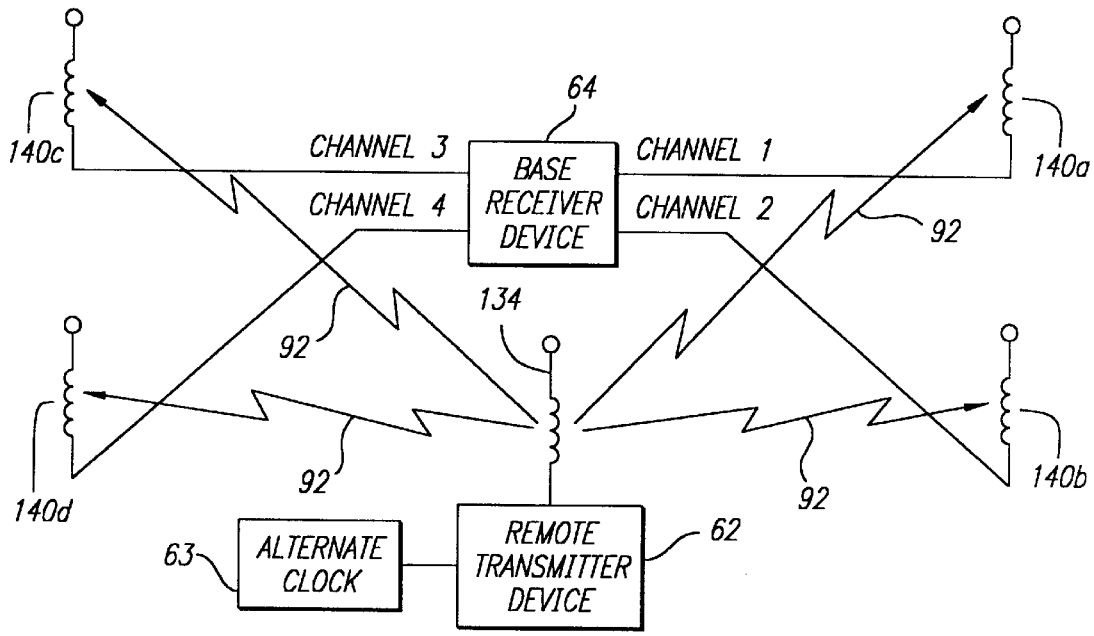
FIG. 27 is a schematic diagram illustrating a base receiver device, having a plurality of broadband receiver antennas, and a remote transmitter device.

Clock bias can be compensated for by a constellation of broadband receiver antennas 140a–140d, as illustrated in FIG. 27, which receive the single broadband signal 62 from the remote transmitter device. The receipt of the broadband signal is delayed according to the position of each receiver antenna. Broadband receiver antennas 140a through 140d can be coupled to a single base receiver device or alternatively to a plurality of base receiver devices.

At least four such broadband receiver antennas 140a through 140d are used, each of which is connected to a different channel of the base receiver device 64. Each broadband receiver antenna receives the same broadband signal transmitted via broadband transmitter antenna 134 by the remote transmitter device 62, which relies upon timing from an alternate clock 63. The requirement for at least four broadband receiver antennas is described below. The equations set forth below apply to the measurements of the signals received by the four broadband receiver antennas 140a–140d.

The true arrival time $t_{Ai}$ of the broadband signal at antenna i is, $$t_{Ai} = t_T + \frac{D_i}{c}$$

where $t_T$ is the intended time that the broadband signal is sent, $D_i$ is the range 106 from the broadband transmitter antenna 134 to the ith broadband receiver antenna, and c is the speed of light. This equation ignores atmospheric delay. The measured arrival time of the transmitted broadband signal at the ith broadband receiver antenna $t_i$ is, $$t_i = t_{Ai} + b_i + v_i$$

where $b_i$ is the clock bias at the ith base receiver device, and $v_i$ is the measurement error. The actual time that the broadband signal is sent, $t_{Ts}$, is, $$t_{Ts} = t_T + b_T$$

where $b_T$ is the clock bias in the remote transmitter device. The range to the ith receiver is calculated to be, $$D_i = (loc - R_i)$$

where $loc - R_i$ is the vector difference from the site of the broadband transmitter antenna 134 to the site of the particular broadband receiver antenna. $V_i$ is an initial vector estimate of $D_i$. Since the ILT system 60 normally uses GPS synchronizing signals, the error is small, so this equation reduces to, $$D_i = V_i \cdot (loc - R_i).$$

The pseudorange at the ith receiver, $\rho_i$, which is the measured arrival time of the broadband signal minus the actual time the broadband signal is sent, is defined as follows:

$$\rho_i = c(t_i - t_{Ts}).$$

Substituting the above equations yields, $$\rho_i = D_i + c(-b_T + v_i + b_i)$$

and $$\rho_i = -cb_T + cv_i - V_i \cdot R_i + V_i \cdot loc + b_i c.$$

Isolating the clock bias of the remote transmitter device and the location of the remote transmitter device yields the following equation:

$$-cb_T + V_i \cdot loc = \rho_i - cv_i + V_i 19 R_i - b_i c.$$

A separate such equation is provided for each of the four broadband receiver antennas 140a through 140d, with each equation having the same four unknowns, namely the transmitter x, y, and z location coordinates and the transmitter's clock bias. This set of equations is solvable. The errors in the base receiver device measurement that have to be considered in these four equations amount to approximately 0.004 T. The clock bias of the receiver and the receiver position error are relatively small, since they both are GPS based, and the error in the initial vector estimate, $V_i$ likewise is relatively small.

Under the circumstances described above, as the clock bias of the remote transmitter device 62 increases during those time periods that the GPS synchronous receiver 74 is not properly communicating with the GPS synchronous transmitter 70, the programmable delay element 73 of the base receiver devices 64 is modified to closely compensate for the error.

4.3 Azimuth Determination from Range Tracking Through Time

Each reception of the broadband signal results in a measurement of the time of flight time the signal accurate to the time resolution of the timing system being used. This error is independent of the range. From this time-of-flight measurement, the separation distance 104 from the remote transmitter device 62 to the base receiver device 64 can be computed, since the broadband signal travels at the speed of light.

Since the location of the base platform 65 and the incorporated base receiver device 64 is generally known, the receipt of a single broadband signal yields a sphere of possible positions for the remote transmitter device 62, with the base receiver device 64 located at the sphere's center. The sphere's radius corresponds to the range estimate from the base receiver device 64 to that remote transmitter device 62. Localization requires azimuth, in addition to range information. The ILT system 60 can implement many different techniques to obtain azimuth information, as described below. The appropriate technique is application dependent.

If the position of the remote transmitter device 62 is fixed, but the position of the base receiver device 64 is changing, then the prior range history plus the known trajectory of the base receiver device can yield good localization of the remote transmitter device.

Figure 30:
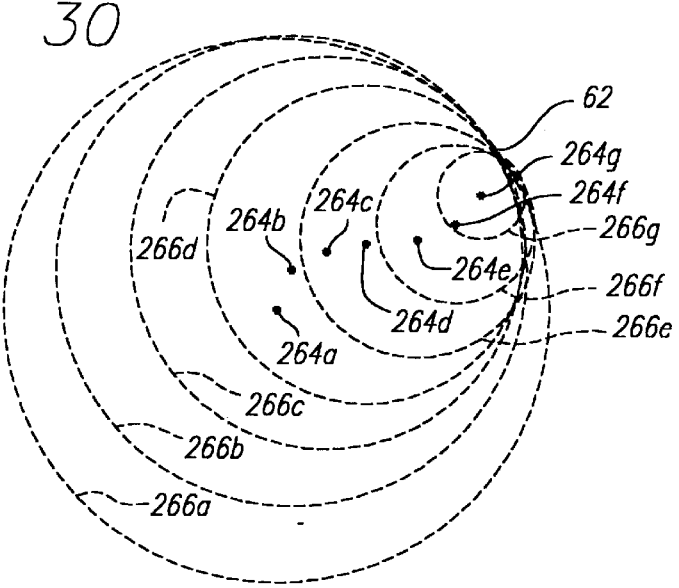
FIG. 30 is a schematic diagram depicting a technique by which a user with a mobile base receiver device locates a fixed remote transmitter device.

The simplest case is shown in FIG. 30, where the base receiver device 64 is moving along receiver positions 264a through 264g, while the remote transmitter device 62 is fixed at some unknown location. Here, a circle of 266a represents the possible positions of the remote transmitter device 62 when the base receiver device 64 is at the receiver position 264a. Similarly, a circle 266b represents the possible positions of the remote transmitter device when the base receiver device is at the receiver position 264b. This correspondence continues in a similar manner through to a circle of possible remote transmitter device positions 266g corresponding with base receiver device position 264g. The circles of position 266a through 266g all intersect at the transmitter position.

The circles of position 266a through 266g will all pass within the range error limit of the position of the remote transmitter device 62. Since typical errors are 25 feet or less, a single point exists where all the range rings pass within 25 feet of that point. A left/right ambiguity can arise, as when the base receiver device 64 moves in a straight line not passing through the remote transmitter device's location. In that case, two intersection points exist, one on each side of the line along which the base receiver device is moving. However, any deviation from the original line by 25 feet or more will resolve this ambiguity.

The case where the remote transmitter device 62 is fixed is suitable for beacon applications, such as beacon homing applications or lost ship or downed pilot applications. An aircraft searching for a lost ship or downed pilot is likely to be traveling much faster than the ship or pilot, thus the speed of the ship or pilot can be neglected. The incoming vehicle heads approximately in the direction of the beacon or transmitter placed with the ship; sequential range rings will intersect or be tangent with the original range rings. The vehicle heads toward the point of intersection, and the azimuth accuracy improves as the range shortens. This guidance is therefore simple and accurate.

4.4 Azimuth Determination from Range History and Base Receiver Device Track

When the remote transmitter device 62 is not necessarily fixed in one place, an approximation method can be used to estimate the device's track history. This history is calculated from the track of the base receiver device 64 and the range history.

Figure 31:
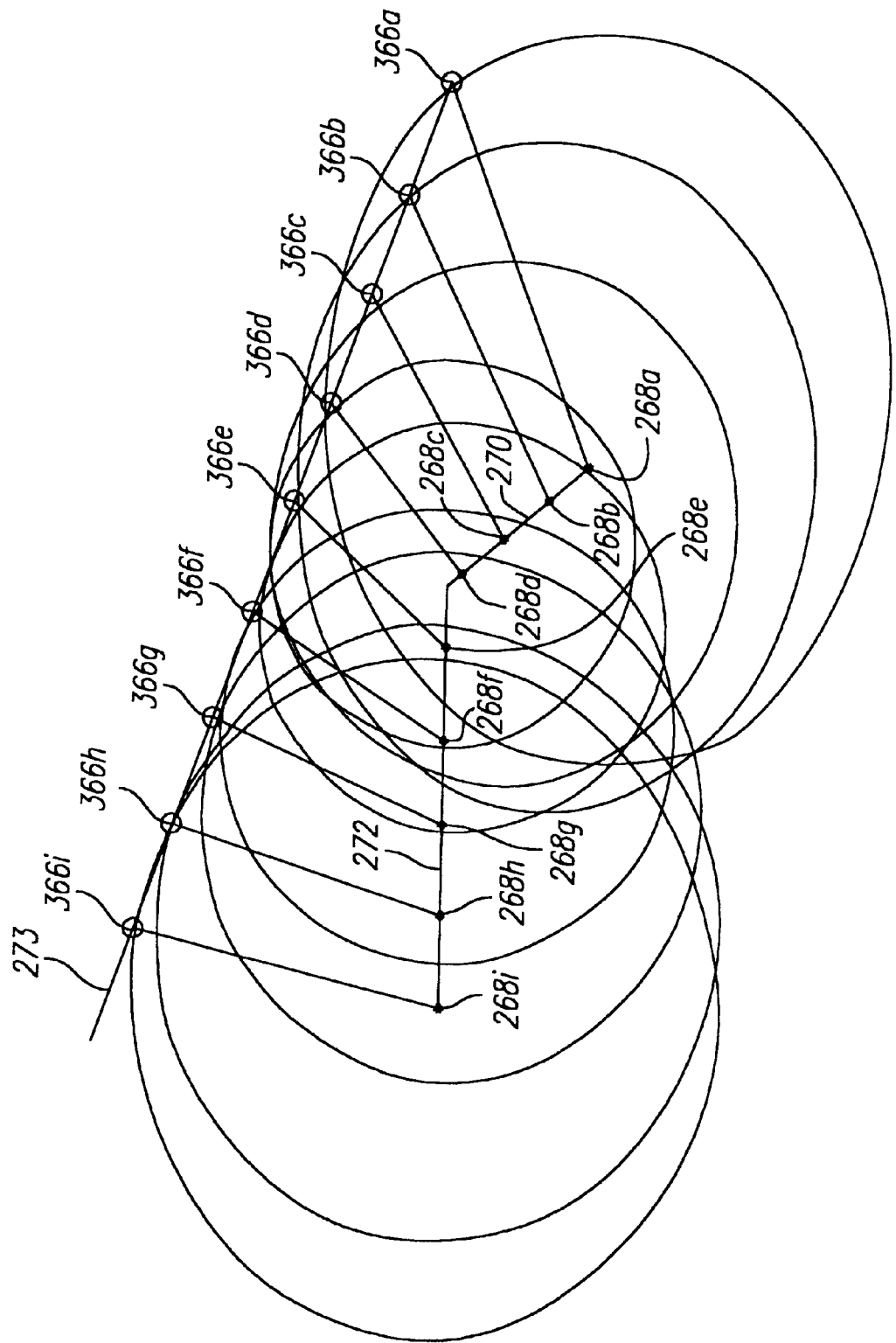
FIG. 31 is a schematic diagram depicting a technique for locating a moving remote transmitter device using a mobile base receiver device.

In FIG. 31, the position of the base receiver device 64, represented by closed dots 268a through 268i, moves at a constant speed along a path consisting of two straight lines 270, 272. The position of the remote transmitter device 62, represented by open dots 366a through 366i, is assumed to move linearly at a constant velocity. The base receiver device determines the successive range estimates and then computes the least mean-square error estimate of the path of the remote transmitter device 62, for both linear portions of its own path. Those two estimates will coincide in one estimate of the target path, as indicated by line 273.

Reasonable assumptions about target behavior are used to enable an aircraft with the base receiver device 64 to accurately track multiple remote transmitter devices 62 located on other aircraft, given update rates of about 1 Hz.

4.5 Azimuth Determination Using Multiple Receiver Broadband Antennas

Azimuth can be determined based on just a single broadband signal in ILCT systems that include two or more broadband receiver antennas. In one embodiment of such an ILT system, multiple broadband receiver antennas are connected to separate channels of a single base receiver device 64. In another embodiment of such an ILT system, multiple broadband receiver antennas are each associated with a separate base receiver device.

Figure 32:
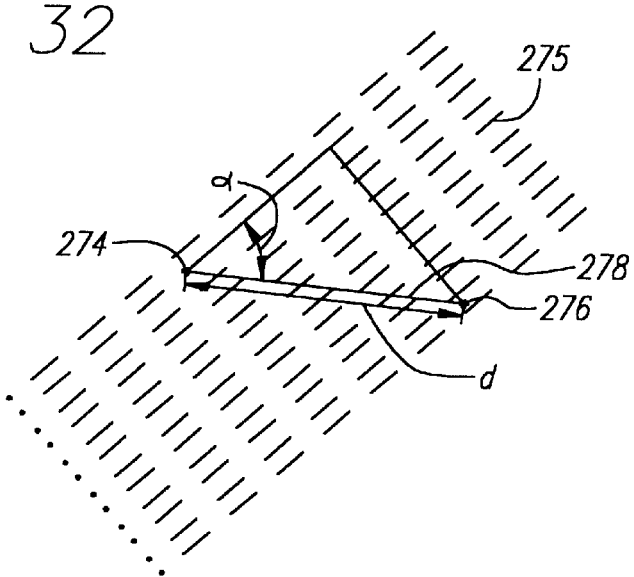
FIG. 32 is a schematic diagram illustrating the use of two broadband receiver antennas to estimate arrival angle, based on time difference of arrival.

As depicted schematically in FIG. 32, both embodiments described in the prior paragraph include a remote transmitter device 62 that transmits a broadband signal received by both broadband receiver antennas 274, 276. The signals received by each broadband receiver antenna are processed by at least one base receiver device 64. The broadband receiver antennas 274,276 are separated from each other by fixed distance, d. The broadband signals arrive at an angle of incidence, $\alpha$, to a baseline 278 that connects the broadband receiver antennas. The reference lines 275 indicate the direction of propagation of the broadband signal. The difference between the times of arrival of the broadband signal at the two antennas, known as the Time Difference of Arrival (TDOA), is given by the following formula:

$$TDOA = \frac{d}{c}\cos(\alpha).$$

The detection algorithm can resolve the broadband signal's arrival time to some error, $\delta$, and a resulting angular error, $\Delta$, so that, $$TDOA + \delta = \frac{d}{c}\cos(\alpha + \Delta)$$

and $$\Delta = \arcsin(c\delta/d).$$

If $\alpha$=90 degrees, then TDOA=0, and $$\delta = \frac{d}{c}\cos(90 + \Delta) = \frac{d}{c}\sin(\Delta).$$

For example, at $\alpha$=90°, if the separation distance, d, is 30 feet, and if the TDOA error, $\delta$, is 0.12 nsec, the resulting angular error is arcsin(12/30), or 0.23 degrees.

The two embodiments identified immediately above are described below, in sections 4.6 and 4.7.

4.6 Localization Using Multiple Broadband Receiver Antennas Connected To a Single Base Receiver Device In this embodiment, a single base receiver device includes separate channels for receiving synchronized samples from multiple broadband receiver antennas. An azimuth resolution on the order of 0.1 degree for modest antenna separations, and better for larger arrays, can be achieved. Localization of a remote transmitter device 62 relative to the broadband receiver antenna array thereby can be achieved. Moreover, this localization can be registered to the GPS grid.

By way of example, an aircraft having a single base receiver device 64 and a separate broadband receiver antenna located on each wingtip, for example, 30 feet apart, can localize targets directly ahead to 25 feet in range and 0.23 degrees azimuth, based on receipt of a broadband signal from a single remote transmitter device 62. At a range of 100 miles, this configuration provides azimuth localization of approximately ±0.15 miles. A single clock can used to detect the arrival time 111 of broadband signals for both broadband receiver antennas. Inconsistencies in clock time for different base receiver devices, therefore, need not be considered. In addition, communication between different base receiver devices to synchronize the clock reference times, need not occur.

4.7 Azimuth Resolution Using Multiple Base Receiver Devices

In some cases, it is undesirable or impossible to connect multiple broadband receiver antennas 140 to one base receiver device 64. In those cases, a separate base receiver device is provided for each broadband receiver antenna, and synchronization of the clock signals used by the separate base receiver devices should be maintained. In addition, software should be provided to compensate for propagation delays 104 of the broadband signals received at the separate base receiver devices.

Figure 48:
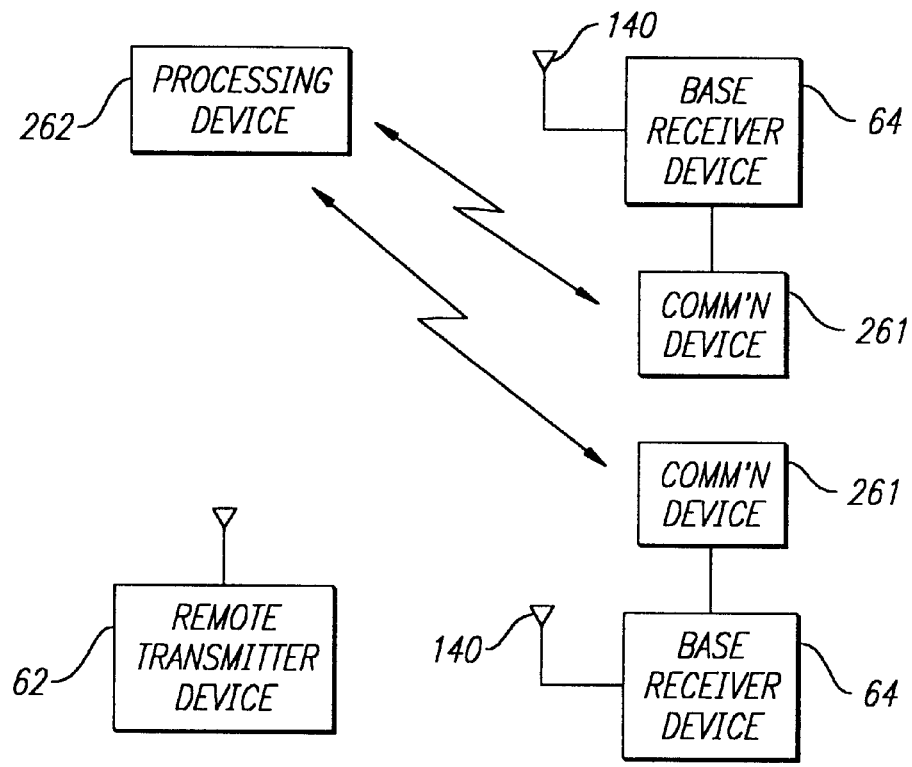
FIG. 48 is a schematic diagram illustrating a plurality of base receiver devices each having a broadband receiver antenna, and a remote transmitter device.

FIG. 48 illustrates a remote transmitter device and separate base receiver devices for each broadband receiver antenna. A base receiver device 64 is located at each of the plurality of base platforms. Each base receiver device has a processing device 220, responsive to an associated correlation output, for deriving the time of arrival of the radiated broadband signal at the respective broadband receiver antenna 140. A communication device 261 sends the time of arrival and the location of the base receiver device at the time of arrival. A second processing device 262 computes the location and clock error of the remote transmitter device based upon the locations of the base receiver devices and the times of arrival of the broadband signal at the plurality of broadband receiver antennas 140.

Figure 33:
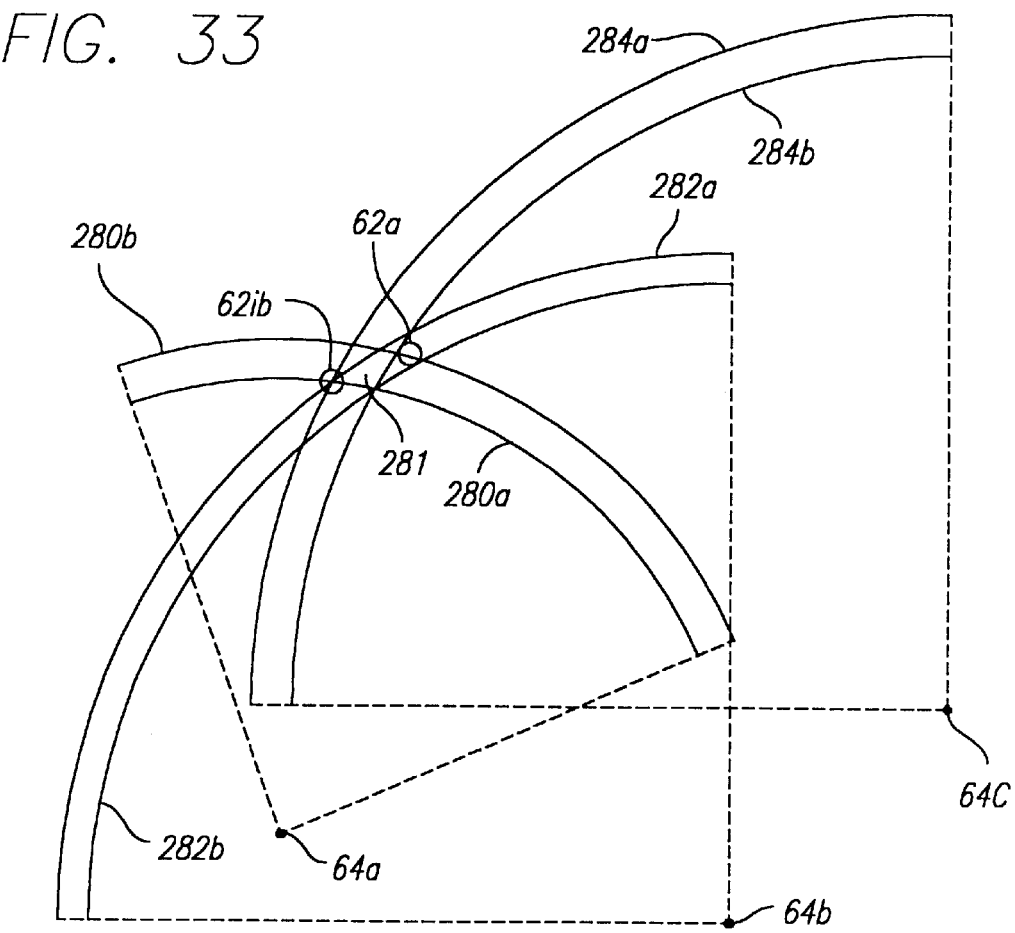
FIG. 33 is a top schematic diagram illustrating a process for locating a plurality of remote transmitter devices from a plurality of spaced base receiver devices, in which each base receiver device has ranging capabilities.

Information from multiple suitably dispersed base receiver devices 64 can provide much better localization than can just a single directional base receiver device having multiple broadband receiver antennas 140 in close proximity. With reference to FIG. 33, two remote transmitter devices 62a, 62b both transmit a distinct broadband signal, as described above, and three base receiver devices 64a, 64b, 64c detect the transmitted broadband signals, to localize the two remote transmitter devices. The base receiver devices 64a, 64b and 64c each receive the broadband signal from the base transmitter device 62a and, using the above techniques, determine the base transmitter device 66a to be somewhere along arcs 280a, 282a, and 284a, respectively. The intersection of these arcs indicates the location of the base transmitter device 62a. Similarly, the base receiver devices 64a, 64b, and 64c each receive the broadband signal from the base transmitter device 66b and determine the base transmitter device 62b to be somewhere along arcs 280b, 282b, and 284b, respectively. The intersection of these arcs indicates the location of the base transmitter device 66b.

By coincidence, geometrically, another point 281 exists where each set of three arcs 280a, 282a, 284a (or 280b, 282b, and 284b) overlap. Four observations can be made about this false localization. First, it is the equivalent of a false positive hit, and the possibility that an aircraft, ship, or other vehicle is actually present at that site typically small, so the false hit can often be logically excluded. Second, true localizations ordinarily will occur along the track of the remote transmitter device, whereas false localizations ordinarily will fall into unreasonbale track sequences. Consequently, the false localizations can be rejected by tracking motions over multiple hits. Third, directional base receiver devices can eliminate these false hits a priori. Fourth, other ranging devices, such as radar, can provide approximate remote transmitter device locations, and the approximate locations from multiple base receiver devices can then be compared to derive the location of the base receiver device.

FIG. 33, and the above description, contemplates non-directional base receiver devices. If the base receiver devices have directional capability as well, e.g., by using two or more antennas, then this would reduce the possibility of false localizations even further. This is illustrated in FIG. 34, with the same geometry and reference numbering as in FIG. 33, but with the arcs 280a, 282a, 284a, 280b, 282b and 284b of the FIG. 33 being reduced in size, to indicate azimuth measurement, as well as range.

Figure 34:
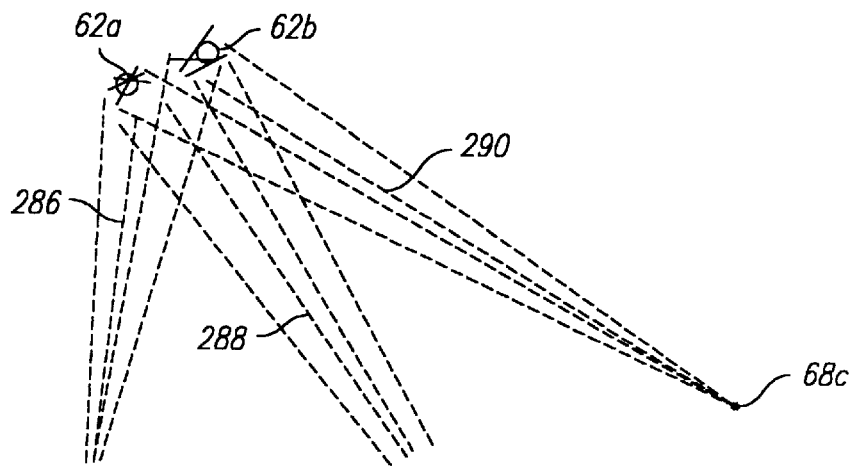
FIG. 34 is a schematic diagram similar to FIG. 33, except that each base receiver device has both directional and ranging capabilities.

In FIG. 34, the reception arcs 286, 288 and 290, which are produced by the respective base receiver devices 64a, 64b and 64c, each cover about 10 degrees. This shows that even limited azimuth resolution can make it possible to resolve the correct number and locations of remote transmitter devices using a single covert broadband signal. This is a consequence of the highly accurate range measurement.

Increasing the number of broadband receiver antennas, used either with just a single base receiver device or with separate base receiver devices, generally provides improved localization of a target. In addition, the use of three non-collinear broadband receiver antennas can determine the position of a remote transmitting device unambiguously in a single plane. Further, the use of four non-coplanar broadband receiver antennas, with no three of the four antennas being co-linear, can determine the position of a remote transmitting device unambiguously in three dimensions.

4.8 Devices Using Multiple Remote Transmitter Devices or Multiple Broadband Transmitter Antennas Associated With One Remote Transmitter Device Certain embodiments of the ILT system provide directional signals using multiple broadband transmitter antennas. In one embodiment, a plurality of broadband transmitter antennas transmit the broadband signal produced by the single remote transmitter device, whereas in an alternative embodiment, the plurality of broadband transmitter antennas each transmit the broadband signal produced by separate remote transmitter devices.

In the embodiment where a single remote transmitter device is used with multiple broadband transmitter antennas, just one clock is used. This avoids problems arising from inconsistencies in timing of different clocks, and it avoids the need for communication between different remote transmitter devices. In the alternative embodiment, where each of the plurality of broadband transmitter antennas is associated with a separate remote transmitter device, the remote transmitter devices should communicate with each other, to synchronize their clock signals.

Section 4.8.1, below, describes an embodiment of an ILT system in which a base receiver device is localized based upon a directional broadband signal transmitted from a single remote transmitter device using multiple separated broadband transmitter antennas. Section 4.8.2, below, describes an embodiment of an ILT system that functions as an omni-directional beacon whereby a base receiver device, which can be located aboard an aircraft, can determine its azimuth relative to a remote transmitter device. This latter configuration is especially suited to such applications as aircraft landing systems.

Figure 35:
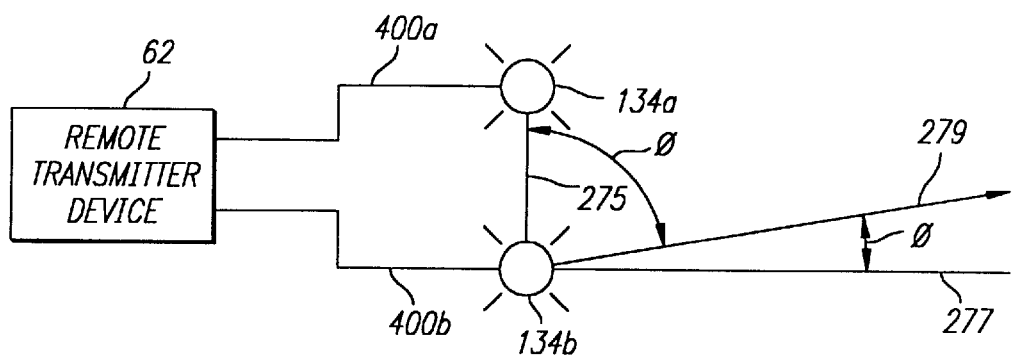
FIG. 35 is a schematic diagram illustrating an array of multiple broadband transmitter antennas that are each connected to a single remote transmitter device.

4.8.1 Multiple Broadband Transmitter Antennas Providing a Distance Finding Function As illustrated in FIG. 35, the single remote transmitter device 62 and multiple separated broadband transmitter antennas 134a, 134b can be used to transmit a directional broadband signal 92. The remote transmitter device 62 is connected to the respective broadband transmitter antennas 134a, 134b by cables 400a, 400b which preferably are substantially equal in length, material, and cross-sectional area, to provide substantially equal electrical transmission delays. A difference in the reception times of the broadband signal from each of the two broadband transmitter antennas provides an angle θ between a ray 279 and an axis 275 between the two broadband transmitter antennas 134a, 134b. Increasing the time difference between the time of receipt of the broadband signal at the two antennas reduces the angle θ.

This angle θ can be calculated in a manner similar to that described above for directional reception, in connection with localization using multiple broadband receiver antennas. A base receiver device 64 located a distance away can measure the time difference of arrival of the broadband signal from the two broadband transmitter antennas, and, by knowing the separation distance between broadband transmitter antennas 134*a* and 134*b*, it can calculate the angle θ between the axis 275 and the ray 279. From this calculated angle θ, and knowledge of the orientation and size of the array 134*a*, 134*b*, the azimuth from the array to the base receiver device along ray 279 can be calculated.

Depending upon the duration of each broadband signal, there can be some overlap of multiple copies of the broadband signal transmitted from the broadband transmitter antennas. In certain configurations, a known delay is provided between broadband signals supplied to the broadband transmitter antennas, so that the broadband signals transmitted by each broadband transmitter antenna does not interfere with each other. Certain configurations that provide this delay are illustrated in FIGS. 36 and 37, which are modifications of the FIG. 35 configuration.

Figure 36:
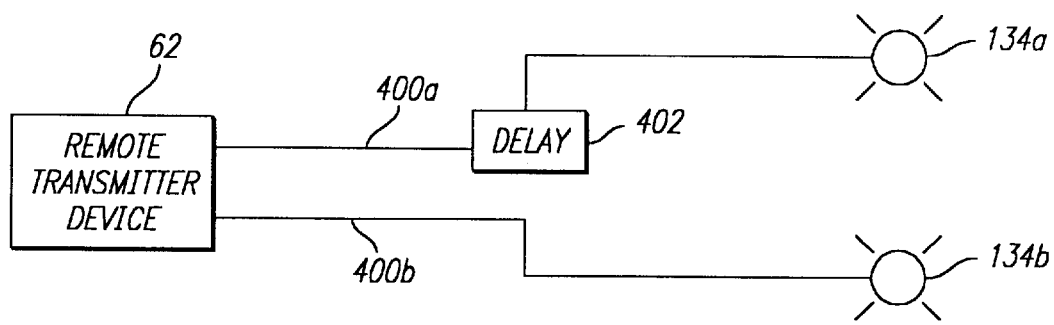
FIG. 36 illustrates a schematic diagram of a device similar to FIG. 35, except that a delay is inserted between the remote transmitter device and one of the broadband transmitter antennas.

In FIG. 36, a delay element 402 is inserted into the cable 400*a*, to delay the broadband signal transmitted by the broadband transmitter antenna 134*a*, relative to the broadband signal transmitted by the broadband transmitter antenna 134*b*. This can ensure that the transmitted signals do not overlap in time in any direction. The base receiver device is programmed to know the duration of this delay, whereby it can compute its azimuth relative to the remote transmitter device 62.

In FIG. 37, a delay is provided by a switch 283 that selectively connects the remote transmitter device 62 to the two broadband transmitter antennas 134*a*, 134*b*. The remote transmitter device then emits first from one broadband transmitter antenna and then from the other antenna. The base receiver device is programmed to know the time interval between the two transmissions, whereby it can compute its azimuth relative to the remote transmitter device.

4.8.2. Multiple Broadband Transmitter Antennas Providing an Omni-Directional Beacon Function The base receiver device 64 can be localized by configuring the remote transmitter device 62 with multiple broadband transmitter antennas to transmit a directional broadband signal. In this configuration, the ILT system 60 functions as an omni-directional beacon. This configuration is especially applicable to such navigational applications as aircraft omni-directional beacons used for en route navigation similar to the very high frequency omni-directional range, or VOR, in common use in aviation today. Another use is in aircraft landing systems, as described below.

An embodiment of an aircraft landing system using the ILT system is illustrated in FIG. 38. A runway 285 is illustrated, and an aircraft 291 that contains the base receiver device 64 is depicted approaching the runway. Three broadband transmitter antennas 140*a*,140*b*,140*c* are positioned in a triangular array off the end of the runway. The antennas 140*a*,140*b* are preferably located on opposite lateral sides of the runway 285. The three antennas transmit a directional broadband signal, as described above, for receipt by the aircraft's base receiver device 64. The base receiver device determines the time of arrival of the broadband signal received from each of the three broadband transmitter antennas 289*a*, 289*b* and 289*c*. The relative arrival time of the three copies of the broadband signal, with knowledge of the broadband transmitter antenna array geometry, accurately indicate a three dimensional angle β of the aircraft 291 relative to the array of broadband transmitter antennas. The path from each broadband transmitter antenna to the base receiver device is illustrated by dotted lines in FIG. 38. The angle β is unambiguous, in three dimensions, whenever the base receiver device 64 is above the plane formed by the three broadband transmitter antennas, which is the situation for aircraft on a responsible approach path.

An instrument landing system can readily be provided using the FIG. 38 configuration. The airborne base receiver device 64 accurately measures the three-dimensional direction between the base receiver device 64 and the remote transmitter device 62. Software in the receiver, of a well-known type, can convert this information, optionally together with the aircraft's GPS position, digital terrain data, prestored approach information, etc., to provide imaging or software instrument displays to the pilot and/or to provide inputs to an autopilot to enable a correct instrument approach to be flown. This system will operate correctly even if the GPS synchronizing signals are unavailable in the vicinity of the remote transmitter device 62. Because of technical characteristics, including extreme wide bandwidth, low duty cycle, and extremely low power, the ILT system of the present invention will not interfere with, or be noticed by, other communication systems located in close proximity. These same characteristics also make the reception extremely robust, so nearby television stations, natural phenomenon, and man-made interference do not significantly affect reception.

4.9 Localization Using a Combination of Broadband Signals and Radar

Use of a single base receiver device 64 with a single broadband receiver antenna 140 can accurately localize the remote transmitter device 62 by combining the system with radar information. The radar information from a single reflection gives range and bearing, to a certain accuracy. Typical range accuracy is about half the radar pulse length, or tens of feet to a thousand feet. Azimuth accuracy depends on the aperture, but is usually on the order of one degree. A radar hit indicates the presence of one or more targets within the area bounded by the radar's resolution.

In FIG. 39, an enlarged radar blip 404 contains three targets 287*a*, 287*b* and 287*c*, two of which—287*a* and 287*b*—are producing broadband signals that provide range information signifying that the targets are located on arcs 296 and 294, respectively. These arcs are similar to the arcs illustrated in FIG. 33, described above. Since the radar blips 404 are perhaps a few hundred feet deep, a single arc 294 or 296 does not ordinarily pass through two separate blips. Ordinarily, the target can be located based on a single broadband signal arc determination, combined with a single radar blip.

The base receiver device is able to resolve range to a much higher accuracy than typical radars. Occasionally an arc 294 or 296 from a base receiver device extends through multiple radar blips, but tracking using multiple receptions extending over several seconds should resolve ambiguities. Of course, the radar symbology in an integrated ILT-radar system normally should not include the locations of the arcs 294, 296; rather, for example, the system can change the symbology or color of the blip when the system determines that the remote transmitter device is transmitting broadband signals.

PART 5: INTERFERENCE CONSIDERATIONS

5.1. Introduction

Figure 40:
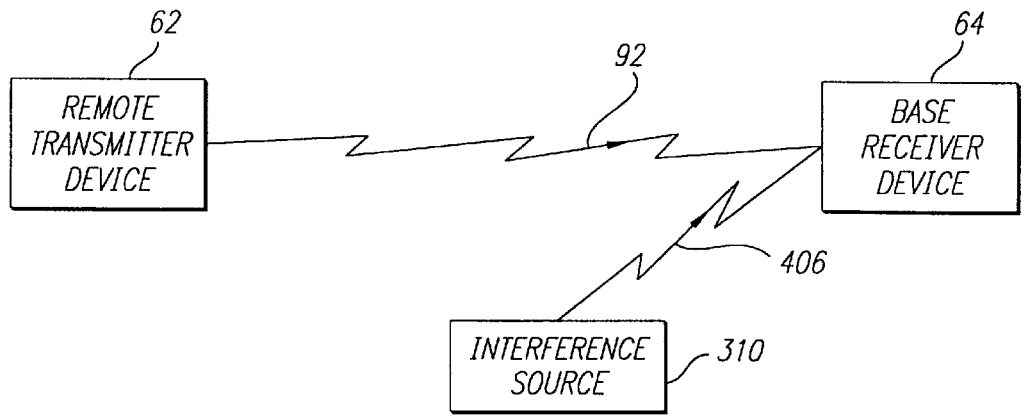
FIG. 40 is a block diagram illustrating the elements associated with interference of a communication system, such as the ILT system.

This section provides an overview of signal characteristics that make the broadband signals resistant to interference. FIG. 40 illustrates a man-made interference source 310 located in the same region as the remote transmitter device 62 and the base receiver device 64. The man-made interference source emits an interfering signal 406 that could disrupt the reception of the covert broadband signal 92 transmitted by the base receiver device 64.

Section 5.2 describes general interference concepts as they apply to ILT system 60. Section 5.3 describes methods of dealing with interference as applied to ILT systems. Section 5.4 describes the non-interdependence of the ILT signals with receivers of other systems.

5.2. Signal Interference

Interference can be a collection of overriding powerful signals that may render the system inoperative. Interfering signals having very high power levels can overload the base receiver device 64, but this can be countered by raising the operating power and adjusting the base receiver device gains.

5.2.1. Correlation Detector Considerations

The correlation detector within DSP correlator 218 (see FIG. 24) performs the same operations on all signals that pass within its front-end filter passband, $$w_{out}(t) = \int w_{in}(\tau) s_{ref}(\tau-t) d\tau$$

where $w_{in}$ and $w_{out}$ are the respective input and output signals, and $S_{ref}$ is the reference waveform and $\tau$ is the variable of integration. When $w_{in} = S_{ref}$, the output is the autocorrelation function of the input signal. For any other $w_{in}$ the output is the cross correlation. In practice the output of the correlation integral is passed through an envelope detector to remove uncertainties in absolute signal's phase.

When base receiver device 64 receives a covert broadband signal 92 having a pulse burst waveform in combination with a interfering signal 406, the total received waveform is, $$w(t) = S(t) + J(t) + n(t)$$

where S(t) is the covert broadband signal pulse burst 91, J(t) is the interfering signal 406, and n(t) is the noise. As a result of the linear nature of the correlation detector 69, the effect of the correlation on these three components of the total received waveform can be considered separately, and the results superimposed to obtain the overall response in the base receiver device 64.

5.2.2 Robust Waveform Design and Interference

The overall response of the ILT system 60 to interfering signals can be reduced by employing more sophisticated waveform design for the broadband signals. The individual terms in the response to a cosinusoidal signal shows that the principle mechanism by which these signals pass through the correlation detector is integration of the beat frequency as the difference between the frequency of the interfering signal and the center frequency becomes small. This response can be suppressed effectively by changing the fundamental pulse waveform from a simple pulse to a pair of pulses of opposite sign, or a "doublet." Such a change effectively incorporates the needed notch filter into the ILT waveform itself.

Figure 42:
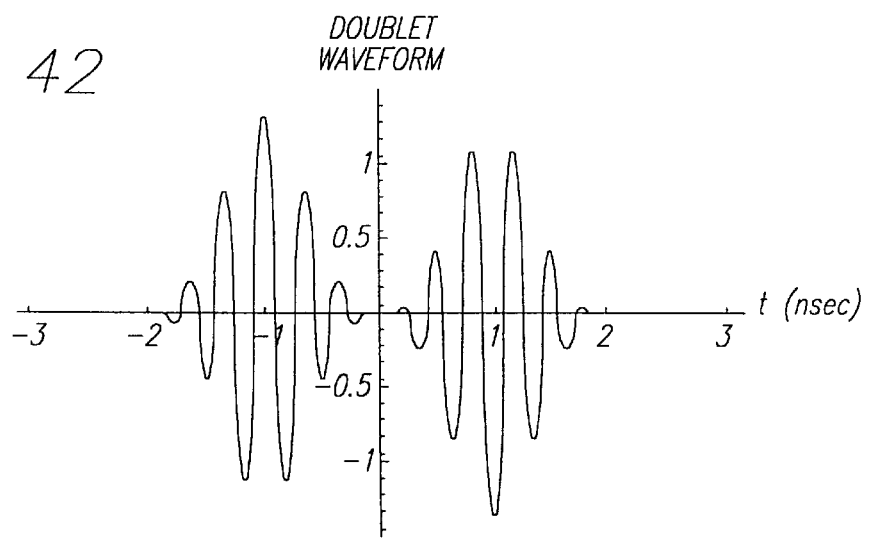
FIG. 42 is a signal amplitude vs. time graph of a Gaussian doublet waveform.

An example Gaussian doublet waveform is shown in FIG. 42, and its power spectrum is shown in FIG. 43. In these plots, the center frequency is $f_0=3$ GHz. The cancellation of the carrier signal in the two halves of the doublet effectively suppresses the spectrum at $f_0$. The result is that the response of the correlation detector to signals at $f_0$ is suppressed as well. To see this for the doublet, consider the result beat difference frequency response of the correlation detector to an interfering signal at $f_0$, the effect of which is to reproduce the envelope of the doublet, as shown in FIG. 44.

The integral of the FIG. 44 signal is zero since the value is negative for t<0, and each positive value for t>0 inversely mirrors the corresponding negative value. Consequently, when presented with an interfering signal at $f_0$, the response of the correlation detector designed for a burst of such doublets is also zero. For coherent interfering signals at other frequencies, the response is, $$\sim 2 \sin(4|f-f_0|\pi T) \exp(-|f-f_0|^2 \pi^2 T^2)$$

which is the square root of the spectrum shown above.

Since the transfer function of a correlation detector is the conjugate of the signaling waveform, the waveform change above can be viewed in terms of the spectral response of the correlation detector, as just illustrated for the doublet. It appears that families of waveforms based on this principle can be found to reduce the detector response to broad classes of interference.

Beyond these straightforward approaches to desensitization to interference, simulations demonstrated a class of nonlinear filters that are effective against collections of narrowband signals at random frequencies. These filters are described later in this part. Again, the principle of operation is based on the character of the broadband signal waveforms as compared with possible interfering signals.

5.3. Interference Considerations

5.3.1. Introduction

The base receiver device 64 has a bandwidth sufficient to receive the fundamental pulse from the remote transmitter device 62, typically involving bandwidths of plus or minus 30 to 50% of the center frequency of the broadband signal. Such a wide frequency receiver as the base receiver device 64 receives relatively long duration broadband noise, in-band continuous and intermittent narrowband signals, possible short-duration (impulsive) broadband interference energy, and other undesired signals and noise. Each type of interference presents a challenge to the base receiver device, especially since the broadband signals used in the ILT system 60 are very low energy and broadband.

5.3.2. Interference Vulnerabilities of Base Receiver Devices

If no means for conditioning the received signal is provided, other than bandpass filtering and amplification, then the DSP correlator 218 of FIG. 24 of the base receiver device can be vulnerable to the following interferences.

Continuous true broadband interference, within the frequency range of the ILT system, raises the background noise level, and correspondingly reduces the received SNR of the base receiver device. No internal means is available to reduce this effect. Proper design provides for an appropriate reception margin over expected broadband interference, and such design preferably includes adaptive power management. Such adaptive power management is well known in the art, and is widely applied to cell telephone systems, for example. Broadband noise from a localized source, can be partially excluded by directional reception using physically steerable antennas or by phased array processing.

High power impulsive interference signals cause the correlation detector 69 to reproduce the code in the output, once for each such impulse in the received signal. Significant numbers of such pulses within the reception search window will make reception of the broadband signal, which typically has a much lower energy than the pulses, impossible.

Strong continuous-wave interference in band causes the correlation detector to find a peak for each cycle of the continuous wave. The closer the frequency of the continuous wave is to the ILT system broadband signal's center frequency, the worse the effect of this interference. Since broadband signals typically have much lower peak powers than the continuous power of strong stations, or even the station's side bands if they are near the frequency band of the broadband signal, such interference can also make ILT reception impossible. Intermittent signals of more than a few microseconds duration, such as police radios, can have the same effect on an intermittent basis as continuous-wave interference. These intermittent signals can mask any broadband signals arriving at the same time.

5.3.3. Approaches to Rejecting Interference

Interference might disrupt the correlation performed within the DSP correlator 218 of FIG. 24. The ILT system 60 incorporates several devices and/or processes that limit the effects of interference, for example, radar pulses, strong nearby emitters, etc. These interference limiting devices and/or processes include both hardware for conditioning the analog signal and software for signal processing algorithms. These devices and/or processes have the effect of passing through the desired ultra-wideband ILT broadband signals while rejecting other kinds of energy, thereby preserving the information encoded in the ultra-wideband broadband signals. Each of the interference resisting means contributes in the ILT system to eliminating interference energy that might disrupt the correlation performed within the base receiver device 64. Since broadband signals last in the microsecond range, intermittent interference can be dealt with using a combination of analog filtering techniques as well as digital filtering techniques using both time and frequency domain signal processing as described below.

5.3.3.1. Analog Hardware Devices For Limiting Interference

5.3.3.1.1 Filters and Limiters

The very wide bandwidth of the ILT system makes the base receiver device 64 susceptible to interferences from a variety of natural and man-made systems and phenomenon. The RF front end comprising filter 226 and limiter 228 of FIG. 24 of the ILT system 60 prevents high power interference from saturating the RF components and rendering them momentarily inoperative. In extreme cases, such circuits that are unprotected by limiters can suffer physical damage from strong interference. The need for, and use of, filters and limiters for this purpose is well understood in the art.

5.3.3.1.2 Automatic Gain Control

The level of the conditioned signal presented to the digitizer should be within the digitizer's dynamic range. The base receiver device of the preferred embodiment has an automatic gain control (AGC) for this purpose. The use of AGC for keeping a signal in a desired dynamic range is well known in narrowband communication systems. Intermittent in-band interference can cause wide swings in total received signal amplitude. The AGC maintains total amplitude of these swings within the AGC dynamic range.

5.3.3.2. Digital Processing Software For Limiting Interference

ILT system 60 uses a variety of DSP processes to limit the effects of interference present in the digital signal, as outlined in Table 1 and described below. Most of these DSP processes are preferably performed by the DSP correlator 218 illustrated in FIG. 24, but alternately can be partially or entirely performed within another section of the base receiver device 64.

TABLE 1

ILT SIGNAL PROCESSING FOR INTERFERENCE

| Noise & Interference | Type of Processing |
| --- | --- |
| Continuous broadband (Gaussian) noise | Correlation provides processing gain |
| Narrowband interference | Frequency clipping |
| Impulsive interference | Time domain clipping, with windowing and interpolation |

After the broadband signal 92, received by the broadband receiver antenna 140 of FIG. 24., is conditioned, i.e, amplified, filtered, and limited, by the receiver analog module 214 to produce a conditioned signal and digitized by the A/D converter 248a to produce a digital signal, and before correlating by correlation detector 69 to find the presence of the sought broadband signal in the total received waveform, the ILT system's base receiver device 64 will perform a number of steps to limit interference. Provided the conditioned signal is within the dynamic range of the A/D converters 248a, 248b, the processing steps of pre-clipping, frequency clipping, and post-clipping will remove a number of kinds of interference outlined in Table 2. These various kinds of interference, and the processing steps that deal therewith, are described in greater detail below.

TABLE 2

PROCESSING STEPS IN CONDITIONING THE DIGITAL SIGNAL FOR CORRELATION

| Processing Step | Objective | Conditioning Method |
| --- | --- | --- |
| Pre-Clipping (time-domain) | Remove Strong Impulses | Zero out strong pulses; interpolate and window to avoid adding distortion |
| Frequency Clipping | Remove Narrowband Interference | Transform amplitude and phase to frequency domain using FFT; estimate broadband noise floor, zero out frequency bins with amplitudes too much above noise floor |

TABLE 2-continued

PROCESSING STEPS IN CONDITIONING
THE DIGITAL SIGNAL FOR CORRELATION

| Processing Step | Objective | Conditioning Method |
|---|---|---|
| Post-Clipping | Remove Residual Impulses | Transform back to time domain; zero pulses, window and interpolate |

5.3.3.2.1 Broadband Impulsive Interference Containing ILT Chip-Like Impulses Ultra-wideband pulses similar to ILT fundamental pulses 78 can occur from man-made systems as well as natural causes. The ILT system 60 deals with this impulsive broadband interference by excising the unwanted ultra-wideband pulses in the time domain. This process is referred to as "pre-clipping." While the RF hardware can limit the strong ultra-wideband impulses, the interference can still be far above the average signal power used by the broadband signals of the ILT system, and require removal. A simple approach is to zero out the samples having amplitude above a prescribed threshold level. In this disclosure, the term "zero out" is defined as substituting a zero value for each actual digital time (discrete sample) value. A more sophisticated approach involves filling the zeroed-out interval by a value determined by interpolation, as described below.

5.3.3.2.2 Narrowband Interference

In the presence of strong in-band narrowband energy, and disregarding the effect of doublets for clarity of description, the ILT correlation detector 69 can find a strong correlation for each cycle of the narrowband interferer. If the narrowband signal has a greater signal amplitude than the broadband signal, which is typical, then the ILT broadband signal would be hidden during the correlation process.

FIG. 45a shows an idealized time-domain signal 311 with a strong narrowband signal 313 and a very strong interference signal 315. The first processing step, pre-clipping in the time domain, zeroes out those samples in the strong interference signal 315 within region 316. The unclipped part of the sample is then used to estimate the spectrum and phase of the stronger narrowband components, filling in the zeroed gap with interpolated estimates of what the narrowband components would have been. FIG. 45b illustrates the FIG. 45a signal with the effects of the interference signal 315 removed by the pre-clipping technique, with an interpolated estimate inserted therein as described below.

Figure 46A:
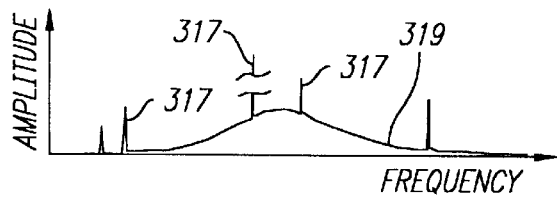
FIG. 46a is a graph of a typical signal amplitude versus frequency graph of a signal with narrow band energy superimposed over a desired broadband signal.
Figure 46B:
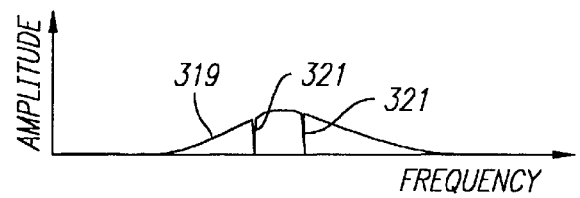
FIG. 46b is a graph of the FIG. 46a signal having the narrow band energy zeroed out.

After pre-clipping in the time domain and conversion to the frequency domain within the DSP correlator 218, the received signal presents one or more strong frequency peaks 317, and a broadband, noise-like signal 319 as illustrated in FIG. 46a. Since the broadband signal has mainly wideband components, most of the information in the sought signal, viewed in the frequency domain, is in the phase of the broadband signal, and very little is in the frequency amplitudes. At frequencies where a strong narrowband signal is present, there is a pulse-like, high amplitude signal in the frequency domain, and the phase value comes mainly from the narrowband signal, with small amplitude effect from the far weaker broadband signal component at that frequency. Therefore all information in the frequency domain corresponding to the narrowband signal can be ignored. Doing this reduces the energy component from the broadband signal slightly, and eliminates the narrowband energy present at that frequency. This process effectively performs notch filtering by zeroing out frequency bins where there is too much energy. FIG. 46a illustrates a signal in such need of notch filtering. FIG. 46b illustrates the FIG. 46a signal having undergone appropriate notch filtering at the appropriate frequencies as illustrated by notches 321. This process is referred to as frequency clipping. Narrowband energy significantly above the amplitude of the broadband background or out of the frequency band used by the ILT system is substituted with a lesser amplitude value, for example zero, in the frequency domain.

5.3.3.2.3 Post-Clipping

Figure 47A:
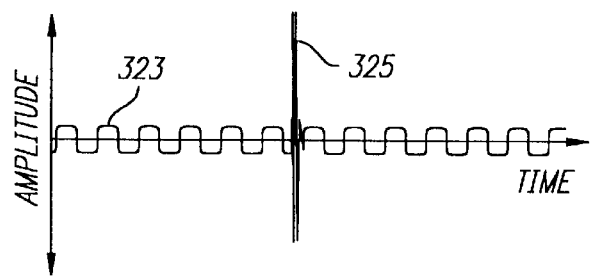
FIG. 47a is graph of a typical signal amplitude versus time graph of a signal with a residual impulse resulting from frequency clipping.
Figure 47B:
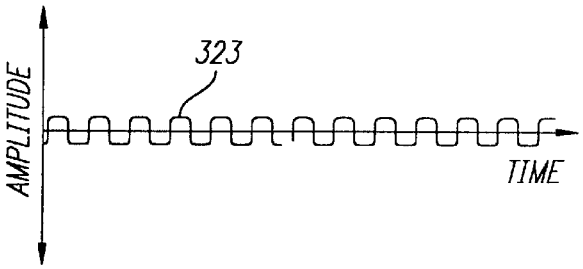
FIG. 47b is a graph of the FIG. 47a signal having the residual impulse removed using post-clipping techniques.

Optionally, one can convert the frequency-clipped data back to the time domain, using the inverse FFT. The pre-clipped and frequency-clipped time-domain signal 311, represented as item 323 in FIG. 47a, can still have significant time-domain impulses 325 having a greater amplitude than the broadband noise background and ILT broadband signal strength, as illustrated in FIG. 47a. These time-domain impulses 325 can cause the DSP correlator 218 to replicate the code, as described above, so they are again clipped out in the time domain. The signal 323 with the time-domain impulse 325 zeroed out is illustrated in FIG. 47b. In this case it is advisable to limit the signal amplitude rather than clip, or zero out, each impulse entirely.

After this sequence of pre-clipping, FFT, frequency clipping, inverse FFT, and post-clipping, the ILT broadband signal contents present in the total received waveform will remain almost unchanged, and the remaining processed digitized signal will provide a good correlation with the reference copy of the broadband signal.

5.3.3.2.4 Interpolation

Consider a received signal comprising a low amplitude ILT pulse burst 91 and a single high amplitude interfering pulse, plus a narrowband signal and a Gaussian noise background. If one zeros out an interfering pulse, the narrowband signal for that small discrete time interval is effectively filtered out as well. This has the effect of adding large amounts of high frequency noise, which will interfere with the correlation performed within the DSP correlator 218 of FIG. 24. A solution to this problem is to estimate, from the data outside the clipped interval, the narrowband spectral content including phase. A continuous narrowband interferer will have consistent phase throughout, so one can estimate this phase and fill in the zeroed out interval with narrowband energy of the estimated amplitude, frequency and phase. The briefer the excised interfering impulse, the more accurate the estimated narrowband frequency and phase is. For very short impulses, the resulting clipped and interpolated data is free of the impulsive interference and has very little added distortion from the clipping.

The resulting conditioned signal provides an appropriate correlation of the broadband signal.

5.4. Non-Interference of ILT Signal With Receivers of Other Systems

Figure 41:
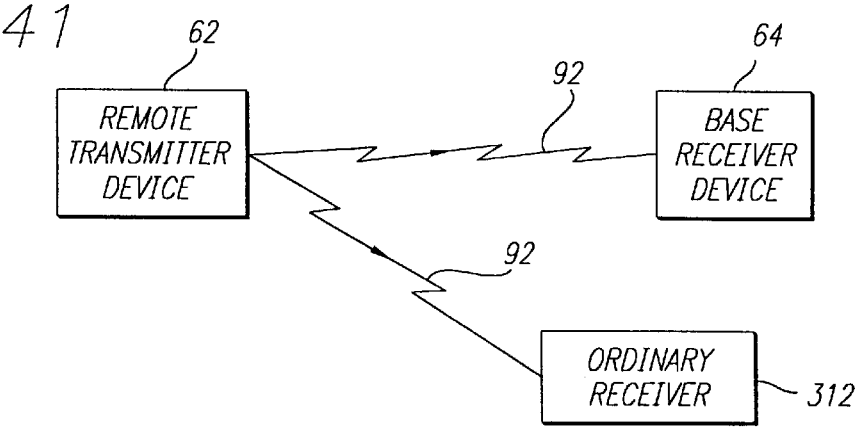
FIG. 41 is a block diagram illustrating the elements associated with a receiver of another type not receiving interference from the ILT system.

FIG. 41 illustrates a situation were an ordinary receiver 312 is in the path of an ILT signal. Due to the extremely wide bandwidth and low energy of the ILT signal, the ILT signal will create very little excitation in receivers of any other type of system.

Although the invention has been described in detail with reference to the preferred embodiments, those skilled in the art will appreciate that various modifications can be made without departing from the invention. Accordingly, the invention is defined by the following claims.

We claim:

1. Apparatus for communicating broadband signals from a remote object to a base platform, the remote object being spaced from the base platform, the apparatus comprising:

a first transmitter device, located at the remote object, said first transmitter device including
  a first waveform storage device that stores information characterizing a first broadband signal, such characterization including a prescribed signal transmission time,
  a first broadband transmitter element configured to radiate the first broadband signal in accordance with said stored information,
  a first synchronizable clock that maintains a first time reference, and
  a first time-setting device for setting said first synchronizable clock;

a first receiver device located at the base platform at a first location, the first receiver device including
  a second waveform storage device that stores information characterizing a second broadband signal, including the prescribed signal transmission time,
  a first broadband receiver element configured to receive and process electromagnetic radiation, and produce a first output signal,
  a second synchronizable clock that maintains a second time reference,
  a second time-setting device for setting the second synchronizable clock, and
  a first digital signal processing correlator configured to correlate the first output signal with the second broadband signal characterized by the information stored within the second waveform storage device, the first digital signal processing correlator outputs a first correlation output; and a first processing device that computes, based upon the first correlation output, a first apparent arrival time of the radiated first broadband signal received by the first broadband receiver element relative to the second time reference.

2. The apparatus as defined in claim 1, wherein:
the first broadband receiver element includes
  an analog module that conditions the received electromagnetic radiation to produce a conditioned signal, and
  an A/D converter that digitizes the conditioned signal to produce a digital signal; and
the first digital signal processing correlator includes
  a digital signal processor that performs digital signal processing of said digital signal, to produce a processed digitized signal, and
  a correlation detector that correlates the processed digitized signal to produce the first correlation output.

3. The apparatus as defined in claim 2, the apparatus further comprises a computer for protecting the received, first broadband signal from interference.

4. The apparatus as defined in claim 3, wherein the computer executes a pre-clipper function.

5. The apparatus as defined in claim 3, wherein the computer identifies time intervals in which the received, first broadband signal contains short duration energy that exceeds a prescribed threshold, and wherein the computer reduces the signal amplitude of the processed digitized signal during such time intervals.

6. The apparatus as defined in claim 5, wherein the computer estimates the narrow band energy level of the received, first broadband signal in a neighborhood time span of such time intervals and interpolate values from the neighborhood time span for the conditioned signal during such time intervals.

7. The apparatus as defined in claim 5, wherein the computer determines whether there is insufficient short duration energy to warrant interpolation, and if so, applies a windowing algorithm to reduce the signal amplitude of said time intervals, to minimize noise in the processed digitized signal.

8. The apparatus as defined in claim 7, and further comprising means for converting the processed digitized signal to the frequency domain, to produce a frequency-domain digitized signal.

9. The apparatus as defined in claim 8, and further comprising:
means for determining a broadband noise amplitude for identifying any frequencies in the frequency-domain digitized signal at which the amplitude of the frequency-domain digitized signal exceeds the broadband noise amplitude by at least a prescribed threshold factor; and
means for producing a corrected-frequency digitized signal by substituting a lesser amplitude value for any amplitude value of the frequency-domain digitized signal that exceeds the broadband noise amplitude.

10. The apparatus as defined in claim 9, wherein the lesser amplitude value that is substituted by the means for producing is zero.

11. The apparatus as defined in claim 9, wherein the lesser amplitude value that is substituted by the means for producing is one for all frequencies in a band of the received, first broadband signal and zero for all frequencies not in the band of the broadband signal.

12. The apparatus as defined in claim 9, wherein the means for producing substitutes the spectrum of the received, first broadband signal for all of the amplitude values, except where already replaced with the lesser amplitude value.

13. The apparatus as defined in claim 9, and further comprising means for converting the corrected-frequency digitized signal into the time domain and for removing short impulsive broadband interference to produce a corrected time-domain signal.

14. The apparatus as defined in claim 3, wherein the computer removes strong impulses from the conditioned digitized signal.

15. The apparatus as defined in claim 3, wherein:
the receiver device further comprises means for converting the conditioned digitized signal into the frequency domain, to form a frequency-domain digital signal; and
the computer removes narrowband interference from the frequency-domain digital signal.

16. The apparatus as defined in claim 3, wherein:
the receiver device further comprises means for converting the conditioned digitized signal into the frequency domain, to form a frequency-domain digital signal and means for converting the frequency-domain digital signal into the time domain, to form a time-domain signal; and
the computer removes residual impulses from the time-domain signal, to produce a corrected time-domain signal.

17. The apparatus as defined in claim 1, wherein the first time-setting device uses signals from at least one G.P.S. satellite to set said first synchronizable clock.

18. The apparatus as defined in claim 1, wherein the second time-setting device uses signals from at least one G.P.S. satellite to set said second synchronizable clock.

19. The apparatus as defined in claim 1, further comprising a waveform characterization device to generate the information in the first waveform storage device and the information in the second waveform storage device, the waveform characterization device containing a random number generator and using both a random number seed and a synchronized time reference to generate said information for storage in the first waveform storage device and the second waveform storage device, wherein both the first synchronizable clock device and the second synchronizable clock device are capable of providing the synchronized time reference.

20. The apparatus as defined in claim 19, wherein:

when the random number seed used to generate the information for the first waveform storage device is the same as the random number seed used to generate the information for the second waveform storage device, and when the first time reference maintained by the first synchronizable clock is synchronized with the second time reference maintained by the second synchronizable clock, then the first waveform storage device contains identical information to that of the second waveform storage device and the first broadband receiver element thus can correctly receive the first broadband signal radiated by the first broadband transmitter element; and when the first broadband receiver element correctly receives the radiated, first broadband signal, the first processing device can compute a first observed range from the first broadband receiver element to the first broadband transmitter element according to the first apparent arrival time and the prescribed signal transmission time contained in the second waveform storage device.

21. The apparatus as defined in claim 20, and further comprising:

a second receiver device located at a distance from the first receiver device at a second location, the second receiver device including a third waveform storage device that stores information characterizing a third broadband signal, including the prescribed signal transmission time, a second broadband receiver element that receives the electromagnetic radiation, and produces a second output signal, a third synchronizable clock that maintains a third time reference, a third time-setting device for setting the third synchronizable clock, and a second digital signal processing correlator configured to correlate the second output signal with the third broadband signal characterized by the information stored within the third waveform storage device, the second digital signal processing correlator outputs a second correlation output; and a second processing device that computes, based upon the second correlation output, a second apparent arrival time of the radiated, first broadband signal received by the second broadband receiver element with respect to the third time reference;

wherein the waveform characterization device also generates the information in the third waveform storage device, the waveform characterization device uses the random number seed and the third synchronizable clock to generate said information in the third waveform storage device;

wherein when the random number seed used to generate the information for the third waveform storage device is identical to the random number seed used to generate the information for the first and second waveform storage devices, and when the third time reference maintained by the third synchronizable clock device is synchronized with the first and second time references maintained by the first and second synchronizable clocks, then the first waveform storage device and the third waveform storage device store identical information, and the second broadband receiver element thus can correctly receive the first broadband signal radiated by the first broadband transmitter element;

wherein when the second broadband receiver element correctly receives the radiated, first broadband signal, the second processing device computes a second observed range from the second broadband receiver element to the first broadband transmitter element according to the second apparent arrival time and the prescribed signal transmission time contained in the third waveform storage device; and wherein said first observed range and said second observed range, together with knowledge of the first location and second location when the first broadband signal is radiated, are used to accurately determine a position of the first broadband transmitter element with respect to the first broadband receiver element or the second broadband receiver element.

22. The apparatus as defined in claim 20, and further comprising:

a first broadband antenna electrically connected to the first broadband transmitter element;

a second broadband antenna electrically connected to the first broadband receiver element and located at a second location;

a second broadband receiver element that is integrated in the first receiver device, wherein the second broadband receiver element receives electromagnetic radiation, and produces a second output signal; and a third broadband antenna electrically connected to the second broadband receiver element and located at a second location;

said first digital signal processing correlator includes a first channel and a second channel, wherein the first channel correlates the first output signal with the second broadband signal characterized by the information stored within the second waveform storage device, to provide the first correlation output, and wherein the second channel correlates the second output signal with the second broadband signal characterized by the information stored within the second waveform storage device, to provide a second correlation output;

the first processing device computes, based upon the second correlation output, a second apparent arrival time of the radiated, first broadband signal received by the second broadband receiver element relative to the second time reference;

wherein the correlation of the first output signal is synchronous with the correlation of the second output signal;

wherein the first correlation output contains a first peak; and wherein the second correlation output contains a second peak, which is separated from the first peak by a time difference that corresponds to the difference between a first range from the first broadband antenna to the second broadband antenna and a second range from the first broadband antenna to the third broadband antenna.

23. The apparatus as defined in claim 22, the first processing device determines the direction of the first broadband antenna relative to an axis intersecting the first location and the second location, based on knowledge of the first and second locations of the second broadband antenna and the third broadband antenna and the difference of the first apparent arrival time and the second apparent arrival time.

24. The apparatus as defined in claim 1, further comprising:

a first broadband antenna electrically connected to the first broadband transmitter element, for radiating a first copy of the first broadband signal;

a second broadband antenna electrically connected to the first broadband transmitter element, for radiating a second copy of the first broadband signal, wherein the second broadband antenna is separated from the first broadband antenna by a prescribed separation distance; and a third broadband antenna electrically connected to the first broadband receiver element, that is capable of receiving the radiated first copy of the first broadband signal and the radiated second copy of the first broadband signal;

wherein the first receiver device is configured to compute, based upon a difference in apparent arrival times of the radiated first copy and second copy of the first broadband signal, originating at the respective first and second broadband antennas, together with the prescribed separation distance of the first and second broadband antennas, an angle between an axis joining the first and second broadband antennas and a transmission path of the radiated first copy or second copy of the first broadband signal to the first receiver device.

25. The apparatus as defined in claim 24, and further comprising:

a first cable electrically connecting the first broadband transmitter to the first broadband antenna;

a second cable electrically connecting the first broadband transmitter to the second broadband antenna, wherein the first cable and the second cable are of substantially equal lengths, similar material, and similar cross sectional area, and wherein a substantially identical delay is imparted by each cable to its associated antenna.

26. The apparatus as defined in claim 24, wherein the received first copy of the first broadband signal is delayed from the received second copy of the first broadband signal by a prescribed time delay, wherein the prescribed time delay is stored as information in the second waveform storage device, and wherein the first receiver device is configured to use the prescribed time delay to compute the angle.

27. The apparatus as defined in claim 26, and further comprising a delay device connected to one of said cables, for effecting the prescribed time delay.

28. The apparatus as defined in claim 26, wherein:

the first transmitter device produces both the first copy of the first broadband signal and the second copy of the first broadband signal, the second copy of the first broadband signal being delayed from the first copy of the first broadband signal by the prescribed time delay; and the apparatus further comprises a switch that selects between the first broadband antenna and the second broadband antenna, such that the first copy of the first broadband signal is transmitted over the first broadband antenna and the second copy of the first broadband signal is transmitted over the second broadband antenna.

29. The apparatus as defined in claim 1, and further comprising:

a first broadband antenna electrically connected to the first transmitter device; and second, third, and fourth broadband antennas, each electrically connected to the first receiver device, wherein the second, third, and fourth broadband antennas are not co-linear, such that when the second, third, and fourth broadband antennas receive a distinct copy of the radiated, first broadband signal, an angle of arrival of the radiated, first signal relative to a plane intersecting the second, third, and fourth broadband antennas, can be computed unambiguously in two dimensions.

30. The apparatus as defined in claim 1, further comprising:

a first broadband antenna electrically connected to the first transmitter device; and second, third, fourth, and fifth broadband antennas, each electrically connected to the first receiver device, no three of four of said second, third, fourth, and fifth broadband antennas being co-linear, wherein each of the second, third, and fourth broadband antennas receives a distinct copy of the radiated, first broadband signal, such that an angle of arrival of the radiated, first signal, relative to a plane intersecting the second, third, fourth, and fifth broadband antennas, can be computed unambiguously in three dimensions.

31. The apparatus as defined in claim 1, wherein the first broadband signal which is characterized by the information stored in the first waveform storage device, includes a prescribed plurality of fundamental pulses.

32. The apparatus as defined in claim 1, wherein the first broadband signal, which is characterized by the information stored in the first waveform storage device, includes a plurality of fundamental pulses of prescribed phase.

33. The apparatus as defined in claim 1, wherein the first broadband signal, which is characterized by the information stored in the first waveform storage device, includes a plurality of fundamental pulses, with prescribed time durations between successive pulses.

34. Apparatus as defined in claim 33, wherein each fundamental pulse of the first broadband signal includes several cycles of a prescribed frequency.

35. Apparatus as defined in claim 34, wherein each fundamental pulse of the first broadband signal has a prescribed, substantially Gaussian envelope.

36. Apparatus as defined in claim 33, wherein the first broadband transmitter element of the first transmitter device includes:

a local oscillator that generates a local oscillator signal having a prescribed frequency;

a device that produces a prescribed burst of square wave pulses; and a mixer that mixes the local oscillator signal with the burst of square wave pulses, to produce the first broadband signal.

37. Apparatus as defined in claim 36, wherein the device that produces a prescribed burst of square wave pulses includes a shift register.

38. Apparatus as defined in claim 33, wherein the plurality of fundamental pulses of the first broadband signal include a plurality of pulse doublets, each doublet including a first fundamental pulse having a first phase, followed immediately by a second fundamental pulse having a second phase, different from the first phase.

39. Apparatus as defined in claim 33, wherein the first broadband transmitter element of the transmitter device includes a resonant transmission line and a fast-acting switch that is conditioned intermittently to excite the resonant transmission line.

40. Apparatus as defined in claim 1, wherein the first broadband signal, which is characterized by the information stored in the first waveform storage device, includes a series of fundamental pulses having prescribed, differing amplitudes.

41. Apparatus as defined in claim 40, wherein the first broadband transmitter element of the first transmitter device includes an arbitrary waveform generator.

42. Apparatus as defined in claim 1, wherein the first broadband transmitter element of the first transmitter device is configured to combine the first broadband signal with information message bits according to a prescribed coding scheme, for radiation and receipt by the first receiver device, and wherein the first receiver device additionally comprises a device for recovering the information message bits according to the prescribed coding scheme.

43. The apparatus as defined in claim 42, wherein the transmitter device is configured as an omni-directional beacon.

44. Apparatus as defined in claim 1, and further comprising:
a second transmitter device substantially identical to the first transmitter device, wherein the first waveform storage device of the first transmitter device and the first waveform storage device of the second transmitter device each store different information characterizing the two different broadband signals to be radiated by the respective first and second transmitter devices; and
a second receiver device substantially identical to the first receiver device, wherein the second waveform storage device of the first receiver device contains the same information as the first waveform storage device of the first transmitter device and the second waveform storage device of the second receiver device contains the same information as the first waveform storage device of the second transmitter device;
wherein the first transmitter device and the first receiver device can communicate with each other, and the second transmitter device and the second receiver device can communicate with each other, simultaneously.

45. Apparatus as defined in claim 1, the apparatus further comprising means for protecting the received, first broadband signal from interference.

46. The apparatus as defined in claim 45, wherein the means for protecting the received, first broadband signal from interference comprises electronic hardware.

47. The apparatus as defined in claim 46, wherein the electronic hardware comprises a filter.

48. The apparatus as defined in claim 46, wherein the electronic hardware comprises a limiter.

49. The apparatus as defined in claim 46, wherein the electronic hardware comprises an automatic gain control circuit that conditions a signal level of the received, first broadband signal received at the broadband receiver element to remain within a prescribed dynamic range.

50. The apparatus as defined in claim 45, wherein the means for protecting the received, first broadband signal comprises a combination of electronic hardware and computer software.

51. An apparatus as defined in claim 1, further including:
a plurality of first receiver devices, each of which includes
(1) a locator device and a synchronizer device that determines the spatial location of the receiver device, and provides a sychronized local time reference, and
(2) a communication device configured to communicate a processor message between the receiver devices; and
a central processor device that receives from each of the plurality of receiver devices a processor message containing the apparent arrival time of the broadband signal at that receiver device and the location of that receiver device at the time the broadband signal was received at that receiver device, and thereby determines the location and clock error of the transmitter device.

52. Apparatus for determining an azimuth of a remote object from a base platform using broadband signals, the remote object being spaced from the base platform, the apparatus comprising:
a transmitter device, located at the remote object, said transmitter device including
a first waveform storage device that stores information characterizing a plurality of first broadband signals, such characterization including a prescribed signal transmission time for each first broadband signal,
a plurality of broadband transmitter antennas arranged in an array of a prescribed geometry, and
a broadband transmitter element configured to simultaneously radiate a one of the plurality of first broadband signals over each of said plurality of broadband transmitter antennas, in accordance with said stored information;
a receiver device located at the base platform, the receiver device including
a second waveform storage device that stores information characterizing one or more of a plurality of second broadband signals, including the prescribed signal transmission time for each of the one or more of the plurality of second broadband signal,
a broadband receiver antenna that is capable of receiving electromagnetic radiation corresponding to the one or more of the plurality of first broadband signals radiated over said plurality of broadband transmitter antennas,
a broadband receiver element configured to receive and process the electromagnetic radiation from said broadband receiver antenna, thereby producing a first output signal, and
a digital signal processing correlator configured to correlate the output signal with the one or more of the plurality of second broadband signals characterized by the information stored within the second waveform storage device, the digital signal processing correlator outputs a correlation output that is used to derive a time of arrival of each of the one or more of the plurality of first broadband signals that is radiated by the plurality of broadband transmitter antennas; and
a processing device that computes said azimuth based upon the prescribed geometry and the time of arrival differences of each of the one or more of the plurality of first broadband signals as determined by said correlation detector.

53. The apparatus as defined in claim 52, wherein said plurality of broadband transmitter antennas comprises at least three broadband transmitter antennas.

54. The apparatus as defined in claim 53, wherein the apparatus is configured as an aircraft landing system.

55. Apparatus for determining the azimuth of a remote object from a base platform using broadband signals, the remote object being spaced from the base platform, the apparatus comprising:
- a transmitter device, located at the remote object, said transmitter device including
  - a first waveform storage device that stores information characterizing a broadband signal, such characterization including a prescribed signal transmission time,
  - a broadband transmitter antenna, and
  - a broadband transmitter element configured to radiate the broadband signal over said broadband transmitter antenna, in accordance with said stored information,
- a receiver device located at the base platform, the first receiver device including
  - a second waveform storage device that stores information characterizing the broadband signal, including the prescribed signal transmission time,
  - a plurality of broadband receiver antennas, arranged in an array of a prescribed geometry, that are capable of receiving electromagnetic radiation corresponding to the broadband signal radiated from said broadband transmitter antenna,
  - a broadband receiver element configured to receive and process the electromagnetic radiation from each of said plurality of broadband receiver antennas, thereby producing a conditioned signal, and
  - a multi-channel correlation detector configured to synchronously correlate the conditioned signal with the broadband signal characterized by the information stored within the second waveform storage device, the multi-channel correlation detector outputs a correlation output that is used to derive a time of arrival of the radiated broadband signal at each of the plurality of broadband receiver antennas; and
  - a processing device that computes said azimuth based upon the prescribed geometry and the time of arrival differences of the broadband signal being received at each of the plurality of broadband receiver antennas as determined by said multi-channel correlation detector.

56. The apparatus as defined in claim 55, wherein the processing device comprises a clock, and it measures the time of arrival differences of the broadband signal received at each of the plurality of broadband receiver elements based upon said clock.

57. The apparatus as defined in claim 55, wherein the broadband receiver element receives and processes the electromagnetic radiation from each of the plurality of broadband receiver antennas.

58. An apparatus as defined in claim 55, wherein the derivation of the time of arrival of the broadband signals at each of the broadband receiver antennas uses the measured amplitude samples of the received broadband signal, together with information indicative of the prescribed broadband signal envelope, to accurately derive the time of arrival of the broadband signal at each receiver device.

59. Apparatus for determining a location and a clock error of a remote object from a plurality of base platforms using broadband signals, the remote object being spaced from the plurality of base platforms, the apparatus comprising:
- a transmitter device, located at the remote object, said transmitter device including
  - a first waveform storage device that stores information characterizing a broadband signal, such characterization including a prescribed signal transmission time,
  - a broadband transmitter antenna, and
  - a broadband transmitter element configured to radiate the broadband signal over said broadband transmitter antenna, in accordance with said stored information,
- a receiver device located at each of the plurality of base platforms, each receiver device including,
  - a second waveform storage device that stores information characterizing the broadband signal, including the prescribed signal transmission time,
  - a broadband receiver antenna that receives electromagnetic radiation corresponding to the broadband signal radiated from said broadband transmitter antenna, and
  - a broadband receiver element that receives and processes the electromagnetic radiation from the broadband receiver antenna, thereby producing a conditioned signal;
  - a correlation detector configured to synchronously correlate the conditioned signal with the broadband signal characterized by the information stored within the second waveform storage device, the correlation detector outputs a correlation output,
  - a first processing device, responsive to the correlation output, for deriving a time of arrival of the radiated broadband signal at the broadband receiver antenna and a location of the broadband receiver antenna at the time of arrival; and
  - a communication device for sending the time of arrival and the location of the broadband receiver antenna at the time of arrival; and
- a second processing device that computes said location and said clock error based upon the locations of the broadband receiver antenna and the time of arrival of the broadband signal being received at the plurality of broadband receiver antennas.

60. A method for communicating a prescribed broadband signal from a remote object to a first base platform, the remote object being spaced from the first base platform, the method comprising:
- transmitting the prescribed broadband signal from the remote object by
  - storing information that characterizes the prescribed broadband signal, including a prescribed signal transmission time,
  - maintaining a first settable time reference, and
  - radiating the prescribed broadband signal in accordance with the stored information and the first time reference;
- receiving the transmitted, prescribed broadband signal at the first base platform by
  - storing information characterizing the prescribed broadband signal, including the prescribed signal transmission time,
  - receiving and processing electromagnetic radiation, to produce a first output signal,
  - maintaining a second settable time reference, and
  - correlating the first output signal with the prescribed broadband signal characterized by the information stored at the first base platform, and producing a first correlation output; and computing, based upon the first correlation output, a first apparent arrival time of the transmitted, prescribed broadband signal relative to the second time reference.

61. The method as defined in claim 60, for additionally communicating the prescribed broadband signal from the remote object to a second base platform, the remote object being spaced from the second base platform, the method further comprising:

receiving the transmitted, prescribed broadband signal at the second base platform by storing information characterizing the prescribed broadband signal, including the prescribed signal transmission time, receiving and processing electromagnetic radiation, to produce a second output signal, maintaining a third settable time reference, and correlating the second output signal with the prescribed broadband signal characterized by the information stored at the second base platform, and producing a second correlation output;

computing, based upon the second correlation output, a second apparent arrival time of the transmitted, prescribed broadband signal relative to the third time reference;

deriving a first observed range from the first base platform to the remote object based upon said first apparent arrival time;

deriving a second observed range from the second base platform to the remote object based upon said second apparent arrival time; and using the first observed range and the second observed range to accurately determine a position of the remote object with respect to the first base platform or the second base platform.

62. A method for determining an azimuth of a remote object from a base platform using broadband signals, the remote object being spaced from the base platform, the method comprising:

transmitting multiple copies of a prescribed broadband signal at the remote object, including storing information in a first waveform storage device that characterizes the prescribed broadband signal, including a prescribed signal transmission time, providing a plurality of broadband transmitter antennas arranged in an array of a prescribed geometry, radiating the multiple copies of the prescribed broadband signal simultaneously over said plurality of broadband transmitter antennas;

receiving the radiated multiple copies of the prescribed broadband signal at the base platform, including storing information in a second waveform storage device that characterizes the prescribed broadband signal, including the prescribed signal transmission time, providing a broadband receiver antenna that receives electromagnetic radiation from the plurality of broadband transmission antennas, receiving and processing the electromagnetic radiation from said broadband receiver antenna, to produce a conditioned signal for each of said radiated multiple copies of the prescribed broadband signal, and correlating the conditioned signal with the prescribed broadband signal characterized by the information stored within the second waveform storage device, to produce a correlation output that can be used to compute the time of arrival for each of the multiple copies of the prescribed broadband signal with respect to said second time reference; and computing the azimuth based upon the prescribed geometry and the time difference of arrival of the multiple copies of the prescribed broadband signal transmitted from the plurality of broadband transmitter antennas.

63. The method as defined in claim 62, wherein:

correlating produces a separate time of arrival for each multiple copy of the prescribed broadband signal transmitted by the broadband transmitter antennas, and received by the broadband receiving antenna; and correlation utilizes a common clock to determine the difference in the time of arrival for each multiple copy of the prescribed broadband signal.

64. A method for determining the azimuth of a remote object from a base platform using a prescribed broadband signal, the remote object being spaced from the base platform, the method comprising:

transmitting the prescribed broadband signal at the remote object by storing information in a first waveform storage device that characterizes the prescribed broadband signal, including a prescribed signal transmission time, providing a broadband transmitter antenna, and radiating the prescribed broadband signal over said broadband transmitter antenna;

receiving the transmitted prescribed broadband signal at the base platform by storing information in a second waveform storage device that characterizes the prescribed broadband signal, including the prescribed signal transmission time, providing a plurality of broadband receiver antennas, arranged in an array of a prescribed geometry, that receive and filter electromagnetic radiation, receiving and processing the electromagnetic radiation received from each of said broadband receiver antennas, to produce a separate conditioned signal for each broadband receiver antenna, and correlating each conditioned signal with the prescribed broadband signal characterized by the information stored in the second waveform storage device, to produce a plurality of correlation outputs;

computing, based upon the plurality of correlation outputs, the arrival time of the transmitted, prescribed broadband signal at each of the plurality of broadband receiver antennas; and calculating the azimuth based upon the prescribed geometry and the computed arrival time of the transmitted, prescribed broadband signal at each of the plurality of broadband receiver antennas.

65. A method for determining an estimated position of a remote object and a time error between a first time reference at a remote object and a second time reference at a base platform, using a prescribed broadband signal, the remote object being spaced from the base platform, the method comprising:

transmitting the prescribed broadband signal from the remote object by storing information characterizing the prescribed broadband signal in a first waveform storage device, the stored information including a prescribed signal transmission time, producing the prescribed broadband signal in accordance with the stored information in the first waveform storage device, and providing a broadband transmitter antenna to radiate the produced, prescribed broadband signal;

receiving the transmitted prescribed broadband signal at the base platform by storing information characterizing the prescribed broadband signal in a second waveform storage device, the stored information including the prescribed signal transmission time, providing a plurality of broadband receiver antennas, arranged in an array of a prescribed geometry, each configured to receive electromagnetic radiation from said broadband transmitter antenna, to produce a plurality of receiver antenna signals, receiving and filtering the plurality of receiver antenna signals, to produce a corresponding plurality of conditioned signals, and correlating the conditioned signal corresponding to each broadband receiver antenna with the prescribed broadband signal as characterized by the information stored in the second waveform storage device, to produce a plurality of correlation outputs based upon each correlation;

computing, based upon the plurality of correlation outputs, a plurality of arrival times of the transmitted broadband signal relative to the second time reference; and deriving an estimated position of the remote object and the time error based upon the prescribed geometry and the plurality of arrival times.

66. A method for communicating a prescribed broadband signal from a remote object to a base platform, the remote object being spaced from the base platform, the method comprising:

transmitting the prescribed broadband signal, formed from a plurality of fundamental pulses, at the remote object by deriving a first set of pseudo-random information characterizing the plurality of fundamental pulses, including the number of fundamental pulses and the timing between each successive fundamental pulse, and radiating from a broadband transmitter element the prescribed broadband signal in accordance with the derived information; and receiving the transmitted, prescribed broadband signal at the base platform by deriving a second set of pseudo-random information, identical to the first set of pseudo-random information, characterizing the prescribed broadband signal, receiving and filtering electromagnetic radiation, to produce a conditioned signal, and correlating the conditioned signal with the prescribed broadband signal characterized by the second set of pseudo-random information, to produce a correlation output.

67. The method as defined in claim 66, and further comprising:

maintaining a first time reference at the remote object, to assist in transmitting the prescribed broadband signal;

maintaining a second time reference at the base platform, to assist in receiving the prescribed broadband signal; and computing, based on the correlation output, a first apparent arrival time of the radiated prescribed broadband signal relative to the second time reference.

68. The method as defined in claim 66, wherein the first set of pseudo-random information further characterizes the phase of each fundamental pulse.

69. A method for communicating a prescribed broadband signal from a remote object to a base platform, the remote object being spaced from the base platform, the method comprising:

transmitting the prescribed broadband signal from the base receiver device by storing information characterizing the prescribed broadband signal, and radiating the prescribed broadband signal in accordance with the stored information;

receiving the transmitted, prescribed broadband signal at the base platform by storing information characterizing the prescribed broadband signal, receiving and filtering electromagnetic radiation, to produce a conditioned signal, and correlating the conditioned signal with the prescribed broadband signal characterized by the information stored at the base platform, to produce a correlation output; and protecting the transmitted, prescribed broadband signal from interference.

70. The method as defined in claim 69, wherein the protecting the transmitted, prescribed broadband signal from interference utilizes electronic hardware.

71. The method as defined in claim 70, wherein receiving the transmitted, prescribed broadband signal further comprises:

digitizing the conditioned signal to produce a digitized signal; and digital signal processing the digitized signal to produce a conditioned digitized signal, wherein correlation includes correlating the conditioned digitized signal with the prescribed broadband signal characterized by the information stored at the base platform.

72. The method as defined in claim 71, wherein the protecting the transmitted, prescribed broadband signal from interference utilizes computer software.

73. The method as defined in claim 71, wherein protecting the transmitted, prescribed broadband signal from interference comprises:

identifying time intervals in which the transmitted, prescribed broadband signal contains short duration energy that exceeds a prescribed threshold; and reducing the signal amplitude of the conditioned digitized signal during such time intervals.

74. The method as defined in claim 73, wherein the protecting the prescribed broadband signal from interference further comprises:

estimating the narrow band energy level of the transmitted, prescribed broadband signal in the neighborhood of such time intervals; and substituting interpolated values of the neighborhood intervals for the conditioned signal during such time intervals.

75. The method as defined in claim 73, wherein the protecting the prescribed broadband signal from interference further comprises:

determining whether there is insufficient short duration energy to warrant interpolation; and if there is insufficient short duration energy to warrant interpolation, applying a windowing algorithm to portions of the received, prescribed broadband signal that are not in the prescribed time intervals.

76. The method as defined in claim 71, wherein the receiving the transmitted, prescribed broadband signal further comprises converting the conditioned digitized signal to the frequency domain, to produce a frequency-domain digitized signal.

77. The method as defined in claim 76, wherein the protecting the transmitted, prescribed broadband signal from interference further comprises:
   processing the frequency-domain digitized signal to determine a broadband amplitude for each frequency;
   identifying any frequencies of the frequency-domain digitized signal in which the amplitude of the frequency-domain digitized signal exceeds the broadband amplitude by at least a prescribed threshold factor; and
   substituting a different amplitude value for each frequency of the frequency-domain digital signal identified as exceeding the broadband amplitude, to produce a corrected-frequency digitized signal.

78. The method as defined in claim 77, wherein the different amplitude value that is substituted in substituting is zero.

79. The method as defined in claim 77, wherein the different amplitude value that is substituted in substituting is one for all frequencies in the band of the prescribed broadband signal and is zero for all frequencies not in the band of the prescribed broadband signal.

80. The method as defined in claim 77, wherein all amplitude valves are the frequency amplitudes of the prescribed broadband signal.

81. The method as defined in claim 80, wherein the substituted values are zero for those frequencies at which the amplitude exceeds the prescribed threshold factor.

82. The method as defined in claim 76, wherein the protecting the transmitted, prescribed broadband signal from interference further comprises:
   converting the frequency-domain digitized signal into the time-domain, to produce a time-domain signal; and
   processing the time-domain signal to remove residual impulses, to produce a corrected time-domain signal.

83. Apparatus for deriving an estimated position of a remote object and a time error between a first synchronizable clock positioned at the remote object, and a second synchronizable clock positioned at a base platform, the remote object being spaced from the base platform, the apparatus comprising:
   a transmitter device, located at the remote object, said transmitter device including
      a first waveform storage device that stores information characterizing a prescribed broadband signal, such characterization including a prescribed signal transmission time,
      the first sychronizable clock maintains a first time reference,
      a broadband transmitter element configured to produce the prescribed broadband signal in accordance with said stored information and said first time reference, and
      a broadband transmitter antenna configured to radiate the prescribed broadband signal produced by said broadband transmitter element;
   a receiver device, located at the base platform, the receiver device including
      a second waveform storage device that stores information characterizing the prescribed broadband signal, including the prescribed signal transmission time,
      a plurality of broadband receiver antennas, arranged in an array of a prescribed geometry, each broadband receiver antenna being configured to receive electromagnetic radiation from said broadband transmitter antenna, thereby producing a plurality of receiver antenna signals,
      a broadband receiver element configured to receive and filter the plurality of receiver antenna signals and to produce a conditioned signal for each receiver antenna signal,
      the second synchronizable clock maintains a second time reference, and
      a digital signal processing correlator configured to correlate each conditioned signal with the prescribed broadband signal characterized by the information stored within the second waveform storage device, the correlation detector outputting a plurality of correlation outputs; and
   a processing device, responsive to the plurality of correlation outputs and the prescribed array geometry, that computes the arrival time of the radiated, prescribed broadband signal received at each broadband receiver antenna element relative to the second time reference, wherein the processing device additionally computes an estimated position of the remote object and time error between the first time reference and the second time reference.

84. The apparatus as defined in claim 83, and further comprising a time-setting device that conditions the second synchronizable clock to adjust the time error.

85. An apparatus as defined in claim 83, further including:
   a plurality of first receiver devices, each of which includes
      (1) a locator device that determines the spatial location of the receiver device, and
      (2) a communication device configured to communicate a processor message between the receiver devices; and
   a central processor device that receives from each of the plurality of receiver devices a processor message containing the apparent arrival time of the broadband signal at that receiver device and the location of that receiver device at the time the broadband signal was received at that receiver device, and thereby determines the location and clock error of the transmitter device.

* * * * *